United States Patent [19]

Kato

[11] Patent Number: 5,757,649
[45] Date of Patent: May 26, 1998

[54] CAD/CAM APPARATUS

[75] Inventor: Tomoko Kato, Aichi, Japan

[73] Assignee: Mitsubishi Denki Kabushiki Kaisha, Tokyo, Japan

[21] Appl. No.: 398,647

[22] Filed: Mar. 3, 1995

[30] Foreign Application Priority Data

Mar. 31, 1994 [JP] Japan .................................. 6-063767

[51] Int. Cl.$^6$ ................................................. G05B 19/18
[52] U.S. Cl. ........................ 364/474.24; 364/474.04
[58] Field of Search ........................... 364/191, 192, 364/474.04, 474.11, 474.21–474.23, 474.24, 474.25, 474.26, 474.28, 474.29

[56] References Cited

U.S. PATENT DOCUMENTS

| | | | |
|---|---|---|---|
| 5,115,400 | 5/1992 | Watanabe et al. | 364/474.24 |
| 5,272,642 | 12/1993 | Suzuki | 364/474.24 |
| 5,289,382 | 2/1994 | Goto | 364/474.21 |

FOREIGN PATENT DOCUMENTS 2-257203  10/1990  Japan .
2-306308  12/1990  Japan .

*Primary Examiner*—Reba I. Elmore
*Assistant Examiner*—Steven R. Garland
*Attorney, Agent, or Firm*—Sughrue, Mion, Zinn, Macpeak & Seas, PLLC

[57] ABSTRACT

A method to automatically operate a CAD/CAM apparatus corresponding to a plurality of machines. Machining definition data corresponding to machines is generated and stored as multiple machine inter-reference type machining definition data. Pre-defined data is referenced from the multiple machine inter-reference type machining definition data so as to automatically generate machining definition data corresponding to other machines. Specifically, by at least combining product graphic data and machining conditions, and utilizing two dimension and three dimension machining definition tables as required, shapes and machining conditions can be formed.

20 Claims, 67 Drawing Sheets

FIG. 10

WIRE MACHINING      W1

| PROCESS TYPE | APPROACH MACHINING | SEQUENTIAL MACHINING | REVERSE CUT | ENTIRE CIRCUMFERENTIAL MACHINING | | |
|---|---|---|---|---|---|---|
| TRAVELING DIRECTION | ######## | LEFT | LEFT | LEFT | | |
| OFFSET DIRECTION | ######## | LEFT | LEFT | LEFT | | |
| OFFSET NUMBER | 0 | 0 | 0 | 0 | | |
| E BACK NUMBER | 0 | 0 | 0 | 0 | | |
| MACHINING SPEED (MM/MIN) | 0 | 0 | 0 | 0 | | |
| APPROACH DISTANCE (mm) | 1 | 0 | ######## | 0 | | |
| ARC APPROACH RADIUS (mm) | ######## | 0 | 0 | 0 | | |
| OMITTED CUT AMOUNT (mm) | ######## | 1 | 1 | ######## | | |
| RELIEF AMOUNT (mm) | ######## | 0 | 0 | 0 | | |
| INSIDE OF MINIMUM R (mm) | ######## | 0 | 0 | 0 | | |
| OUTSIDE OF MINIMUM R (mm) | ######## | 0 | 0 | 0 | | |
| ENLARGED FINISH RELIEF/EDGE R (mm) | ######## | 0.5 | 0.5 | 0.5 | | |
| CUTER TAPER ANGLE (°) | ######## | 0 | 0 | 0.5 | | |
| ANY CODE AT MACHINING START POSITION | ######## | | | | | |
| ANY CODE AT MACHINING END POSITION | ######## | M1 | | | | |
| ANY CODE OF CUT POSITION | ######## | ######## | M1 | M1 | | |
| ANY CODE OF H RETURN POSITION | ######## | ######## | | | | |
| ANY CODE OF a POSITION | ######## | | ######## | | | |
| ANY CODE OF b POSITION | ######## | | ######## | | | |
| ANY CODE OF c POSITION | ######## | ######## | ######## | | | |

FIG. 15

| HOLE MACHINING | | | | | | | H1 |
|---|---|---|---|---|---|---|---|
| HOLE MACHINING TYPE | CENTER | DRILL | CHAMFERING | | | | |
| PROCESS CATEGORY (0-255) | 0 | 0 | 0 | | | | |
| TOOL NAME ⇨ | | | | | | | |
| TYPE | CDR | DRL | CHF | | | | |
| TYPE DETAIL ⇨ | | | | | | | |
| TOOL DIAMETER | | | | | | | |
| REFERENCE HEIGHT | Z0 | Z0 | Z0 | | | | |
| BOTTOM HEIGHT | ///////// | Z | ///////// | | | | |
| BOTTOM COMPENSATION AMOUNT | 0 | 3 | ///////// | | | | |
| BOTTOM CONDITION | ///////// | THROUGH | ///////// | | | | |
| CENTER DIAMETER | 0 | ///////// | ///////// | | | | |
| CENTER DEPTH | 0 | ///////// | ///////// | | | | |
| FINISH RELIEF Cr | ///////// | ///////// | ///////// | | | | |
| Cz | ///////// | ///////// | ///////// | | | | |
| CYCLE CODE | | | | | | | |
| DOWEL TIME | 0 | 0 | 0 | | | | |
| CUTTING AMOUNT/ SHIFT AMOUNT | 0 | 0 | 0 | | | | |
| SPINDLE ROTATION S | 0 | 0 | 0 | | | | |
| MACHINING FEED Fz | 0 | 0 | 4 | | | | |
| Fr | ///////// | ///////// | 0 | | | | |
| RETURN MODE | I | I | I | | | | |
| MACHINING SURFACE SAFETY RELIEF | 3 | 3 | 3 | | | | |
| CUTTING MODE | ///////// | ///////// | DOWN | | | | |
| PROCESS START CODE ⇨ | | | | | | | |
| PROCESS END CODE ⇨ | | | | | | | |

ENGRAVING DISCHARGE MACHINE PROCESS TABLE  E1,E2,E3

| MACHINING POSITION | E1 | | E2 | | E3 | |
|---|---|---|---|---|---|---|
| WORK COORDINATE SYSTEM | | | | | | |
| ROUGH/FINE | ROUGH | FINISH | ROUGH | FINISH | ROUGH | FINISH |
| MACHINING DIRECTION | Z | | Z | | Z | |
| ELECTRODE NAME | T5 | | T5 | | T5 | |
| T NUMBER | 11 | 12 | 11 | 12 | 11 | 12 |
| COMPENSATION ANGLE | 0 | 0 | 0 | 0 | 0 | 0 |
| REDUCED RELIEF | 0.3 | 0.3 | 0.3 | 0.3 | 0.3 | 0.3 |
| OSCILLATING PATTERN | SQUARE | | SQUARE | | SQUARE | |
| MACHINING CONDITION | 0 | 0 | 0 | 0 | 0 | 0 |
| MACHINING END x | 1286.0804 | | 1336.8783 | | 1393.7415 | |
| y | 2521.6347 | | 2534.5237 | | 2507.2294 | |
| z | 0 | | 0 | | 0 | |
| c | 0 | | 0 | | 0 | |
| MACHINING FEED AMOUNT | 5 | | 5 | | 5 | |
| APPROACH POSITION | 5 | | 5 | | 5 | |
| ESCAPE POSITION | 5 | | 5 | | 5 | |
| BARREL SELECTION | OFF | OFF | OFF | OFF | OFF | OFF |
| MACHINING SOLUTION | NO JET | NO JET | NO JET | NO JET | NO JET | NO JET |
| START CODE | | | | | | |
| END CODE | | | | | | |

FIG. 47

| MACHINING CONDITION-ITEM―PROCESS | PROCESS 1 | PROCESS 2 |
|---|---|---|
| MACHINING TYPE | | |
| TOOL NAME | | |
| TOOL DIAMETER | | |
| FINISH RELIEF R | 2 | 0 |
| FINISH RELIEF Z | 2 | 0 |
| CUTTING AMOUNT R | 1 | 1 |
| CUTTING AMOUNT Z | 1 | 1 |
| FEED SPEED R | 150 | 150 |
| FEED SPEED Z | 50 | 50 |
| SPINDLE ROTATION | 796 | 796 |
| PICK MODE | | |
| CUTTING MODE | | |
| SCAN DIRECTION | | |

FIG. 48

| MACHINING CONDITION-ITEM―PROCESS | PROCESS 1 | PROCESS 2 |
|---|---|---|
| MACHINING TYPE | SCAN | CONTOUR |
| TOOL NAME | SSV05020 | SSV05020 |
| TOOL DIAMETER | FEM | FEM |
| FINISH RELIEF R | 2 | 0 |
| FINISH RELIEF Z | 2 | 0 |
| CUTTING AMOUNT R | 1 | 1 |
| CUTTING AMOUNT Z | 1 | 1 |
| FEED SPEED R | 150 | 150 |
| FEED SPEED Z | 50 | 50 |
| SPINDLE ROTATION | 796 | 796 |
| PICK MODE | ONE DIRECTION | ― |
| CUTTING MODE | DOWN | DOWN |
| SCAN DIRECTION | 45 | ― |

FIG. 53

| DIAMETER | COLOR | LINE TYPE | HOLE SHAPE | NOMINAL SIZE |
|---|---|---|---|---|
| 0 | — | — | KDN | D020 |
| 1.50 | — | — | KDN | D015 |
| 1.50 | RED | BROKEN LINE | KCX | DC15 |
| 2.00 | — | — | KDN | D020 |
| 2.50 | — | — | KDN | D025 |

Columns: 53-1, 53-2, 53-3, 53-4, 53-5

KDN (STRAIGHT HOLE)

| SHAPE NAME | NOMINAL SIZE | DIAMETER : D1 | DEPTH : Z1 | CHAMFERING AMOUNT : C1 |
|---|---|---|---|---|
| KDN | D015 | 1.50 | 13 | 0.0 |
| KDN | D020 | 2.00 | 13 | 0.0 |
| KDN | D025 | 2.50 | 13 | 0.0 |

FIG. 59
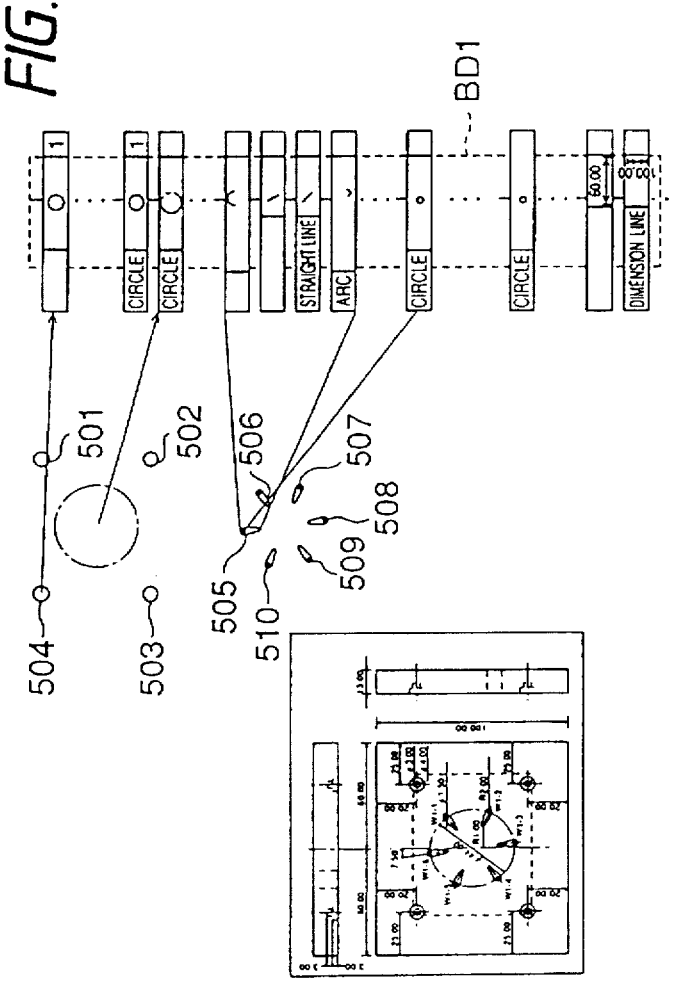
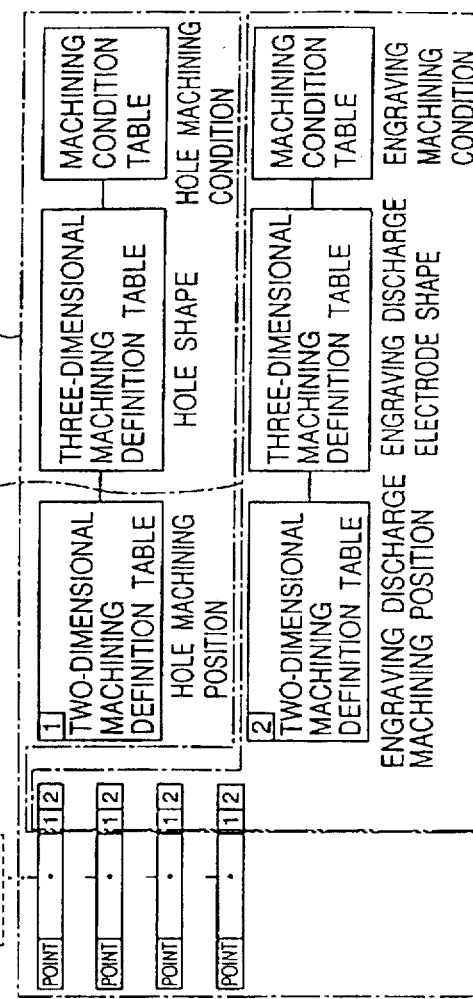

| SHAPE NAME | NOMINAL SIZE | DIAMETER : D1 | DIAMETER : D2 | DEPTH : Z1 | DEPTH : Z2 | CHAMFERING AMOUNT : C1 | CHAMFERING AMOUNT : C2 |
|---|---|---|---|---|---|---|---|
| KCX | D008 | 8.0 | 4.0 | 6.0 | 3.0 | 0.0 | 0.0 |
| KCX | D016 | 16.0 | 8.0 | 6.0 | 3.0 | 0.0 | 0.0 |
| KCX | D024 | 24.0 | 12.0 | 6.0 | 3.0 | 0.0 | 0.0 |

| SHAPE NAME | NOMINAL SIZE | DIAMETER : D1 | DEPTH : Z1 | CHAMFERING AMOUNT : C1 |
|---|---|---|---|---|
| KDN | D010 | 1.00 | 13.00 | 0.0 |
| KDN | D015 | 1.50 | 13.00 | 0.0 |
| KDN | D020 | 2.00 | 13.00 | 0.0 |

CAD/CAM APPARATUS

BACKGROUND OF THE INVENTION

The present invention relates to a CAD/CAM apparatus, in particular, to a CAD/CAM apparatus for generating NC data or NC source data corresponding to the type of a machine according to product graphic data. Hereinafter, the NC data or NC source data is referred to as machining data.

When a workpiece W shown in FIG. 61 is machined to a product (having spot facing holes 6207, 6208, 6209, and 6210 and through-shapes 6201, 6202, 6203, 6204, 6205, and 6206) shown in FIG. 62, the through-shapes are accurately machined by a wire discharge machine and the spot facing holes and prepared holes for the through-shapes (holes into which a wire of the wire discharge machine is initially inserted) are machined by a M/C (Machining Center).

Conventionally, prepared hole machining NC data for a wire electric discharge machine is generated by a first CAD/CAM apparatus that generates "M/C machining NC data". "Wire discharge machining NC data" for the prepared holes that are initial holes (IH's) is generated by a second CAD/CAM apparatus.

FIG. 63 is a schematic diagram showing a conventional CAD/CAM system. FIG. 64 is a flow chart showing a process of the CAD/CAM system for generating NC data. With reference to FIGS. 63 and 64, the NC data generating procedure of the conventional CAD/CAM apparatus will be described.

The CAD/CAM system 6300 is a CAD/CAM apparatus group that machines the material shown in FIG. 61 into the product shown in FIG. 62. The CAD/CAM system 6300 comprises a "M/C machining NC data" generating CAD/CAM apparatus 6300A and a "wire discharge machining NC data" generating CAD/CAM apparatus 6300B. Each of the CAD/CAM apparatuses 6300A and 6300B comprises a computer (not shown), a main body 6302, a CRT display 6303, a keyboard 6304, a mouse 6305, and a printer 6306. The main body 6302 has a FDD unit 6301. The "M/C machining NC data" generating CAD/CAM apparatus 6300A is connected to an M/C 6308 through a PC 6307A. The "wire discharge machining NC data" generating CAD/CAM apparatus 6300B is connected to a wire discharge machine 6309 through a PC 6307B.

Conventionally, the "M/C machining NC data" and the "wire discharge machining NC data" are generated by the CAD/CAM apparatuses 6300A and 6300B, respectively. Next, these CAD/CAM apparatuses 6300A and 6300B will be described.

When the workpiece W is machined to the above-described product, product graphic data that is an original drawing shown in FIG. 65 is generated by one of the CAD/CAM apparatuses 6300A and 6300B or another CAD/CAM apparatus (not shown) at block B1 shown in FIG. 64. In reality, a designer sits on a chair behind for example the CAD/CAM apparatus 6300A and treats the CRT display 6303A as a drawing sheet. The designer operates the keyboard 6304A and the mouse 6305A instead of using a writing tool so as to draw the graphic data. Values are calculated by the computer. The designer inputs dimensions in a manner well known in the art. With the CRT display 6303A, the designer can easily erase and/or correct graphic data displayed thereon. After the graphic data has been completely input, all graphic data and values are input to the computer and stored in an external storing unit (not shown).

A designer who will create "M/C machining NC data" corresponding to the completed graphic data uses the M/C machining NC data generating CAD/CAM apparatus 6300A. A designer who will create "wire discharge machining NC data" corresponding to the completed graphic data uses the wire machining NC data generating CAD/CAM apparatus 6300B. In reality, the designer who uses the "wire discharge machining NC data" generating CAD/CAM apparatus 6300B sets graphic data stored in an FD of the external storing unit and outputs it at block 64-B2 of FIG. 64. The output graphic data is displayed on the CRT display 6303B as shown in FIG. 65. Wire discharge machining data that represents a through-shape 6201 of FIG. 62 is created on a screen where the inside of a broken line frame 66-1 of FIG. 66 is enlarged. FIG. 67 shows the enlarged screen. The designer moves a cursor to the central position 67-1 of a circle representing the position of an IH (Initial Hole) with the mouse 6305B and clicks a mouse button (see FIG. 68) so as to determine the position of the IH at step 64-S1. Thus, a mark that represents that the IH has been determined is displayed on the CRT display 6303B (see FIG. 69). Next, the designer moves the cursor to the positions of an arc 69-1, a straight line 69-2, an arc 69-3, and a straight line 69-4 with the mouse 6305 and clicks the mouse button at these positions so as to determine the shape of the workpiece W with the through-shape at step 64-S2. Thus, the machining shape of the workpiece W that is machined by the wire discharge machine is defined with the start point of the generated IH position. Thereafter, the designer designates the sequence of machining steps, traveling direction, offset direction, machining speed, and so forth of the machine so as to determine machining conditions of the machining shape of the workpiece W at step 64-S3. Thus, the wire discharge machining data for the through-shape 6201 has been completely generated. When the wire discharge machining data is converted into NC data at step 64-S4, NC data commands that define machining paths 70-1, 70-2, 70-3, 70-4, 70-5, 70-6, and 70-7 shown in FIG. 70 are output. Likewise, the through-shapes 6202, 6203, 6204, 6205, and 6206 are defined.

The designer who uses the M/C machining NC data generating CAD/CAM apparatus 6300A sets graphic data stored in an FD of the external storing unit at block 64-B3 of FIG. 64 and outputs it. The output graphic data is displayed on the CRT display 6303A of FIG. 63 as shown in FIG. 66. The designer creates the spot facing hole 6207 of FIG. 62, which defines M/C machining data, on a screen where the inside of a broken line frame 66-2 of FIG. 66 is enlarged. FIG. 71 shows the enlarged screen. The designer moves the cursor to the vicinity of a center position 71-1 of a circle that represents a hole machining position with the mouse 6305A and clicks the mouse button at the position so as to determine the hole machining position (see FIG. 72) at step 64-S5. Next, the designer selects a hole shape type of KCX (spot facing hole) from a hole shape menu (see FIG. 74) and parameters from a table shown in FIG. 75 so as to define a hole shape of FIG. 73 to be machined at the determined position at step 64-S6. Thereafter, the designer designates the sequence of machining steps, tool diameter, cutting amount, rotation of spindle, machining feed, and so forth so as to determine machining conditions of the determined hole machining shape at step 64-S7. Thus, the M/C machining data for the spot facing hole has been completely generated. When the M/C machining data is converted into NC data at step 64-S8, NC data commands for cutting the spot facing hole are output. Likewise, the spot facing holes 6208, 6209, and 6210 are defined.

Thereafter, the machining data for which the machining center (M/C) machines IH's for the through-shapes 6201, 6202, 6203, 6204, 6205, and 6206 are generated. In other words, as with the wire discharge machining data, the machining data is generated on the screen where the broken line frame 66-1 shown in FIG. 66 is enlarged. FIG. 76 shows the enlarged screen. The designer moves the cursor to the vicinity of a center position 76-1 of a circle that represents an IH with the mouse 6305A and clicks the mouse button so as to determine the hole machining position (see FIG. 77) at step 64-S9. Next, the designer selects a hole shape type of KDN (straight hole) from the hole shape menu screen (see FIG. 74) and parameters from the table shown in FIG. 79 so as to define a hole shape shown in FIG. 78 to be machined at the determined position at step 64-S10. Thereafter, the designer determines machining conditions corresponding to the determined hole machining shape at step 64-S11. Thus, the data for which the IH is machined by the M/C has been completely generated. When the M/C machining data is converted into NC data at step 64-S12, an NC data command for cutting an IH necessary for machining the through-shape 6201 with the wire electric discharge machine is output. Likewise, IH's for the through-shapes 6202, 6203, 6204, 6205, and 6206 are defined. In an apparatus that is disclosed in for example Japanese Patent Laid-Open Publication No. 2-257203, machining information for wire discharge machining IHs is read along with other machining positions and thereby an NC program for a machining center is automatically generated.

In the above-described prior art reference, the M/C machining NC data generating CAD/CAM apparatus 6300A generates "M/C machining NC data" and "wire prepared hole machining NC data", whereas the wire machining NC data generating CAD/CAM apparatus 6300B generates "wire machining NC data". Thus, as the number of different machines increases, the number of types of NC data to be created increase. Thus, labor work increases, thereby preventing the CAD/CAM system from automatically operating.

SUMMARY OF THE INVENTION

The present invention is to solve the above-described problem. An object of the present invention is to provide a CAD/CAM apparatus that reduces labor work and automatically operates.

A first aspect of the present invention is a CAD/CAM apparatus, comprising a storing means for dividing product graphic data into element data such as a line, an arc, a point, and a circle and for storing the element data, a plurality of two-dimensional machining definition tables for extracting the element data stored in the storing means and for defining the extracted element data as a two-dimensional machining shape, a three-dimensional machining definition table for combining the plurality of two-dimensional machining definition tables and for defining the selected two-dimensional machining definition table as a three-dimensional machining shape, a plurality of machining condition storing means for storing machining conditions corresponding to a plurality of machines, an attribute defining means for adding data representing a machining feature to the element data, and a means for generating NC data intrinsic to the machines or NC source data corresponding to a combination of the plurality of two-dimensional machining definition tables or the three-dimensional machining definition table and the machining condition data of the plurality of machining condition storing means.

A second aspect of the present invention is a CAD/CAM apparatus, comprising a storing means for dividing product graphic data into element data such as a line, an arc, a point, and a circle and for storing the element data, a plurality of two-dimensional machining definition tables for extracting the element data stored in the storing means and for defining the extracted element data as a two-dimensional machining shape, a plurality of machining condition storing means for storing machining conditions corresponding to a plurality of machines, an attribute defining means for adding data representing a machining feature to the element data, and a means for generating NC data intrinsic to the machines or NC source data corresponding to a combination of the plurality of two-dimensional machining definition tables and the machining condition data of the plurality of machining condition storing means.

A third aspect of the present invention is a CAD/CAM apparatus, comprising a storing means for dividing product graphic data into element data such as a line, an arc, a point, a circle, a prism, and a sphere and for storing the element data, a plurality of machining condition storing means for storing machining conditions corresponding to a plurality of machines, an attribute defining means for adding data representing a machining feature to the element data, and a means for generating NC data intrinsic to the machines or NC source data corresponding to a combination of the element data of the storing means and the machining condition data of the plurality of machining condition storing means.

A fourth aspect of the present invention is a CAD/CAM apparatus as set forth in the first, second, or third aspect of the present invention, further comprising a means for determining the size of a machining shape, and a means for automatically determining prepared hole shape data corresponding to the size of the machining shape.

A fifth aspect of the present invention is a CAD/CAM apparatus as set forth in the fourth aspect of the present invention, further comprising a means for registering a prepared hole shape, and a means for determining whether or not the registered prepared hole shape interferes with and is larger than the machining shape so as to determine whether or not to use the registered prepared hole shape corresponding to the determined result, and whether or not to automatically generate the prepared hole shape corresponding to the size of the machining shape.

A sixth aspect of the present invention is a CAD/CAM apparatus as set forth in the first, second, or third aspect of the present invention, further comprising a means for determining an initial hole position for a wire electric discharge machine, and a means for automatically defining the initial hole position as a machining position of an engraving discharge machine.

A seventh aspect of the present invention is a CAD/CAM apparatus as set forth in the first, second, or third aspect of the present invention, further comprising a means for determining an initial hole position for a wire electric discharge machine, and a means for automatically defining the initial hole position as a hole position of a machining center.

An eighth aspect of the present invention is a CAD/CAM apparatus as set forth in the first, second, or third aspect of the present invention, further comprising a means for recognizing an omitted cut shape corresponding to the generated NC data or NC source data, a means for automatically defining the omitted cut shape as a machining shape for an engraving discharge machine, and a means for automatically determining an electrode for machining the omitted cut shape.

A ninth aspect of the present invention is a CAD/CAM apparatus as set forth in the first, second, or third aspect of the present invention, further comprising a means for recognizing an omitted cut shape corresponding to the generated NC data or NC source data, and a means for automatically defining the omitted cut shape as a machining shape for a grinding machine.

A tenth aspect of the present invention is a CAD/CAM apparatus as set forth in the first, second, or third aspect of the present invention, further comprising a means for determining to what machine the NC data or NC source data that has been defined is output, and a means for automatically determining a machining condition corresponding to the type of the machine to which the NC data or NC source data has been output, a workpiece to be machined, and the type of a tool to be used.

An eleventh aspect of the present invention is a CAD/CAM apparatus, comprising a means for determining the position of a feature of product graphic data, a means for automatically defining the feature position data as machining position data for a machining center, a means for automatically defining the feature position data as machining position data for a wire discharge machine, and a means for automatically defining the feature position data as machining position data for an engraving discharge machine.

Finally, a further aspect of the invention is the implementation of methods for attaining the first through eleventh aspects of the present invention.

BRIEF DESCRIPTION OF THE DRAWINGS

FIG. 10 is a schematic diagram showing wire discharge machining conditions according to the first embodiment of the present invention.

FIG. 15 is a schematic diagram showing M/C machining condition according to the first embodiment of the present invention.

FIG. 30 is a schematic diagram showing a machining process.

FIG. 47 is a schematic diagram showing machining conditions before automatic determination has been performed.

FIG. 48 is a schematic diagram showing machining conditions after automatic determination has been performed.

FIG. 53 is a schematic diagram showing a hole shape determining table.

FIG. 59 is a schematic diagram showing data stored in the data memory in the case that hole positions are automatically defined as engraving discharge machining positions.

DESCRIPTION OF THE PREFERRED EMBODIMENTS

Figure 1:
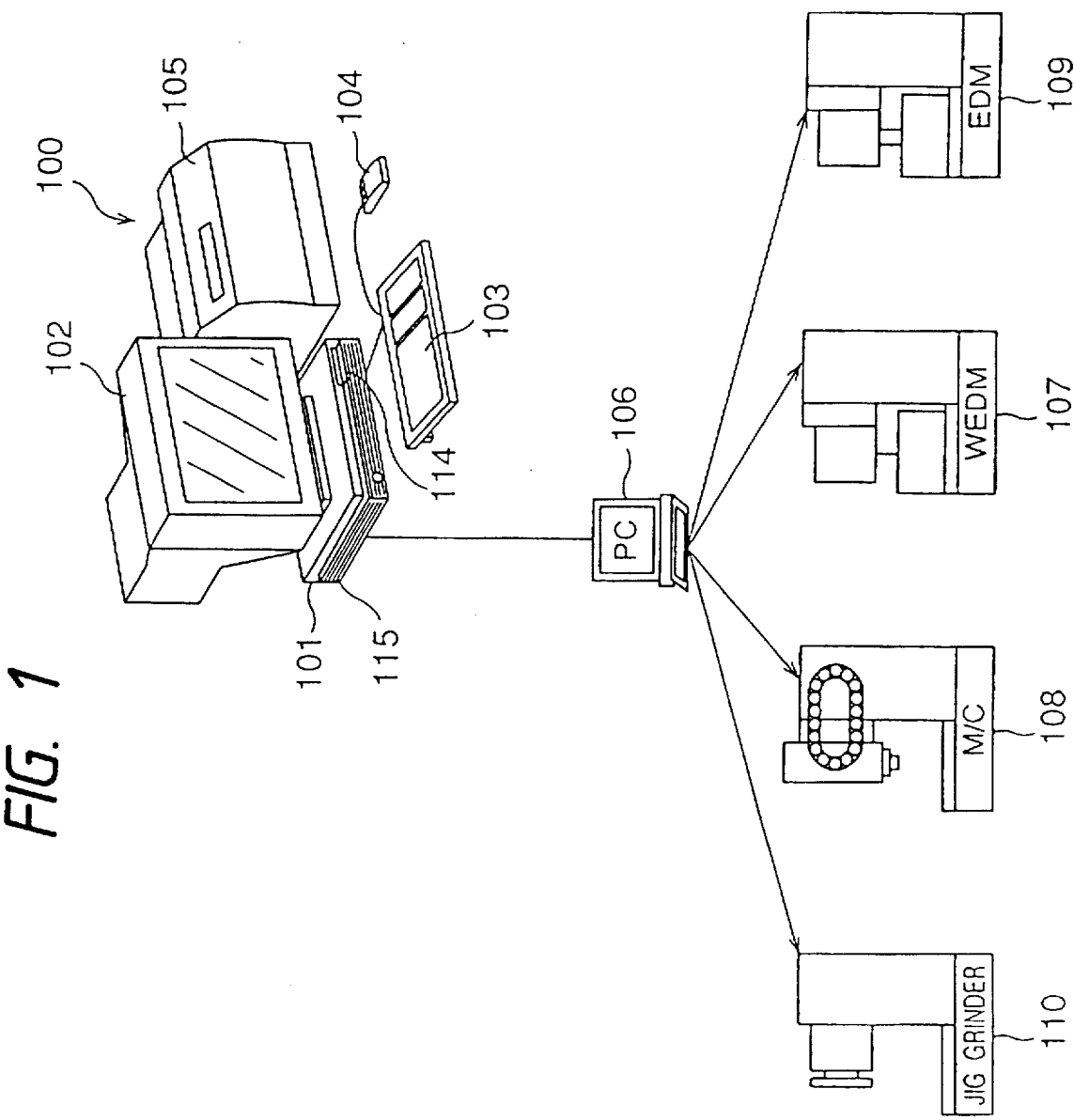
FIG. 1 is a schematic diagram showing the overall construction of a CAD/CAM apparatus for generating NC data according to the present invention.

According to the CAD/CAM apparatus of the present invention, product graphic data is converted into elements such as lines and arcs and then stored. If a machine travels on a two-dimensional plane, data of predetermined two-dimensional machining shapes is extracted from the stored elements and then defined. If a machine travels in a three-dimensional space, data of three-dimensional machining shapes is generated from the two-dimensional machining shape data and then defined. NC data intrinsic to a machine or NC source data is generated corresponding to two-dimensional machining shape data with machining features or three-dimensional machining shape data and machining conditions. Thus, since machining shapes can be defined regardless of the machine type, a machining shape defined for a machine can be referenced by another machine so as to define machining conditions.

According to the CAD/CAM apparatus of the present invention, if a machine travels on a two-dimensional plane, data of two-dimensional machining shapes is extracted from elements such as lines and arcs extracted from product graphic data and then defined. NC data intrinsic to a machine or NC source data is generated corresponding to a combination of two-dimensional machining shape data with machining features and machining conditions. Thus, machining shapes are defined regardless of the type of a machine such as a wire discharge machine and a laser machine. Thus, a machining shape defined for the wire discharge machine or the like can be referenced by the laser machine or the like so as to define machining conditions.

According to the CAD/CAM apparatus of the present invention, NC data intrinsic to a machine or NC source data is generated corresponding to a combination of machining conditions where machining features are added to elements such as lines and arcs extracted from product graphic data. Thus, machining features and machining conditions are defined regardless of the machine type.

According to the CAD/CAM apparatus of the present invention, the size of machining shapes is determined and prepared hole machining shapes corresponding thereto are automatically determined.

According to the CAD/CAM apparatus of the present invention, it is determined whether or not a registered prepared hole shape interferes with a machining shape and the former is larger than the latter. If the registered prepared hole shape does not interfere with the machining shape, the registered prepared hole shape is used. If the registered prepared hole shape interferes with the machining shape, a prepared hole shape that fits into the machining shape is automatically generated.

According to the CAD/CAM apparatus of the present invention, initial hole positions of the wire discharge machine are used for machining positions of the engraving discharge machine.

According to the CAD/CAM apparatus of the present invention, initial hole positions of the wire discharge machine can be used for hole positions of the machining center.

According to the CAD/CAM apparatus of the present invention, when omitted cut shapes of a machine are machined by the engraving discharge machine, machining shapes are automatically defined and the shape of electrodes is automatically determined.

According to the CAD/CAM apparatus of the present invention, omitted cut shapes of a machine are automatically defined as machining shapes of the grinding machine.

According to the CAD/CAM apparatus of the present invention, machining conditions such as cut amount, finish relief, and spindle rotation are automatically determined corresponding to the workpiece to be machined, the type of a tool, and the type of the machine.

According to the CAD/CAM apparatus of the present invention, position data with features is determined from product graphic data and automatically defined as machining position data corresponding to the machine using the feature position data.

First Embodiment

Figure 2:
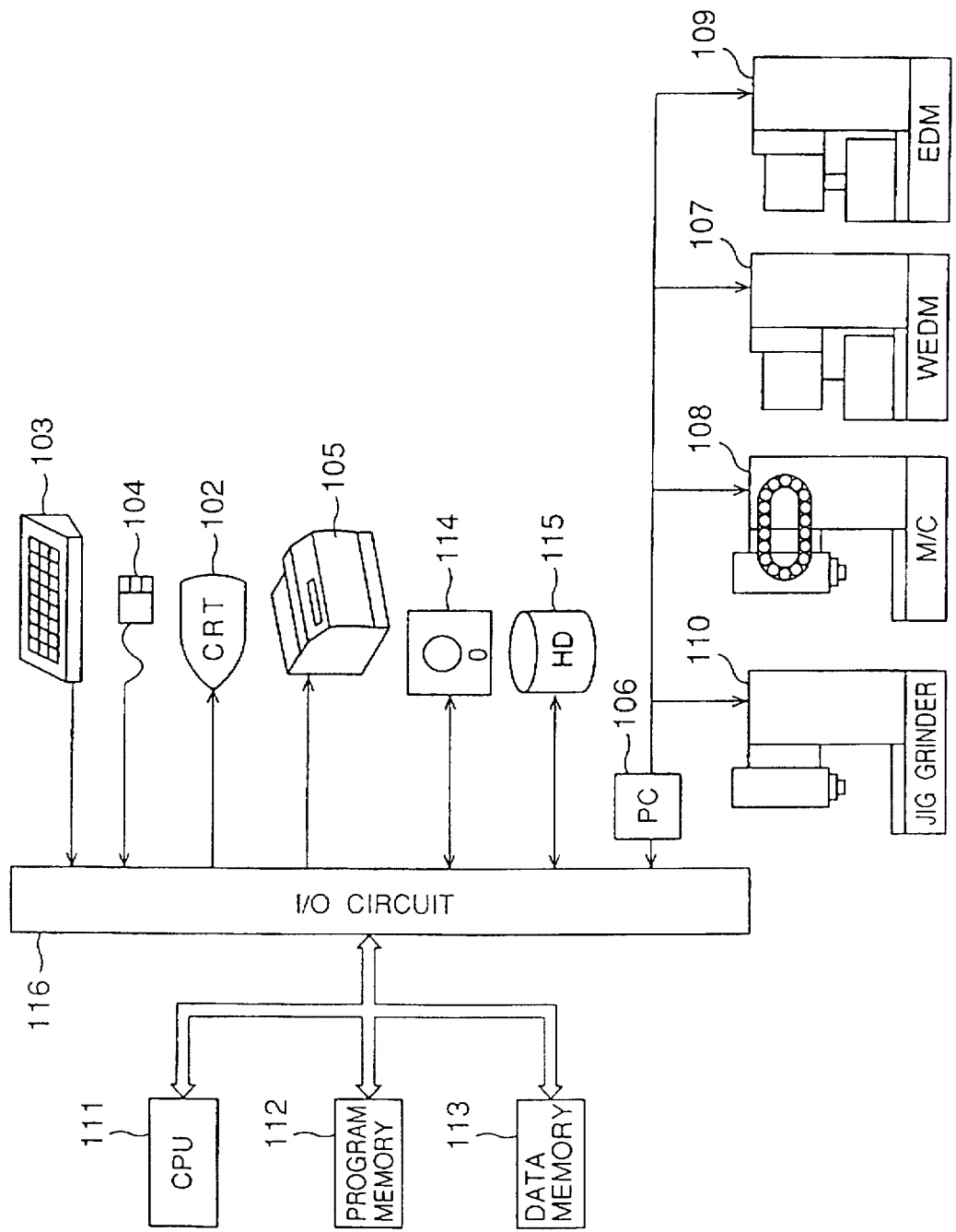
FIG. 2 is a block diagram showing a hardware construction of FIG. 1.

FIG. 1 is a schematic diagram showing a CAD/CAM apparatus according to the present invention. FIG. 2 is a block diagram showing the hardware of the CAD/CAM apparatus of FIG. 1.

A CAD/CAM apparatus 100 comprises a main body 101, a CRT display 102, a keyboard 103, a mouse 104, and a printer 105. The CAD/CAM apparatus 100 is connected to a wire discharge machine 107, a machining center (M/C) 108, an engraving discharge machine 109, a jig grinder 110 (which is a grinding machine), and so forth through a personal computer (PC) 106. The main body 101 comprises a computer (CPU) 111, a program memory 112, a data memory 113, and a FDD unit 114, a hard disk unit (HD) 115, and an I/O circuit 116.

Figure 3:
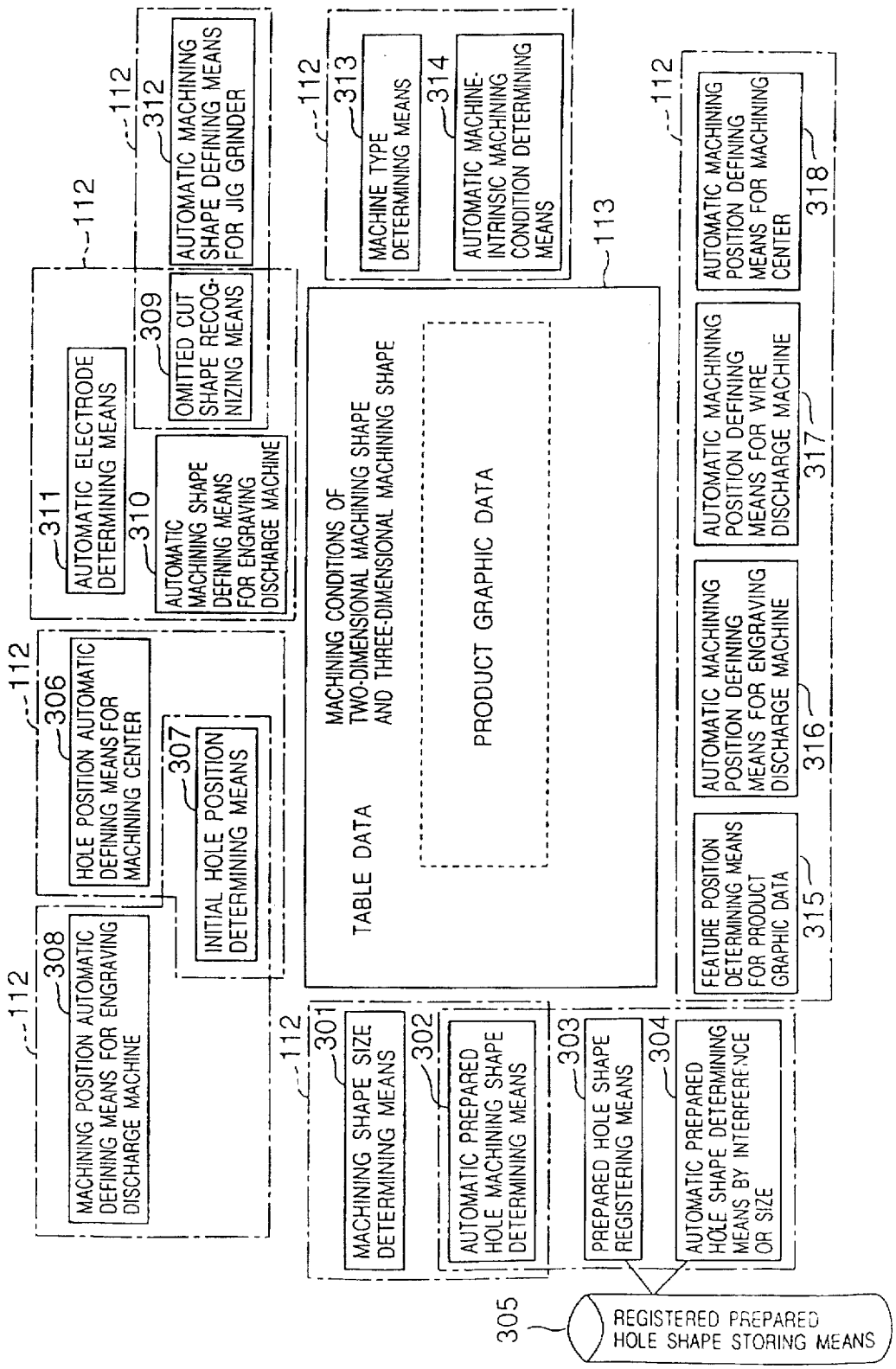
FIG. 3 is a schematic diagram showing a multiple machine inter-reference type data construction of a data storage portion (program memory and data memory) of the CAD/CAM apparatus.

FIG. 3 is a schematic diagram showing data stored in the program memory 112 and the data memory 113.

The data memory 113 has a product graphic data storage area and table data (such as two-dimensional machining shapes, three-dimensional machining shapes, and machining conditions) storage area.

The program memory 112 has areas for storing various programs, such as a machining shape size determining means 301, an automatic prepared hole machining shape determining means 302, a prepared hole shape registering means 303, an automatic prepared hole shape determining means 304 by interference or size, an automatic machining center hole position defining means 306, a wire discharge machine initial hole position determining means 307, an automatic engraving discharge machine machining position defining means 308, an omitted cut shape recognizing means 309, an automatic engraving discharge machine machining shape defining means 310, an automatic electrode determining means 311, an automatic jig grinder machining shape defining means 312, a machine type determining means 313, an automatic machine intrinsic machining condition determining means 314, a product graphic data feature position determining means 315, an automatic engraving discharge machine machining position defining means 316, an automatic wire discharge machine machining position defining means 317, and an automatic machining center machining position defining means 318, which will be described later.

A prepared hole shape stored in a registered prepared hole shape storing means 305 is stored in the HD 115, which is an external storing unit.

Figure 5:
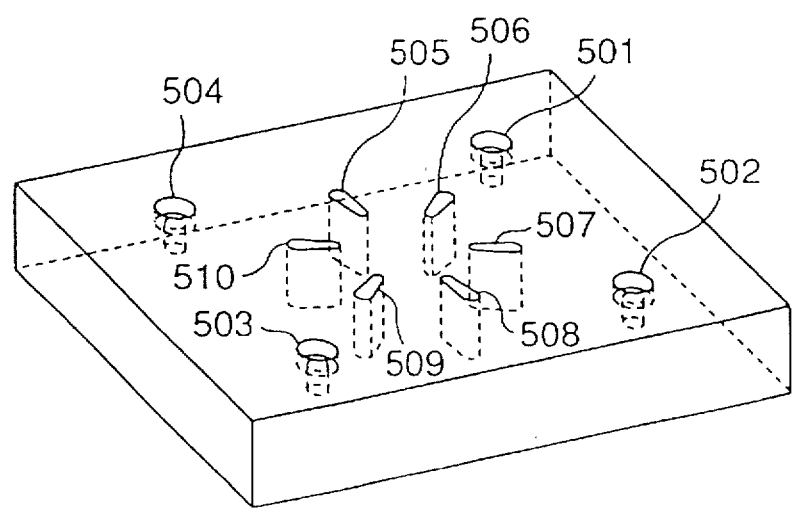
FIG. 5 is a schematic diagram showing an example of a product.
Figure 6:
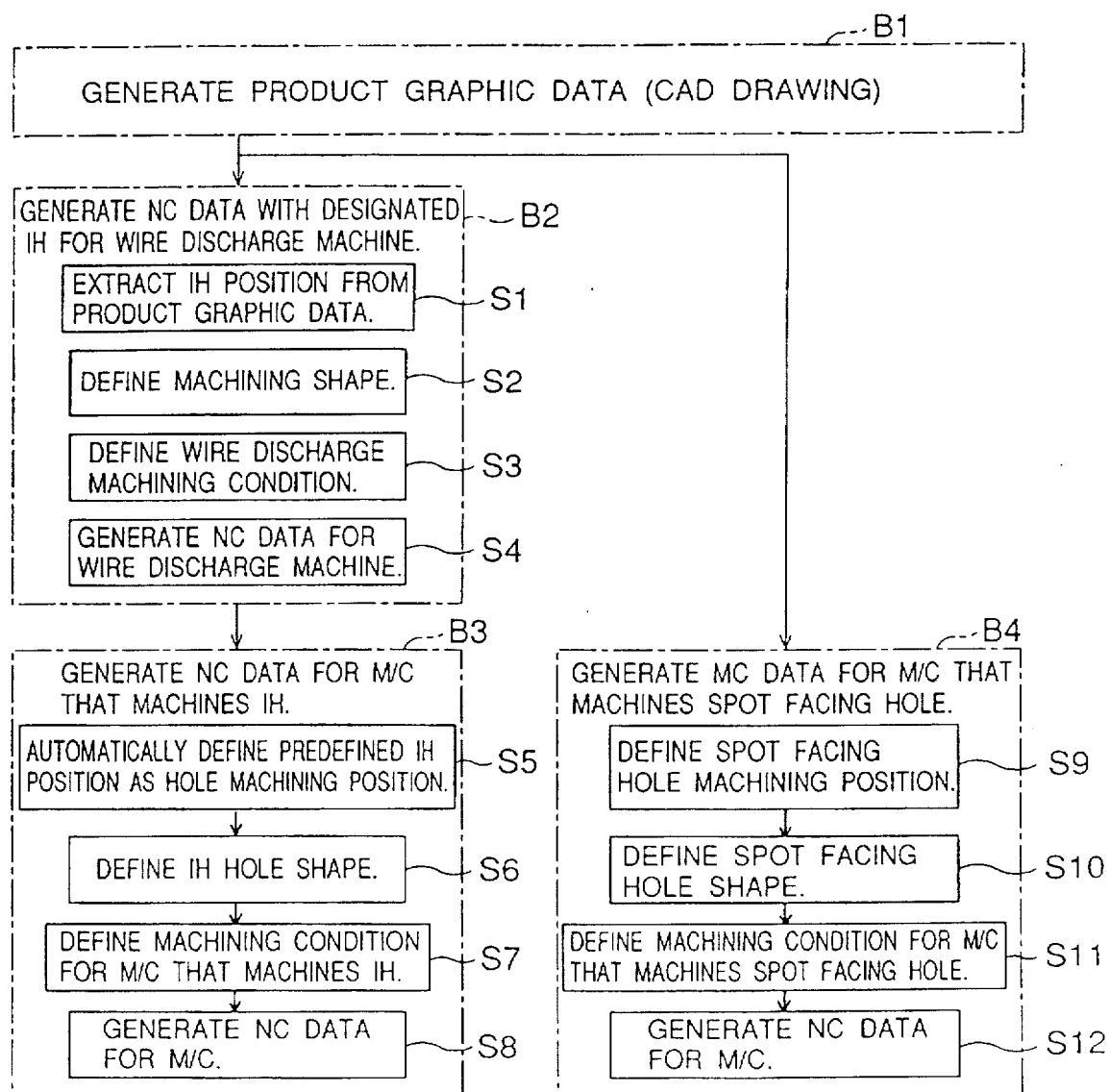
FIG. 6 is a flow chart according to a first embodiment of the present invention.

With reference to FIG. 6, an NC data generation process for machining a workpiece W (see FIG. 4) into a product (see FIG. 5) having four spot facing holes 501, 502, 503, and 504 and six through-shapes 505, 506, 507, 508, 509, and 510 will be described. This process is performed by the CAD/CAM apparatus 100.

Figure 7:
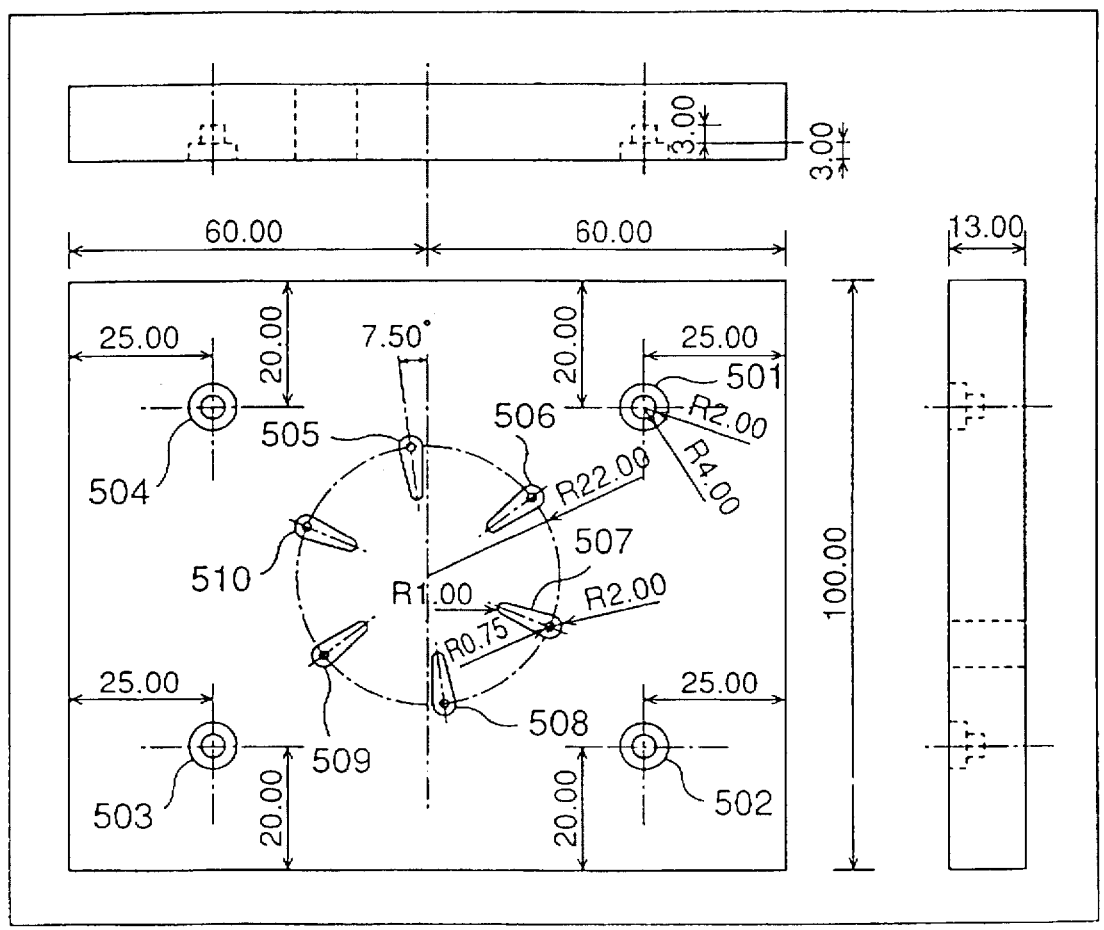
FIG. 7 is a schematic diagram showing a screen of a CRT display displaying product graphic data.

At block B1 of FIG. 6, product graphic data that will become an original drawing of the product is generated by the CAD/CAM apparatus 100. The product graphic data is stored in the data memory 113, which is an internal storing device. Alternatively, product graphic data is generated by a different CAD/CAM apparatus and then stored in the hard disk unit 115, which is an external storing unit. FIG. 7 is a schematic diagram showing the product graphic data displayed on the CRT display 102. However, in reality, the graphic data is divided into element type data (such as lines, arcs, points, circles, and dimension lines) represented by BD1 of FIG. 8 and element graphic information data (such as point coordinates, start and end points of segments, slopes, radii of circles, center positions, positions of dimension lines, and dimensional letters) and stored as small boxes (8-1 to 8-13).

Next, with the completed product graphic data, M/C machining NC data and wire discharge machining NC data are generated by the CAD/CAM apparatus 100. In reality, the product graphic data is output from the data memory 113, the hard disk unit 115, or the FDD unit 114 and displayed on the CRT display 102 as shown in FIG. 7. As with the conventional apparatus, in the process of block B2 (namely in the order of steps S1, S2, S3, and S4 of FIG. 6), wire discharge machining NC data of the through-shapes 505 to 510 are generated.

Also, in the process block B3, the NC data for M/C is generated in the order of steps S5 to S8 of FIG. 6, using the data from block B2. Finally, in the process block B4, the NC data for M/C that machines spot facing holes (501–504) is generated on the basis of the data generated in block BE, in the order of steps S9 to S12.

Figure 9:
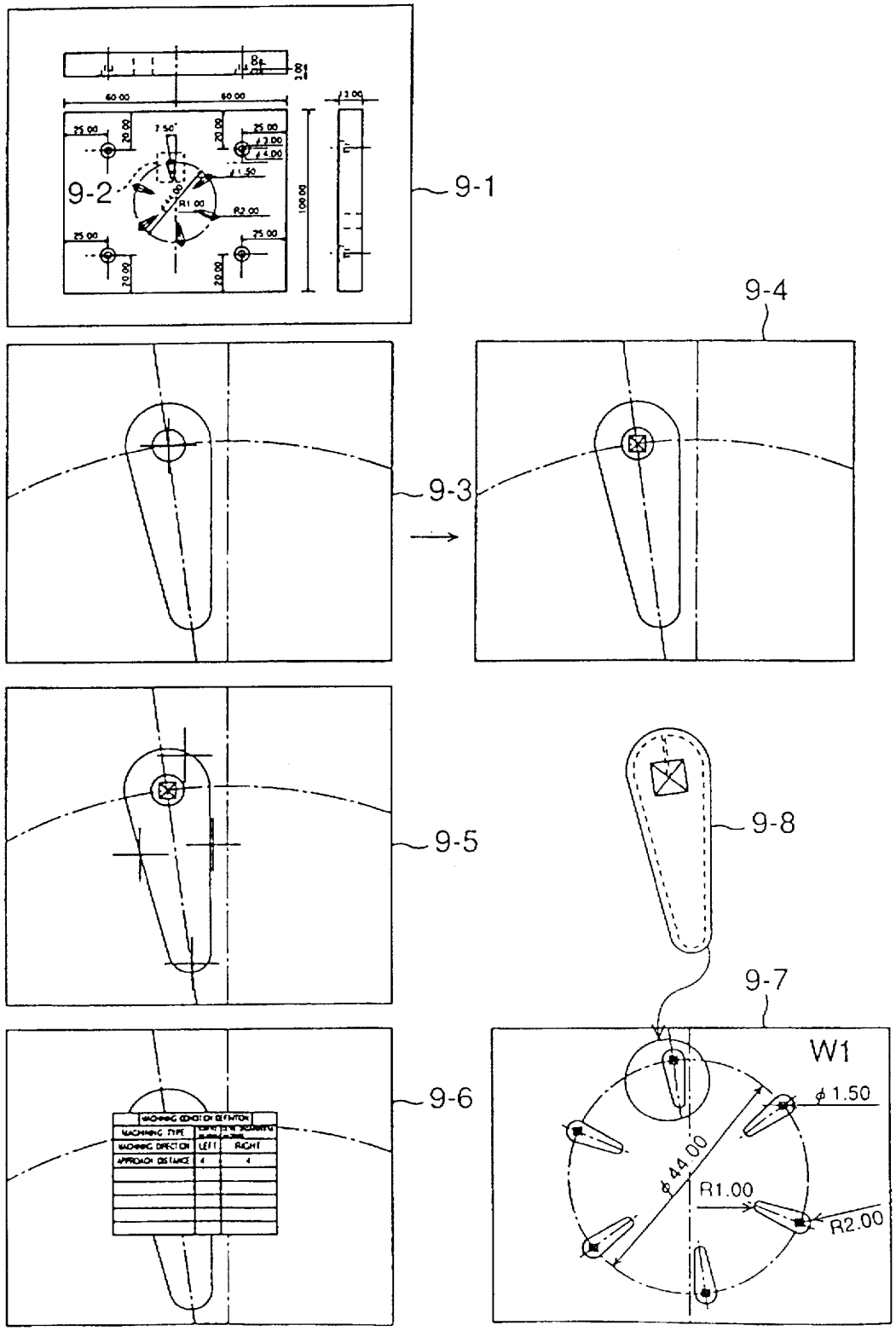
FIG. 9 is a schematic diagram showing a screen transition on the CRT display from definition of wire discharge machining shapes to NC data generation according to the first embodiment of the present invention.

FIG. 9 is a schematic diagram showing a screen transition on the CRT display 102 from definition of the wire discharge machining shape to NC data generation.

Reference numeral 9-1 indicates a screen displaying product graphic data. Reference numeral 9-2 is a broken line portion of the screen 9-1. Reference numeral 9-3 identifies a screen enlarging the broken line portion 9-2 where a cursor is moved to a designated IH position. Reference numeral 9-4 identifies a screen where a mark representing the IH is displayed. Reference numeral 9-5 identifies a screen where a wire discharge machining shape is designated by moving the cursor to four positions. Reference numeral 9-6 identifies a screen where wire discharge machining conditions are designated on a table. Reference numeral 9-7 identifies a screen where NC data of the wire discharge machining definition source data repeatedly defined for the through-shapes 505 to 510 is generated.

Figure 8:
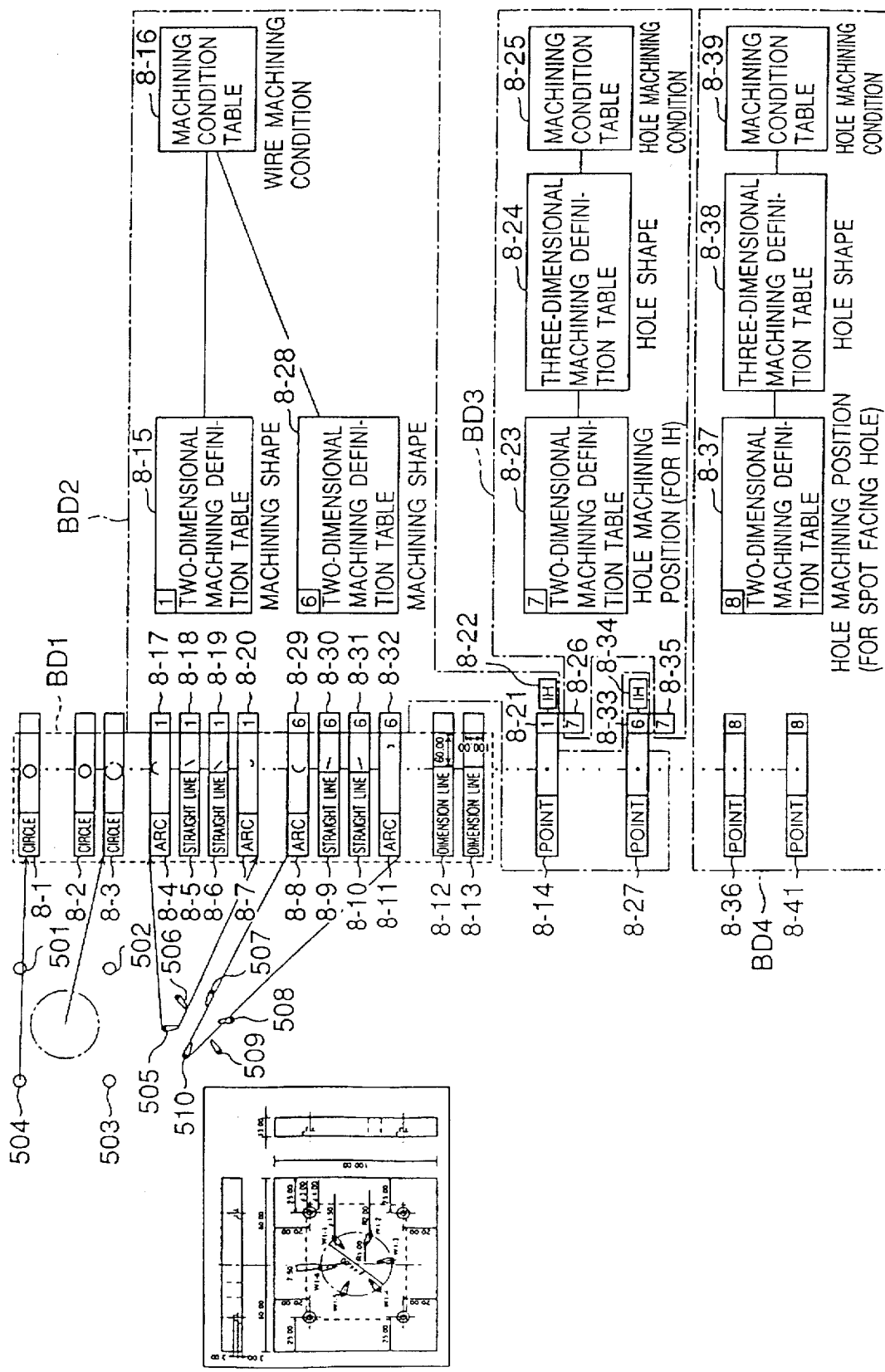
FIG. 8 is a schematic diagram showing data stored in the data memory according to the first embodiment of the present invention.

The wire discharge machining data generated at block B2 of FIG. 6 is stored in the data memory 113 as BD2 of FIG. 8. This data is stored in the following manner. When initial holes (IH's) into which the wire of the wire discharge machine 107 is inserted are generated, element data 8-14 and an attribute 8-22 that represents that the element data denoting the IH positions are connected and then stored. When a wire discharge machining shape is generated, a table 8-15 with table number 1 is generated for element data designated in the machining shape and then stored. The table 8-15 is a two-dimensional machining definition table for defining a two-dimensional machining shape. Each element data included in the table 8-15 stores the table number 1 (8-17, 8-18, 8-19, and 8-20) representing the relation thereof. At this point, the same table number 1 is stored in the element data 8-14 generated as the IH for the wire discharge machining. Thus, the wire discharge machining shapes (8-17, 8-18, 8-19, 8-20, 8-14, and 8-21) are grouped as a two-dimensional machining definition table 8-15. When wire discharge machining conditions are defined, a machining condition table 8-16 that is a machining condition storing means is generated and wire discharge machining conditions shown in FIG. 10 are stored therein. The two-dimensional machining definition table 8-15 is connected to the machining condition table 8-16.

Thus, the wire discharge machining NC data for the through-shape 505 has been completely stored. Likewise, NC data for the other through-shapes 506, 507, 508, 509, and 510 are generated and stored.

The wire discharge machining condition that was designated at step S3 is identified as W1 and displayed on the CRT display 102 as the screen 9-7 of FIG. 9.

When the machining conditions of the defined machining shape are the same, a plurality of machining definition tables are connected to one machining condition table. For example, when the machining condition of the wiring discharge machining for the through-shapes 505 to 510 is in common with W1 shown in FIG. 10, the two-dimensional machining definition table 8-15, which stores the shape of the through-shape 505, and the two-dimensional machining definition table 8-28, which stores the through-shape 510, are connected to the machining condition table 8-16, which stores the machining condition W1 (see FIG. 8).

When a plurality of machining shapes with the same machining condition are designated, identification names of the machining conditions that are followed by suffixes (such as −1, −2, . . . .) are displayed on the CRT display 102. Thus, the order of the machining shapes with the same machining conditions that were identified and defined is displayed on the CRT display 102.

Next, corresponding to each step of block B3 of FIG. 6, the process for generating machining data of IHs machined by the M/C 108 for the wire discharge machine will be described.

Figure 11:
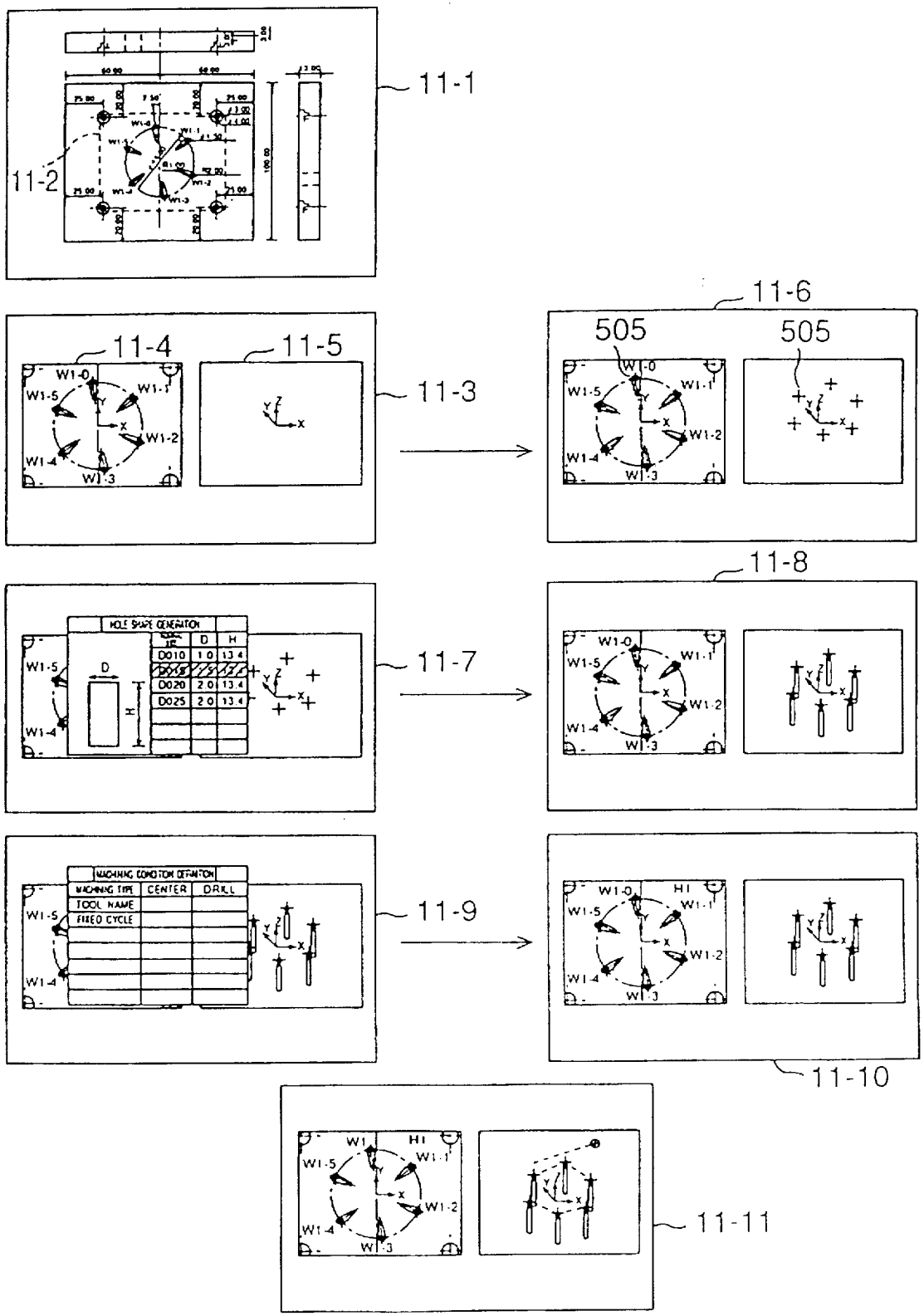
FIG. 11 is a schematic diagram showing a screen transition on the CRT display of Ihs for the wire discharge machine machined by an M/C for a wire discharge machine according to the first embodiment of the present invention.

FIG. 11 is a schematic diagram showing a screen transition on the CRT display 102 in the case that IHs into which the wire of the wire discharge machine 107 is inserted are machined by the M/C.

Reference numeral 11-1 indicates a screen displaying product graphic data. Reference numeral 11-2 is a broken line portion of the screen 11-1. Reference numeral 11-3 indicates a screen displaying both a screen 11-4 of an xy plane where the broken line portion 11-2 is enlarged and a screen 11-5 displaying an arrow view (at this point, the arrow view three-dimensionally shows the machining data with axes X, Y, and Z). Reference numeral 11-6 indicates a screen displaying the pre-defined IH positions automatically defined as the hole machining positions of the M/C. Reference numeral 11-7 indicates a screen displaying hole shapes machined at the hole machining positions defined on the screen 11-6 as hole shape designating table. Reference numeral 11-8 indicates a screen displaying the designated results. Reference numeral 11-9 indicates a screen displaying machining conditions of hole shapes defined with a machining condition designating table. Reference numeral 11-10 indicates a screen displaying the designated results of the screen 11-9. Reference numeral 11-11 indicates a screen displaying NC data generated for the hole machining data defined in the steps until the screen 11-10 is displayed.

Figure 12:
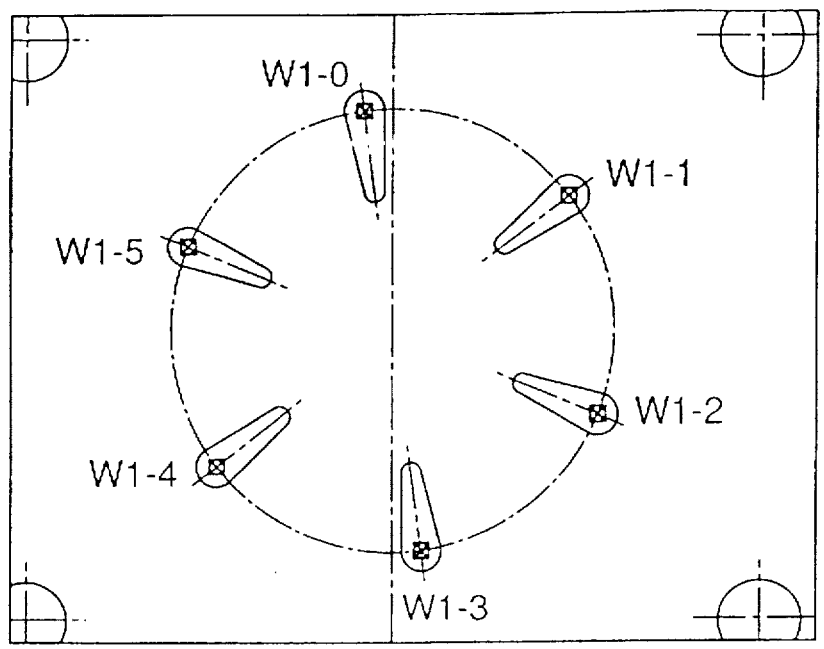
FIG. 12 is an enlarged view showing a broken line portion of product graphic data of a screen 11-1 of FIG. 11.

FIG. 12 is an enlarged view of the broken line portion of the product graphic data 11-1 shown in FIG. 11. In other words, FIG. 12 is a detail view of the screen 11-4.

Figure 13:
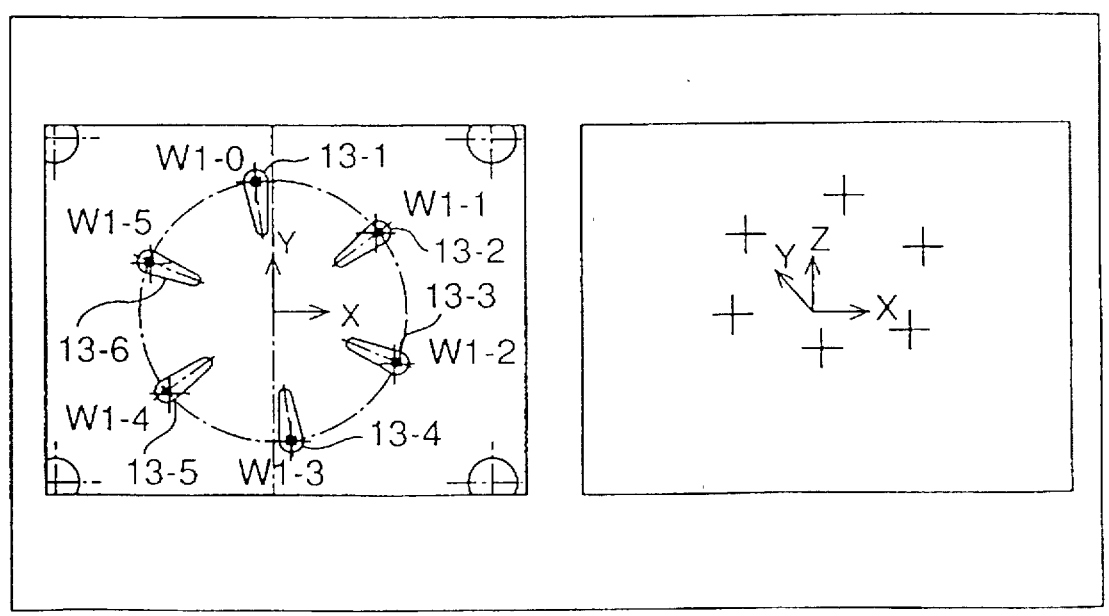
FIG. 13 is a detail view showing a screen 11-6 of FIG. 11.

FIG. 13 is a detail view of the screen 11-6 of FIG. 11.

Figure 14:
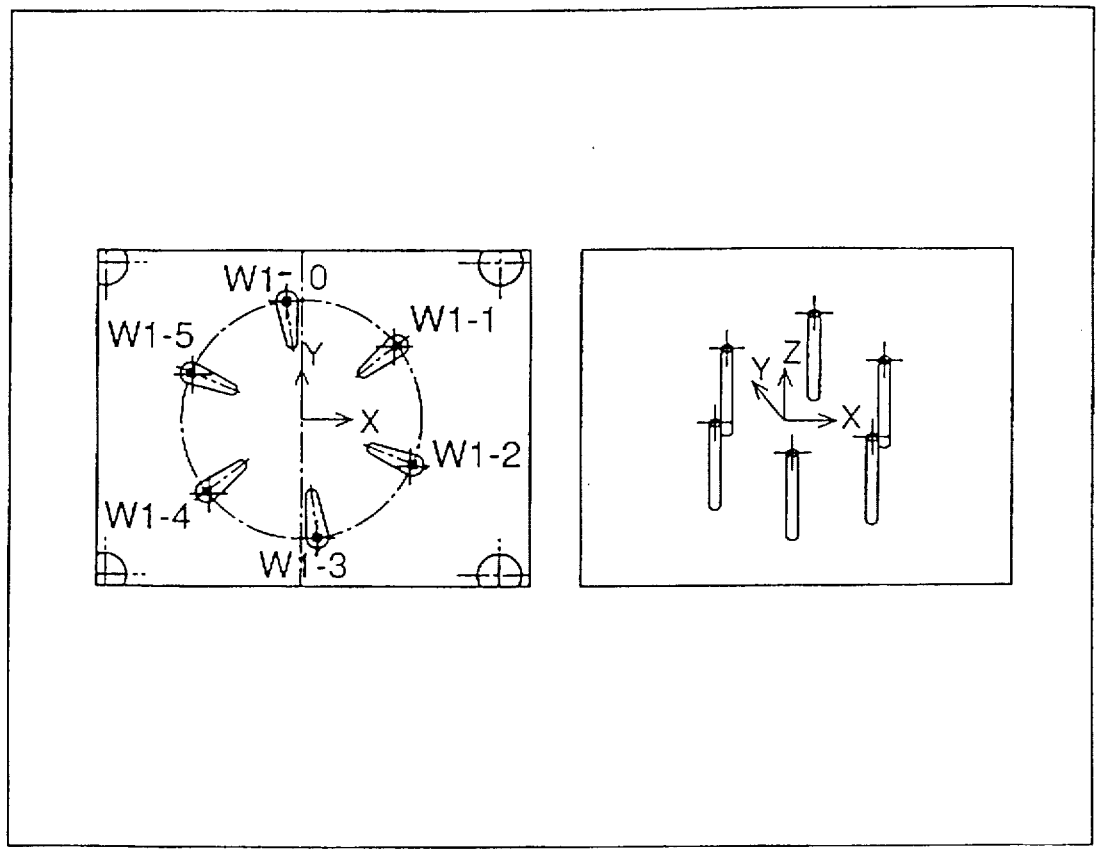
FIG. 14 is a detail view showing a screen 11-8 of FIG. 11.

FIG. 14 is a detailed view of the screen 11-8 of FIG. 11.

Figure 16:
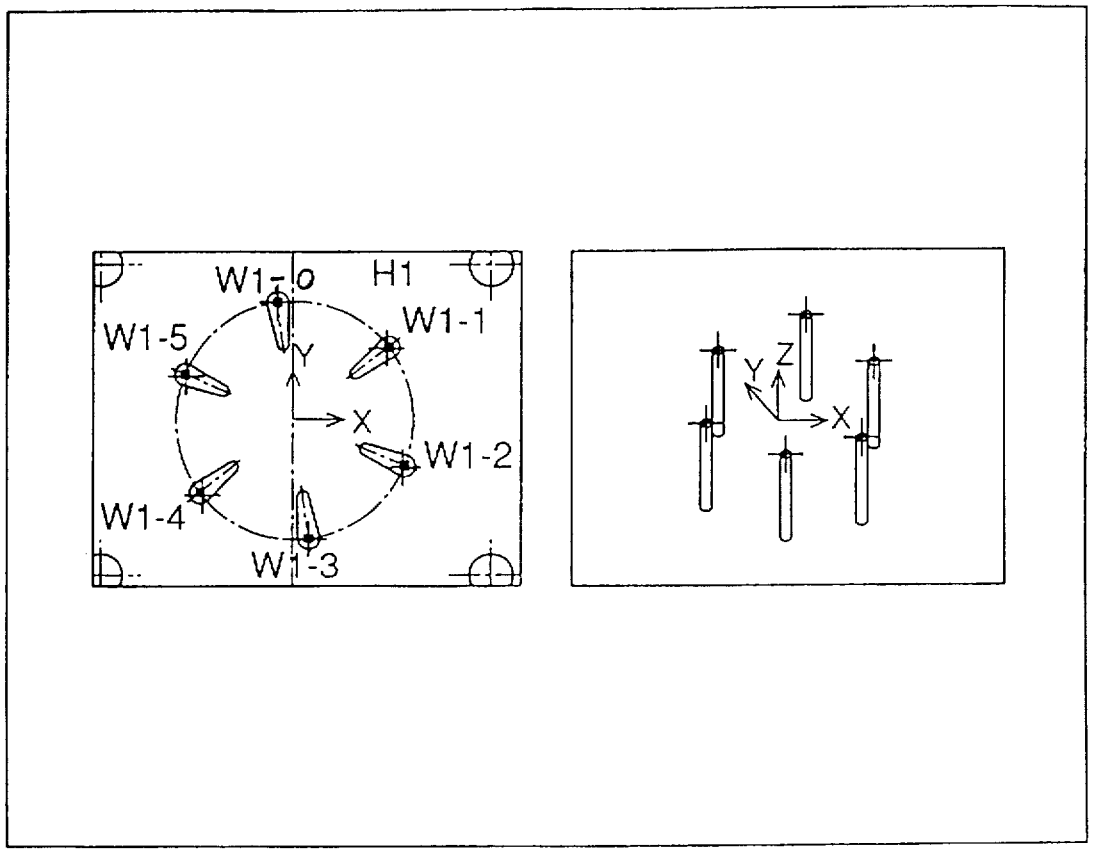
FIG. 16 is a detail view showing a screen 11-10 of FIG. 11.

FIG. 16 is a detailed view of the screen 11-10 of FIG. 11.

Next, this process will be described in detail.

At step S5, the initial hole position determining means 307 (FIG. 3) retrieves the IH positions, into which the wire of the wire discharge machine 107 is inserted, from data BD1 and BD2 (FIG. 8) stored in the data memory 113 (FIG. 2). The element data 8-14 to 8-27, which have an IH attribute, are retrieved from the wire discharge machining condition table 8-16 and the two-dimensional machining definition table 8-15 connected thereto. Information representing that the position of element data also denotes a hole machining position is added to element data that store the IH positions into which the wire of the wire discharge machine 107 is inserted. Thus, the IH positions for the wire discharge machine 113 are defined as hole machining position data have been completely stored in the data memory 113 at step S5. The hole machining position information being added is the two-dimensional machining definition table 8-23, which groups the hole machining positions shown in FIG. 8, and the table number 7 (8-26, ...., 8-35) stored in element data with an IH attribute. Thus, the automatic machining center hole position definition means 306 (see FIG. 3) stored in the program memory 112 automatically generates the hole machining positions for the M/C 108 that machines the IH positions for the wire discharge machine 107. Thus, as shown in FIG. 13, the automatically generated hole machining positions are displayed on the CRT display 102 with "+" marks.

Consequently, at step S5, hole machining positions for the M/C that machines the IH positions for the wire discharge machining apparatus can be automatically designated unlike with the conventional apparatus, which requires manual operation.

Figure 74:
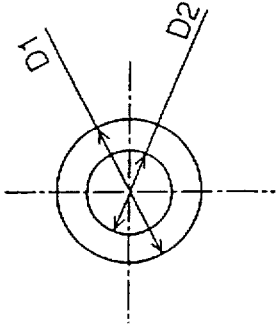
FIG. 74 is a schematic diagram showing a hole shape menu screen for defining a spot facing hole of FIG. 73.
Figure 75:
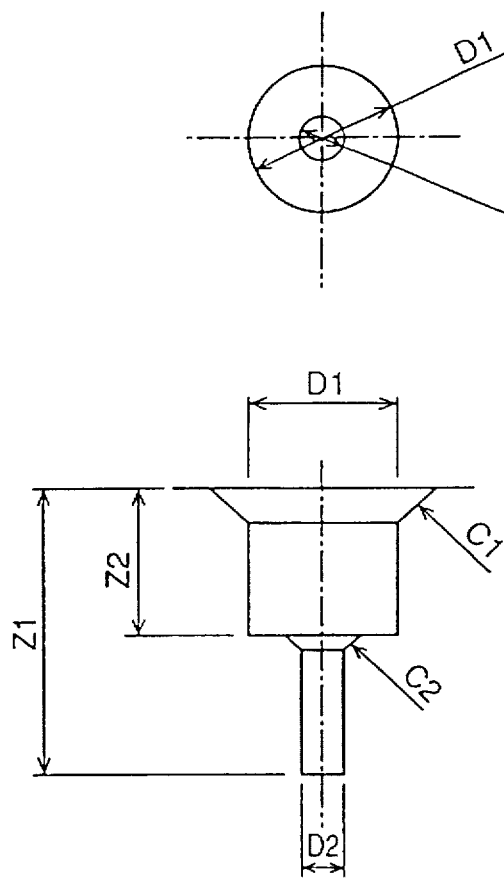
FIG. 75 is a schematic diagram showing a parameter table for defining the spot facing hole of FIG. 73.
Figure 76:
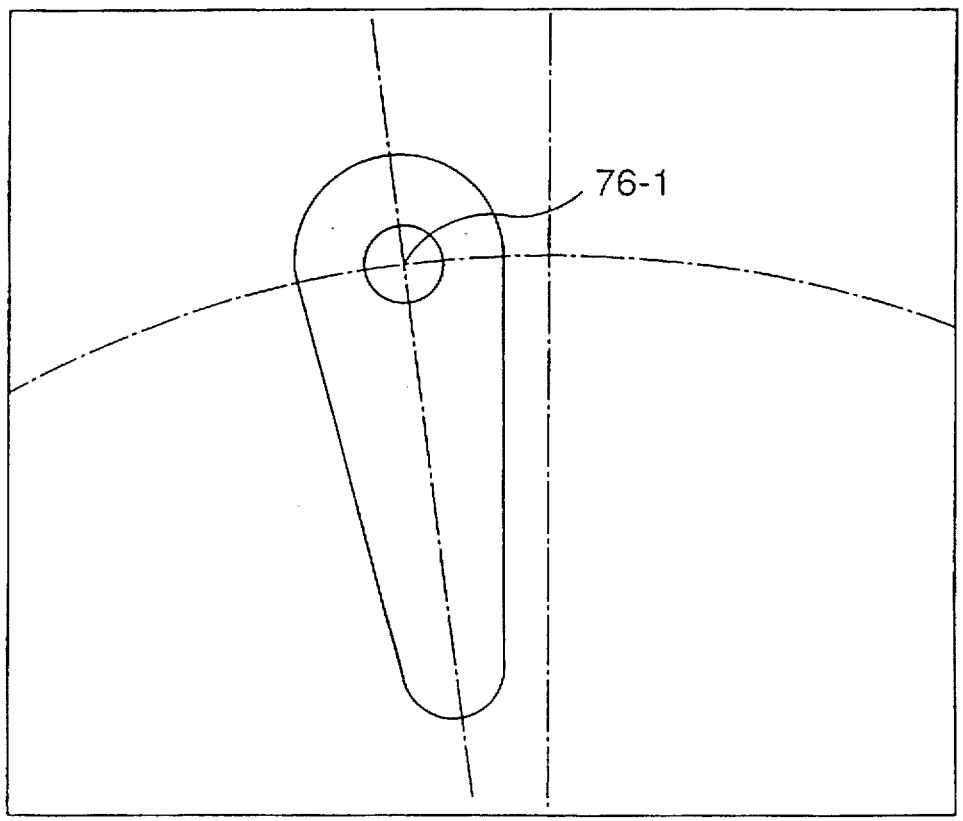
FIG. 76 is an enlarged view showing a broken line frame 66-1 of FIG. 66.
Figure 77:
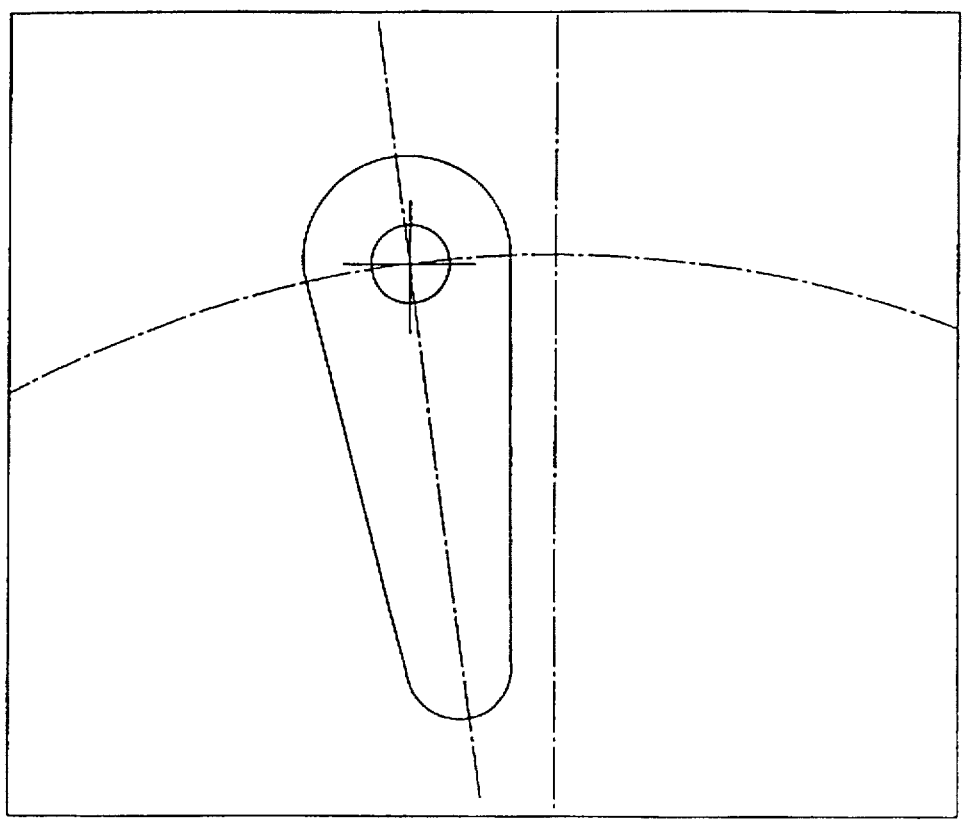
FIG. 77 is a schematic diagram showing a screen when the cursor is moved to the vicinity of the center position of a circle and the mouse button is clicked.
Figure 78:
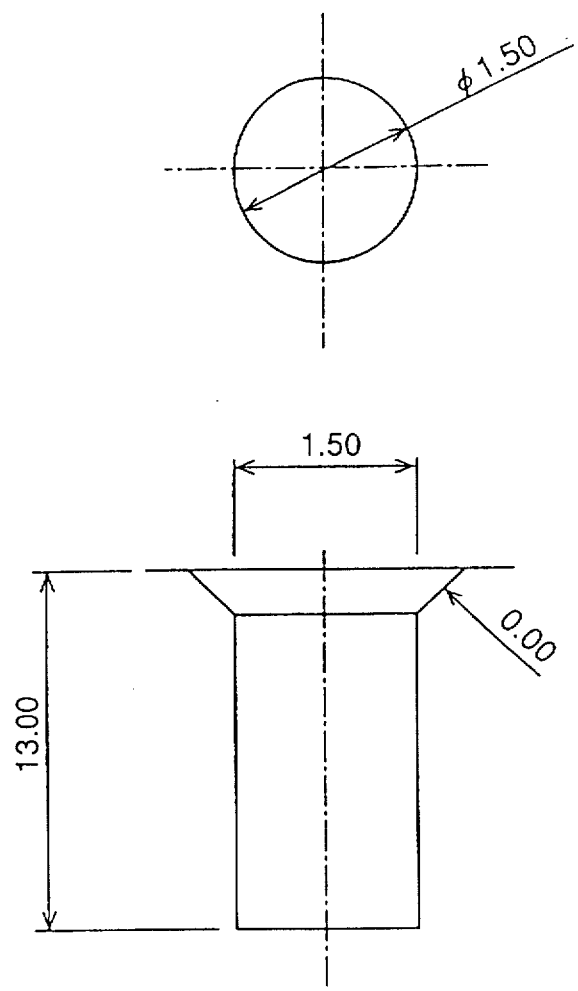
FIG. 78 is a schematic diagram showing a spot facing hole.

Next, as with the prior art reference, at step S6, the shapes of the holes machined at the hole machining positions generated at step S5 are designated. In reality, a hole shape type of KDN (straight hole) is selected from the hole shape menu screen (see FIG. 74) and parameters from the table shown in FIG. 79 so as to define the hole shapes (see FIG. 78) machined at the hole machining positions 13-1 to 13-6 (see FIG. 13) automatically generated at step S5.

The hole shapes depend on shape types (such as KDN (straight hole)) and variation dimensions that can be designated corresponding to the shape types. In other words, the hole shapes depend on D1, C1, and Z1 of FIG. 79. In reality, the hole shapes are uniquely designated by shape names and nominal sizes.

Figure 79:
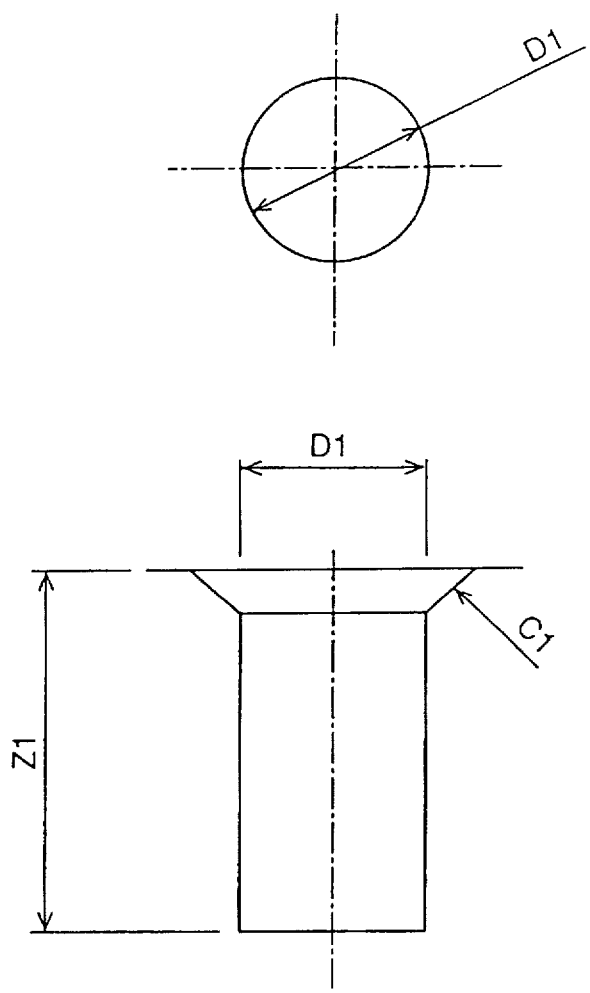
FIG. 79 is a schematic diagram showing a parameter table for defining the spot facing hole of FIG. 78.

The shape names and nominal sizes that designate the straight holes shown in FIG. 79 are stored in the three-dimensional machining definition table 8-24 shown in FIG. 8. At step S5, they are connected to the two-dimensional machining definition table 8-23, which stores the hole machining position information.

The M/C hole machining data for the M/C that machines the Ihs into which the wire of the wire discharge machine 107 is inserted is generated at block B3 of FIG. 6 is stored in the data memory 113 as denoted by BD3 of FIG. 8.

The hole shapes designated at step S6 are displayed on the CRT display 102 with an arrow view shown in FIG. 14.

As with the prior art reference, at step S7, machining conditions such as machining steps and feed speeds for the hole machining shapes disposed at the hole machining positions 13-1 to 13-6 (FIG. 13) determined at step S6 are designated on a machining condition table shown in FIG. 15. The machining conditions are stored in the machining condition table 8-25 shown in FIG. 8.

The hole machining conditions designated at step S7 are displayed on the CRT display 102 with an identification H1 as shown in FIG. 16.

NC data is generated with source hold machining data designated and stored as described above at step S8. The machining sequence of the generated NC data is displayed on the screen 11-11 of FIG. 11.

Figure 64:
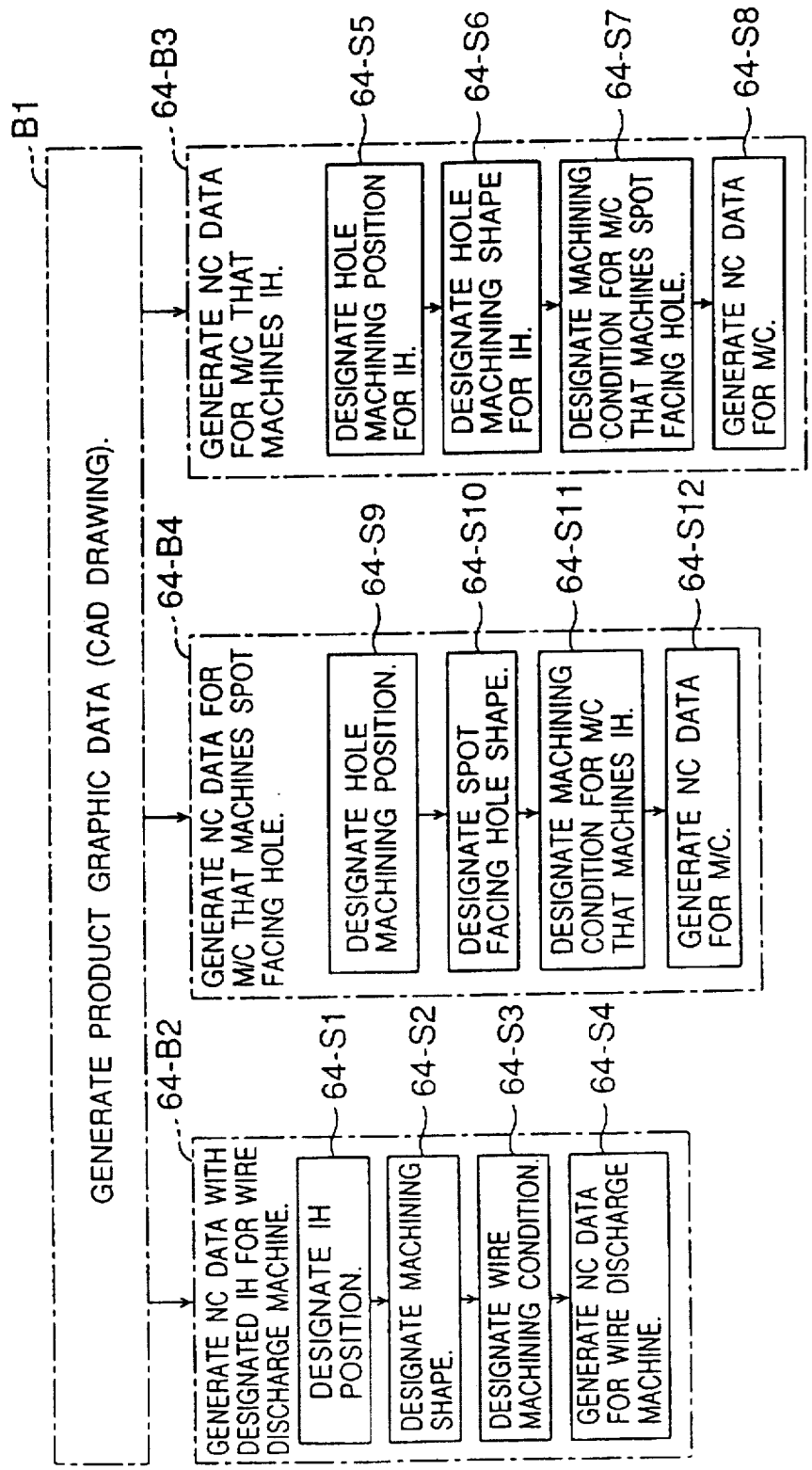
FIG. 64 is a flow chart showing a process of the conventional CAD/CAM apparatuses for generating wire discharge machining NC data and machining center machining NC data.
Figure 65:
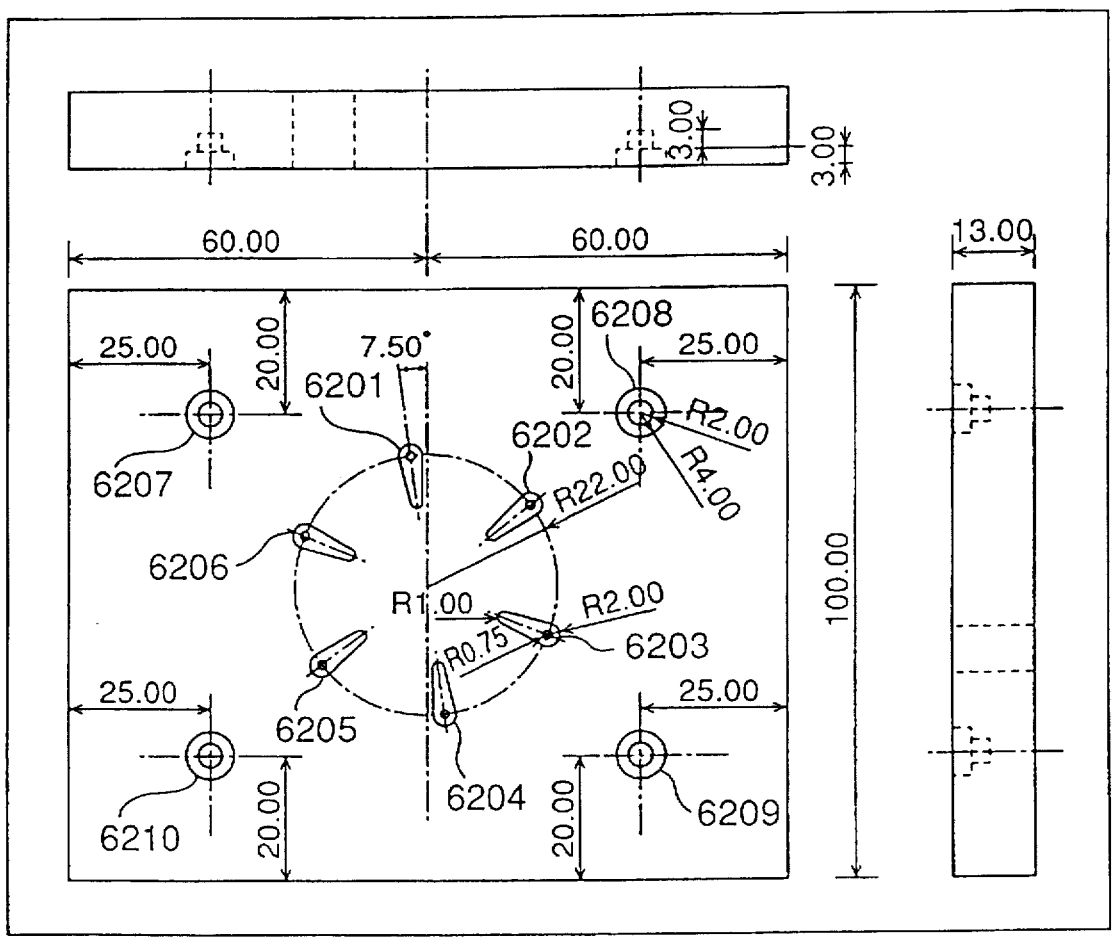
FIG. 65 is a schematic diagram showing the product graphic data of FIG. 62 displayed on the CRT display.

On the other hand, the designer creates the spot facing holes 501 to 504 with the two-dimensionally decomposed data BD1 (see FIG. 8) on the screen (FIG. 7) defined at blocks B1, B2, and B3 in the conventional procedure (steps 64-S9 to 64-S12 of FIG. 64) at steps S9 to S12.

As shown in FIG. 8, the created data is stored as 8-36 to 8-41 of BD4 in the same manner as BD3.

The product graphic data generated at block B1 of FIG. 6 is stored as BD1 of FIG. 8. The machining data generated at block B2 is stored as BD2. The machining data generated at block B3 is stored as BD3. The machining data generated at block B4 is stored as BD4.

Figure 17:
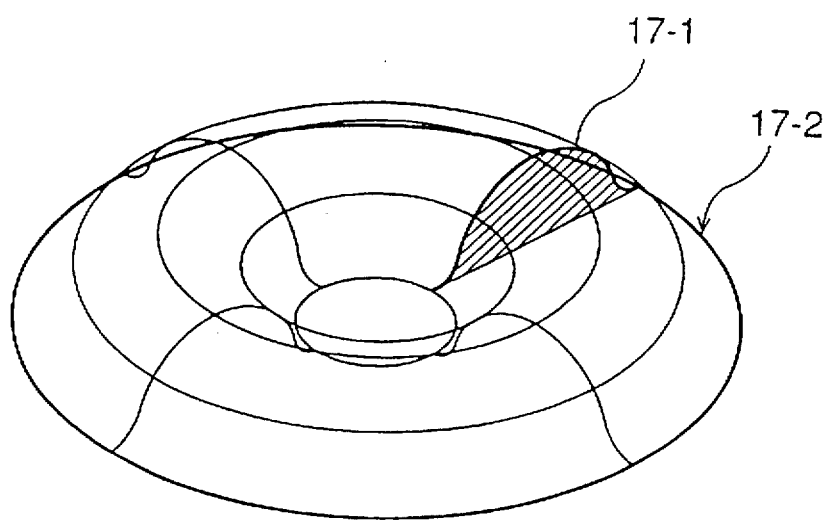
FIG. 17 is a schematic diagram showing another product according to the first embodiment of the present invention.
Figure 18:
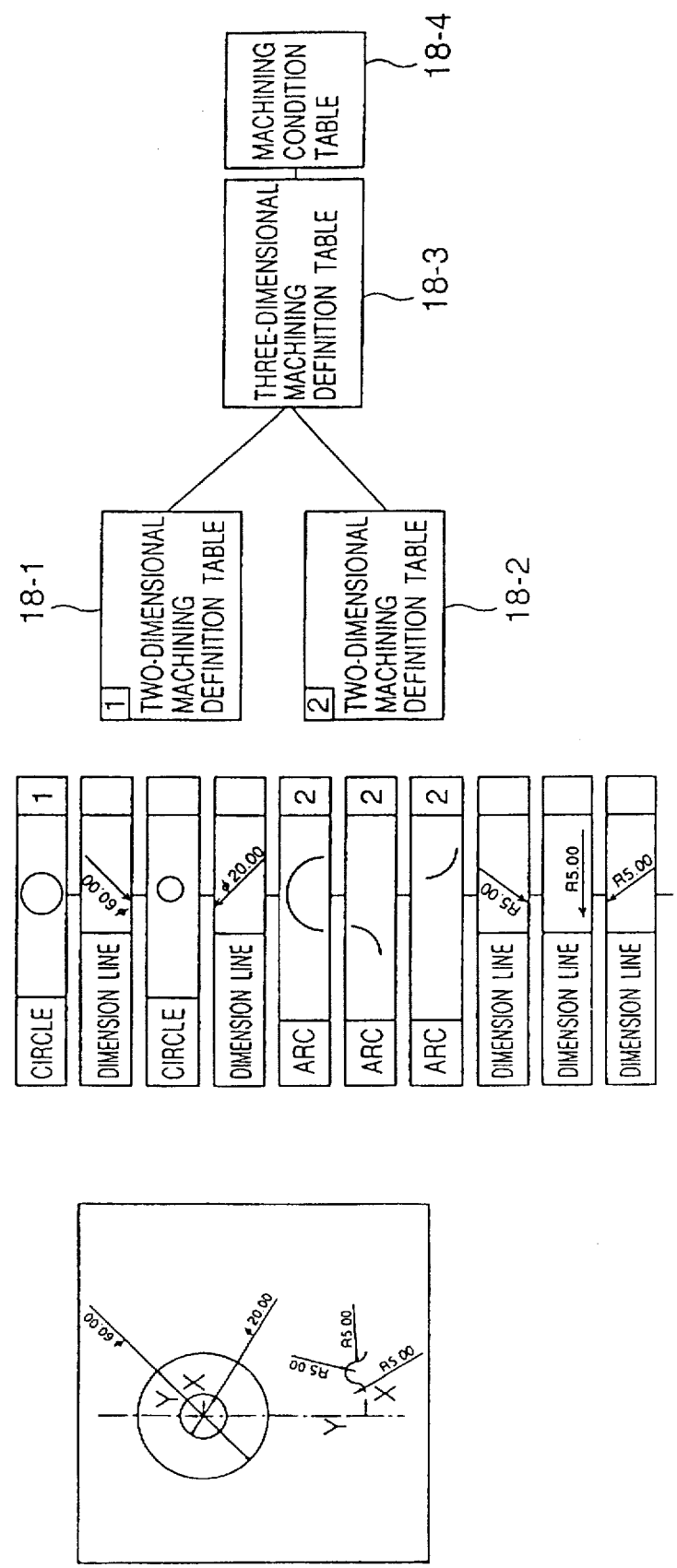
FIG. 18 is a schematic diagram showing machining data decomposed from product graphic data of FIG. 17 and stored in the data memory.
Figure 19:
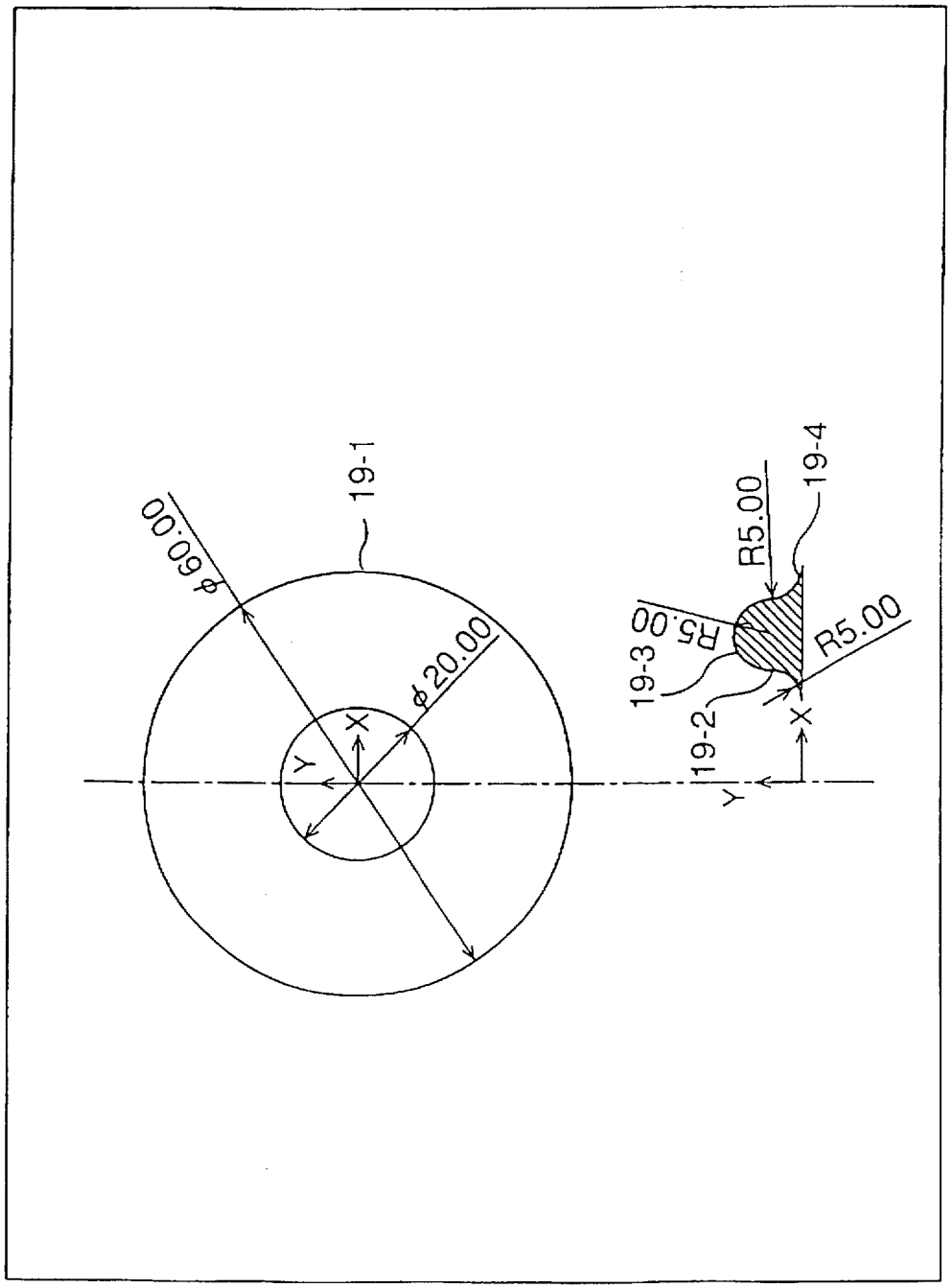
FIG. 19 is a schematic diagram showing a screen of the product graphic data of FIG. 17 displayed on the CRT display.

In this embodiment, as shown in FIG. 8, the hole machining positions of the three-dimensional machining shapes machined by the M/C are stored in the two-dimensional machining definition table 8-23 and the shape names and nominal sizes are stored in the three-dimensional machining definition table 8-24. In the case that a shape is designated by a shape name (namely, a hole shape name) and a solid shape is designated by a nominal size (namely, parameters such as D1, Z1, and C1) and a hole shape name, solid information composed of a shape name and numeric values is stored in the three-dimensional machining definition table 8-24. However, in the case of a solid shape shown in FIG. 17, data information shown in FIG. 18 is stored in the three-dimensional machining definition table 8-24. In reality, since a solid shape can be defined as a three-dimensional shape formed by rotating a sectional shape 17-1, a shape constructed of a circle element 19-1 of product graphic data (FIG. 19) is treated as a two-dimensional machining shape and stored in the two-dimensional machining definition table 18-1. A sectional shape constructed of elements 19-2, 19-3, and 19-4 is treated as a two-dimensional machining shape and stored in the two-dimensional machining definition table 18-2. A solid shape is formed of the two-dimensional machining shape data stored in the tables 18-1 and 18-2. A three-dimensional machining definition table 18-3 that connects the two-dimensional machining shapes is prepared and the relation representing that the two-dimensional machining shape is solid of revolution is stored therein.

The three-dimensional definition table 18-3, which stores the three-dimensional machining shape, is connected to a machining condition table 18-4 and stored in the condition shown in FIG. 18 in the data memory 113 shown in FIG. 8.

As described above, when a three-dimensional shape is a machining shape, a three-dimensional machining definition table is required. On the other hand, when a machining shape is a two-dimensional shape as in the case that both the laser machine and the wire discharge machine are used, a three-dimensional machining definition table is not required. In this case, only a two-dimensional machining definition table is required. In this case, a two-dimensional machining definition table that stores machining shapes is connected to a machining condition table and treated as source data for outputting machining paths corresponding to various machining conditions.

In this case, without the two-dimensional machining definition table, by combining product graphic data and machining conditions, machining shapes and machining conditions can be formed.

Second Embodiment

Figure 20:
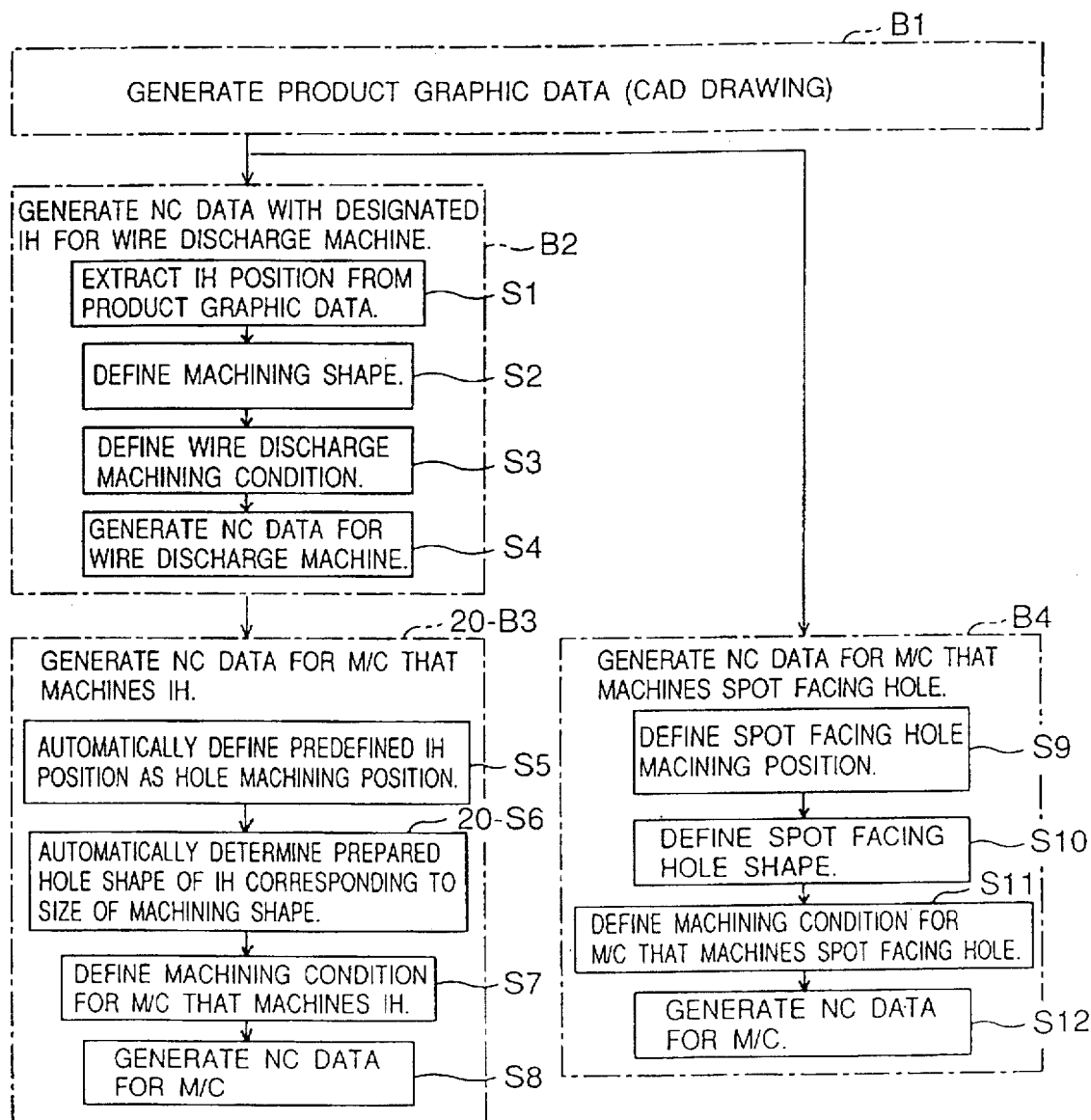
FIG. 20 is a flow chart according to a second embodiment of the present invention.

FIG. 20 is a flow chart showing a process of the CAD/CAM apparatus 100 for generating NC data according to a second embodiment of the present invention.

As with the same steps of the first embodiment, product graphic data is generated at block B1. NC data for through-shapes 505 to 510 machined by the wire discharge machine is generated at block B2.

Figure 21:
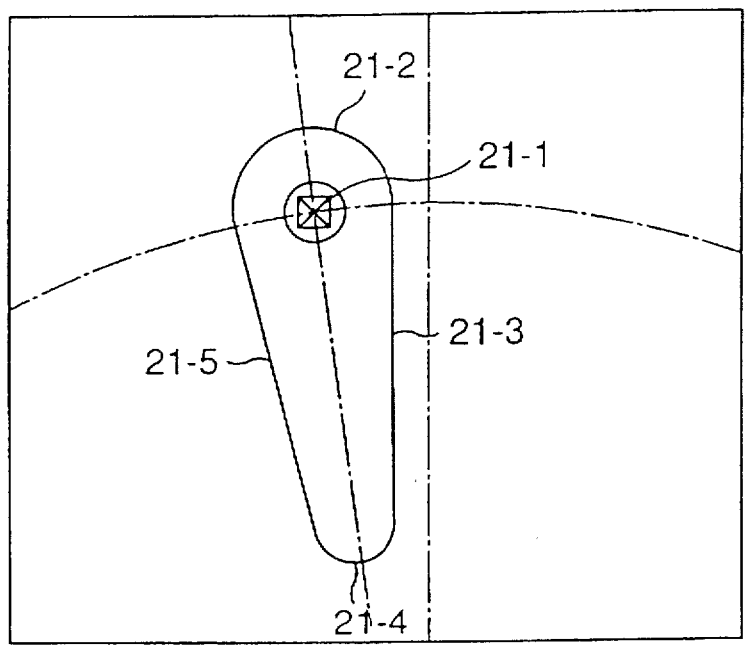
FIG. 21 is an enlarged view showing product graphic data 66-1 shown in FIG. 66.
Figure 22:
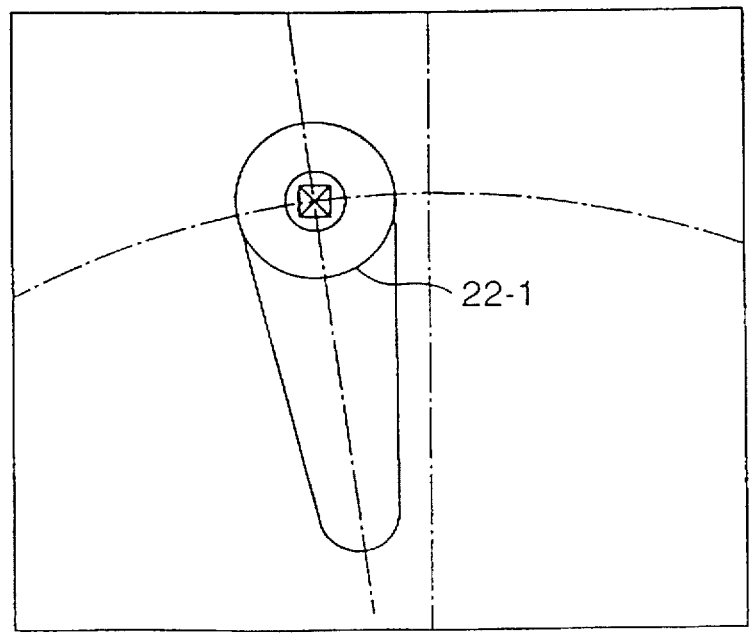
FIG. 22 is a schematic diagram showing a circle 22-1 inscribed to a machining shape with a center of an IH position 21-1 of FIG. 21.
Figure 23:
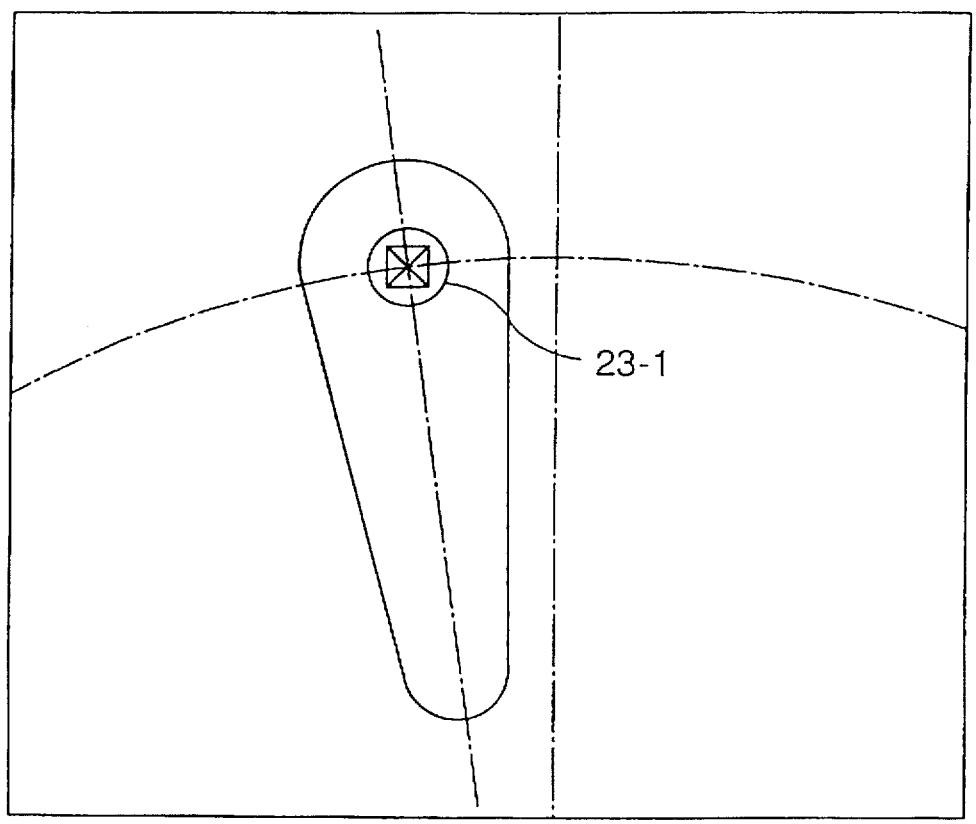
FIG. 23 is a schematic diagram showing a perfect circle 23-1 where the inscribed circle of FIG. 22 is reduced by a designated ratio.
Figure 66:
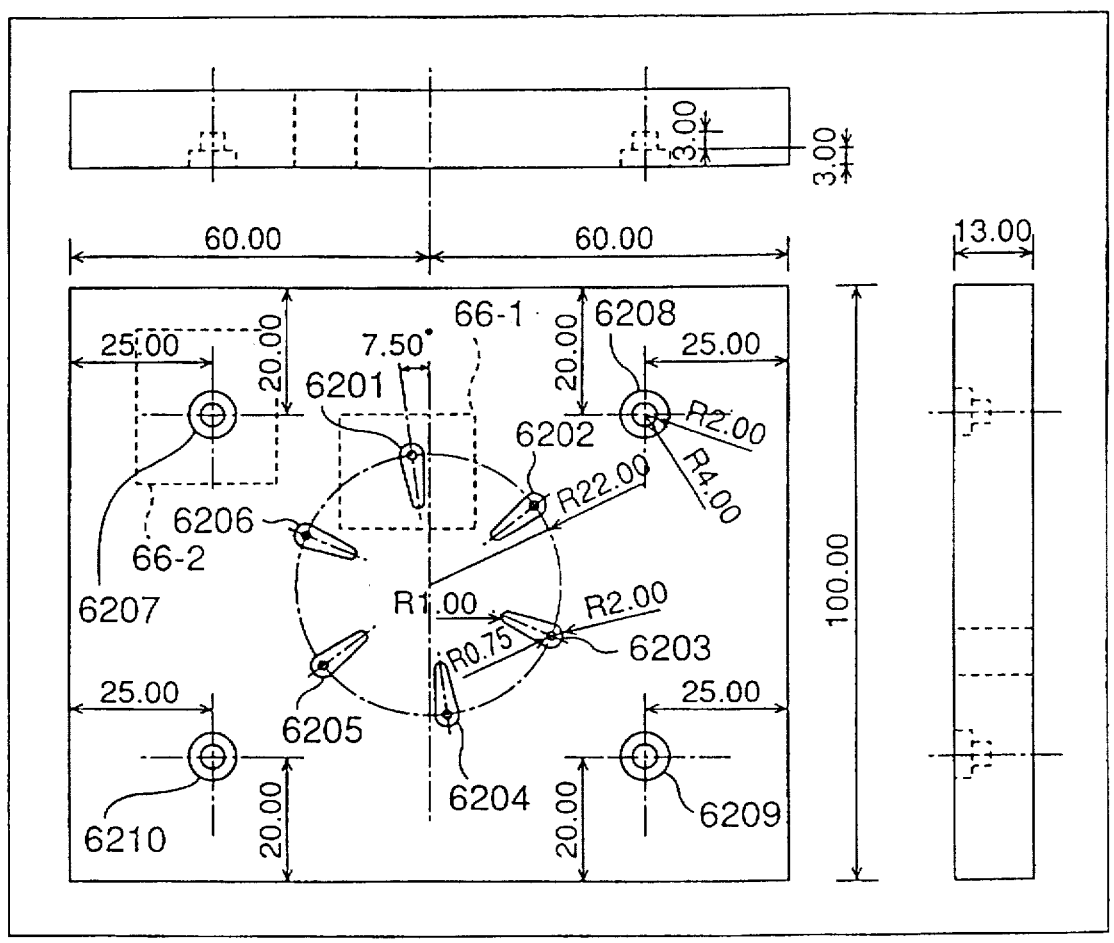
FIG. 66 is a schematic diagram showing broken line frames displayed on the screen of FIG. 65.
Figure 67:
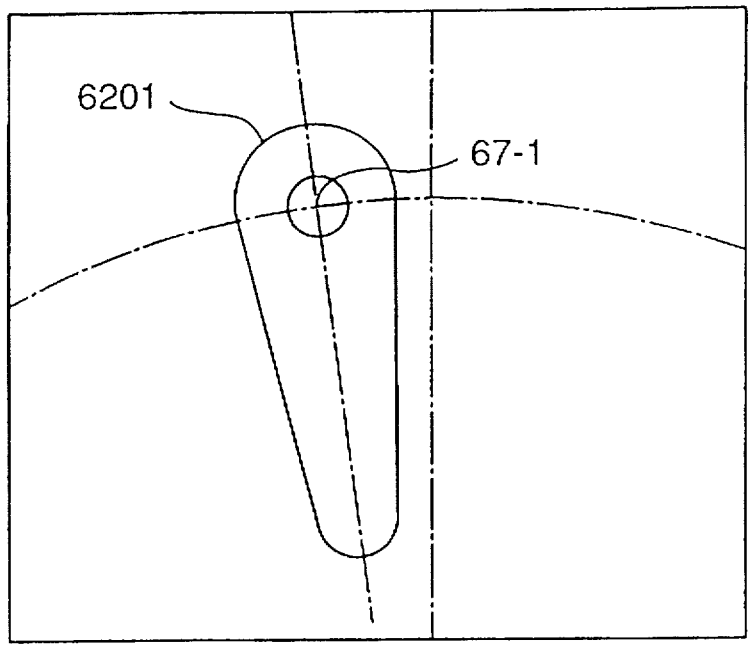
FIG. 67 is an enlarged view showing a broken line frame 66-1 of FIG. 66.
Figure 68:
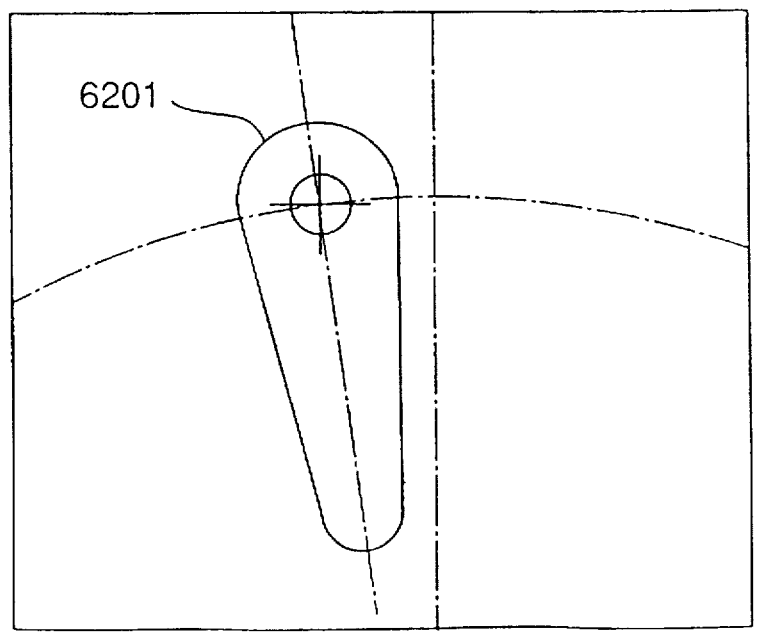
FIG. 68 is a schematic diagram showing a screen where the cursor is moved to a circle representing an IH position by a mouse and the mouse button is clicked so as to determine the IH position.
Figure 69:
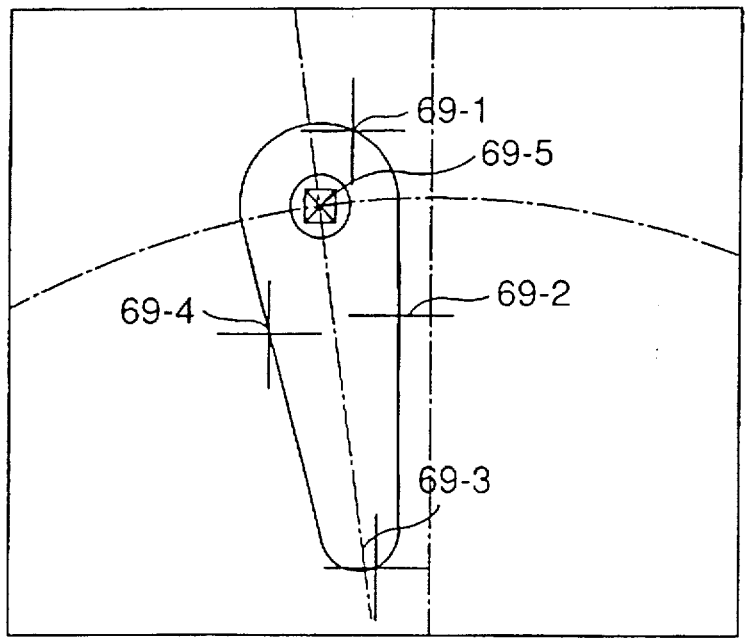
FIG. 69 is a schematic diagram showing marks representing the Ihs.
Figure 70:
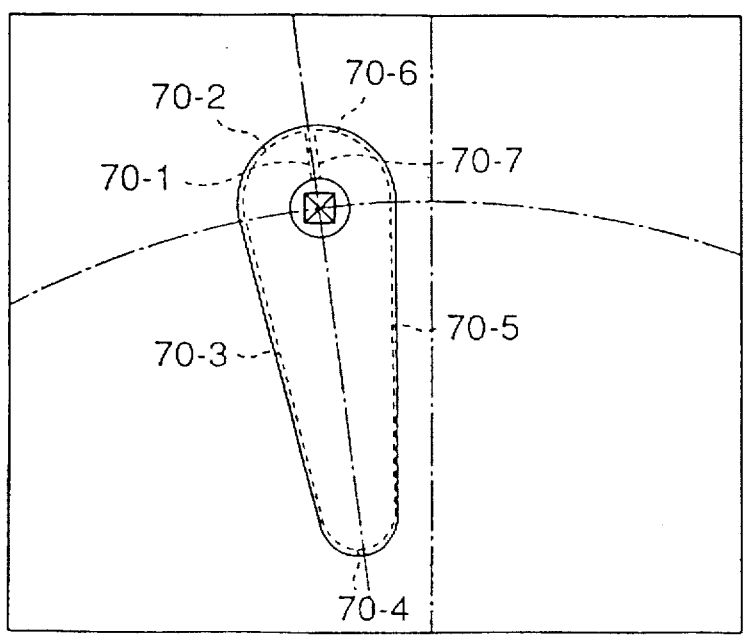
FIG. 70 is a schematic diagram showing a screen displaying a machining path.
Figure 71:
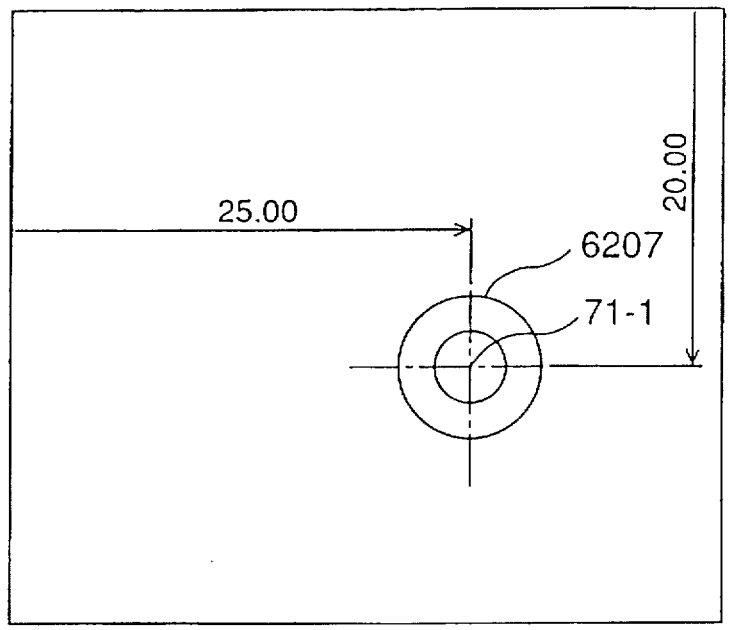
FIG. 71 is an enlarged view showing a broken line frame 66-2 of FIG. 66.
Figure 72:
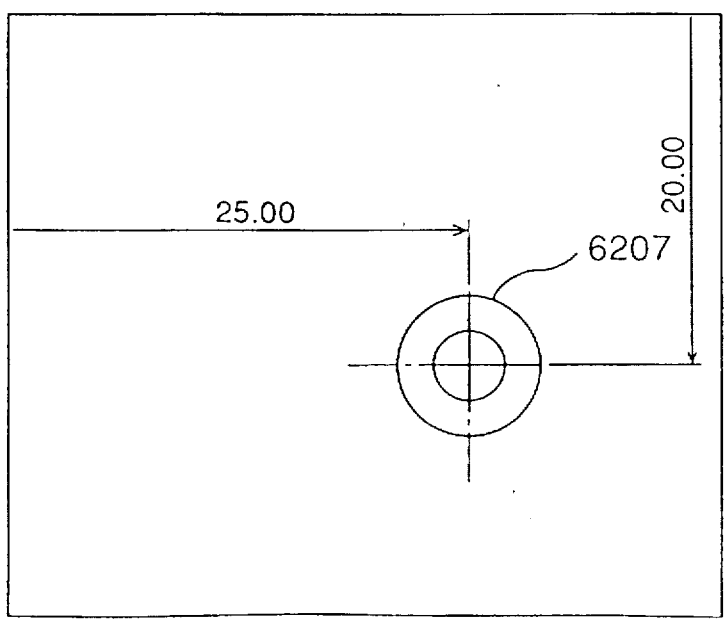
FIG. 72 is a schematic diagram showing a screen where the cursor is moved to a circle by the mouse and the mouse button is clicked.
Figure 73:
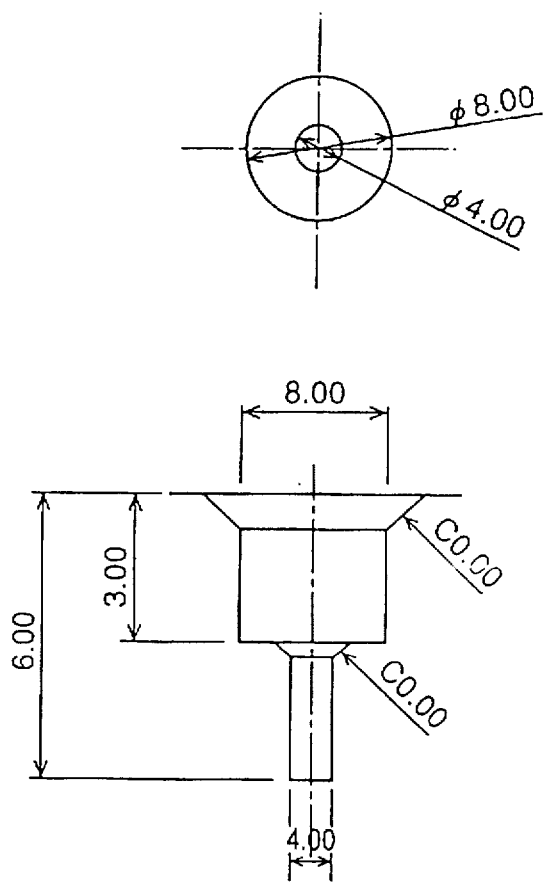
FIG. 73 is a schematic diagram showing a spot facing hole.

Next, machining data for IH's that are generated at block B2 and are used for machining by the M/C 108 is generated at block B3. At this point, as with the first embodiment, after the IH positions defined at step S5 are automatically defined, the size of machining shapes machined by the wire discharge machine is determined by the machining shape size determining means 301 (FIG. 3) so as to automatically determine prepared hole shapes of the IH's at step S6. In reality, consider the case that a prepared hole shape of an IH is automatically determined when the through-shape 505 is machined by the wire discharge machine 107. FIG. 21 is an enlarged view of the broken line frame 66-1 of the graphic data displayed on the CRT display (FIG. 66). A machining shape surrounded by elements 21-2 to 21-5 at the center of IH21-1 is recognized. A circle 22-1 inscribing a machining shape around the IH position 21-1 is obtained (FIG. 22). A hole shape is then determined, the hole having the diameter of a perfect circle 23-1 (FIG. 23) that is formed on the basis of the inscribed circle but is reduced by a predetermined ratio.

At this point, assume that the hole shape name, hole depth, hole chamfering amount, and so forth have been designated. Referring to FIG. 20, block B3, at step 24-S6, the designated hole shape is stored in a three-dimensional machining definition table 8-24 and connected to the two-dimensional machining definition table 8-23 that stores the hole machining position information. Thus, the prepared hole shape for the IH's for the wire discharge machine can be automatically determined at step 24-S6, unlike with the conventional apparatus, which requires manual operation. The machining condition definition step (at step S7) and the NC data generation step (at step S8) are the same as those of the first embodiment.

Third Embodiment

Figure 24:
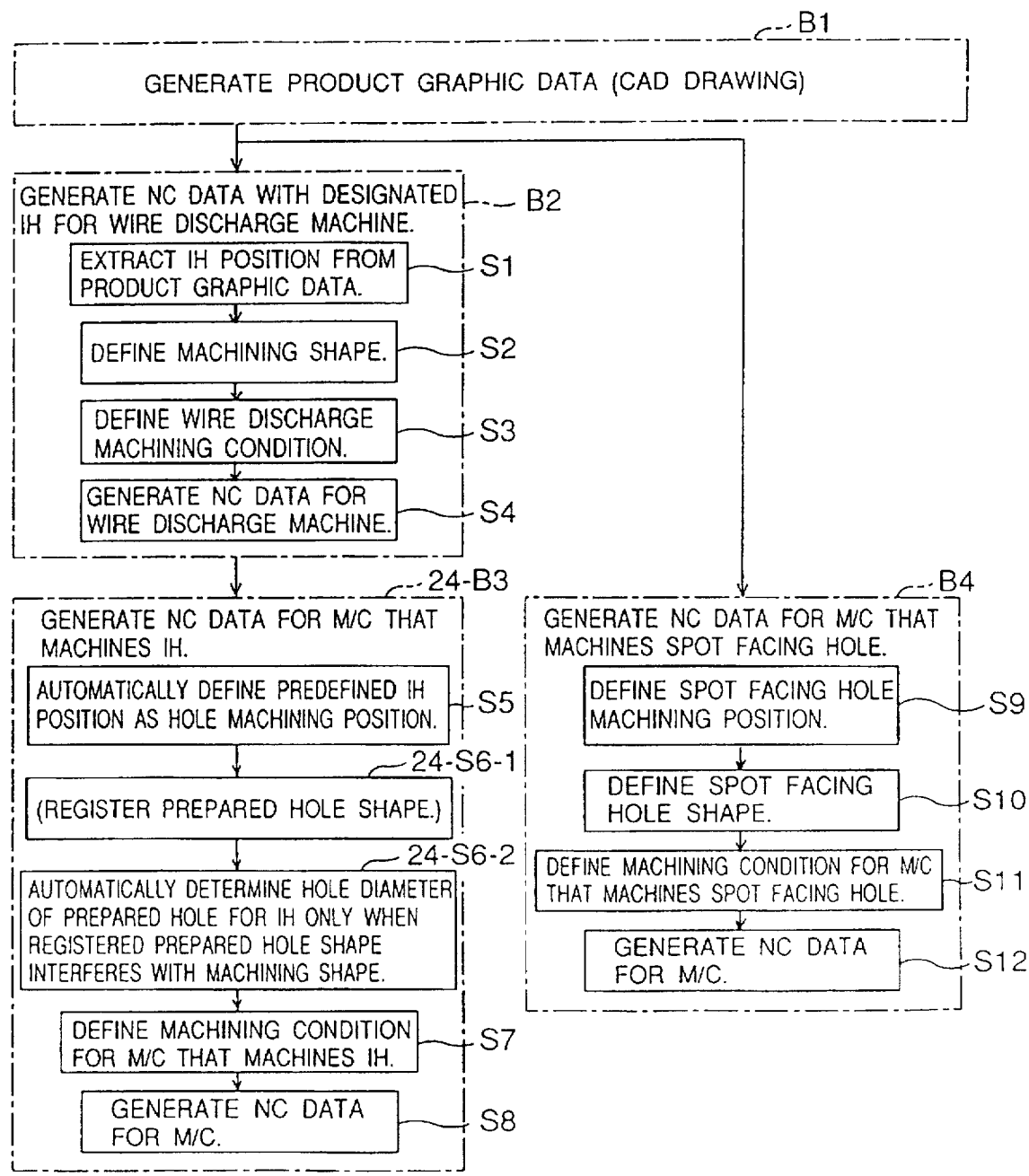
FIG. 24 is a flow chart according to a third embodiment of the present invention.

FIG. 24 is a flow chart showing a process of the CAD/CAM apparatus 100 for generating NC data according to a third embodiment of the present invention.

As with the second embodiment, when prepared holes are machined by the M/C 108 for IH's machined by the wire discharge machine 107, hole machining shapes are automatically determined corresponding to the size of machining shapes containing IH positions. In this case, the prepared hole shapes have been registered by the prepared hole shape registering means 303 (FIG. 3) and stored in the prepared hole shape storing means 305 (FIG. 3) at step 24-S6-1. Only when a registered prepare hole shape interferes with a wire discharge machining shape, the hole shape is automatically determined by the automatic prepared hole machining shape determining means 302 (FIG. 3). When no interference takes place, the automatic prepared hole shape determining means 304 by interference or size uses the registered prepared hole shape as the prepared hole machining shape at step 24-S6-2.

Figure 25A:
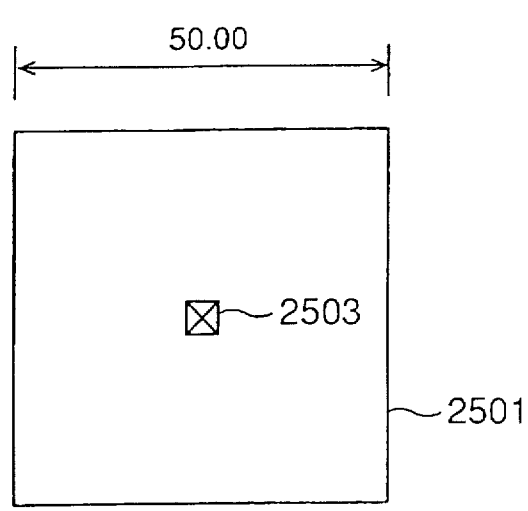
FIGS. 25(A) and 25(B) are schematic diagrams showing square shapes machined by the wire discharge machine.
Figure 25B:
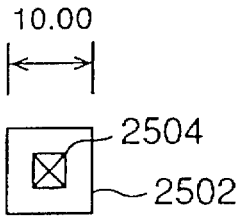

For example, as shown in FIG. 25(A), consider the case where a prepared hole that is a square 2501 with sides of 50.00 mm is determined. In addition, as shown in FIG. 25(B), consider the case where a prepared hole that is a square 2502 with sides of 10.00 mm is determined.

At this point, prepared holes that are straight holes with a diameter of 15.0 mm, a chamfering amount of 0.00 mm, and a depth of 70.00 mm have been registered by the prepared hole registering means 303 (FIG. 3) at step 24-S6-1.

Figure 26A:
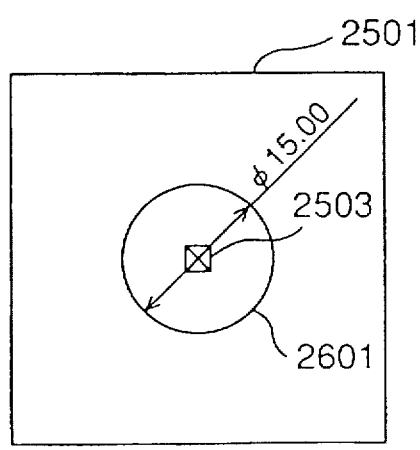
FIGS. 26(A) and 26(B) are schematic diagrams showing a perfect circle with a center of an initial hole position.
Figure 26B:
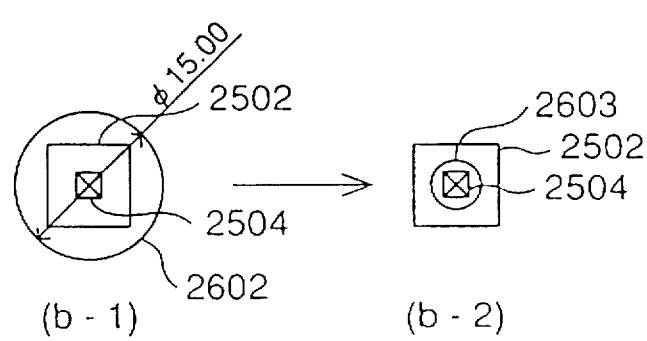

Perfect circles 2601 and 2602 with a diameter of 15.00 mm at the center of IH positions 2503 and 2504 are obtained, respectively (FIGS. 26(A) and 26(B)).

Next, it is determined whether or not the perfect circles 2601 and 2602 interfere with the shapes 2501 and 2502, respectively. For the prepared hole of the shape 2501 that does not interfere with the perfect circle 2601, a prepared hold shape that is stored in the registered prepared hole shape storing means 305 is used (FIG. 26(A)). For the prepared hole in illustration b-1 of FIG. 26(B), which is a shape 2502 that interferes with the perfect circle 2602, a prepared hole shape such as the perfect circle 2603 in illustration b-2 of FIG. 126(B) is automatically determined by the automatic prepared hole machining shape determining means 302 as in the second embodiment.

At step 24-S6-2, since the inscribed circle of the machining shape that was always calculated in the second embodiment is calculated only when an interference is present in the size comparison, the process speed is improved.

The machining condition definition step (S7) of the prepared hole shapes and the NC data generation step (S8) according to the third embodiment are the same as those of the second embodiment.

Fourth Embodiment

Figure 27:
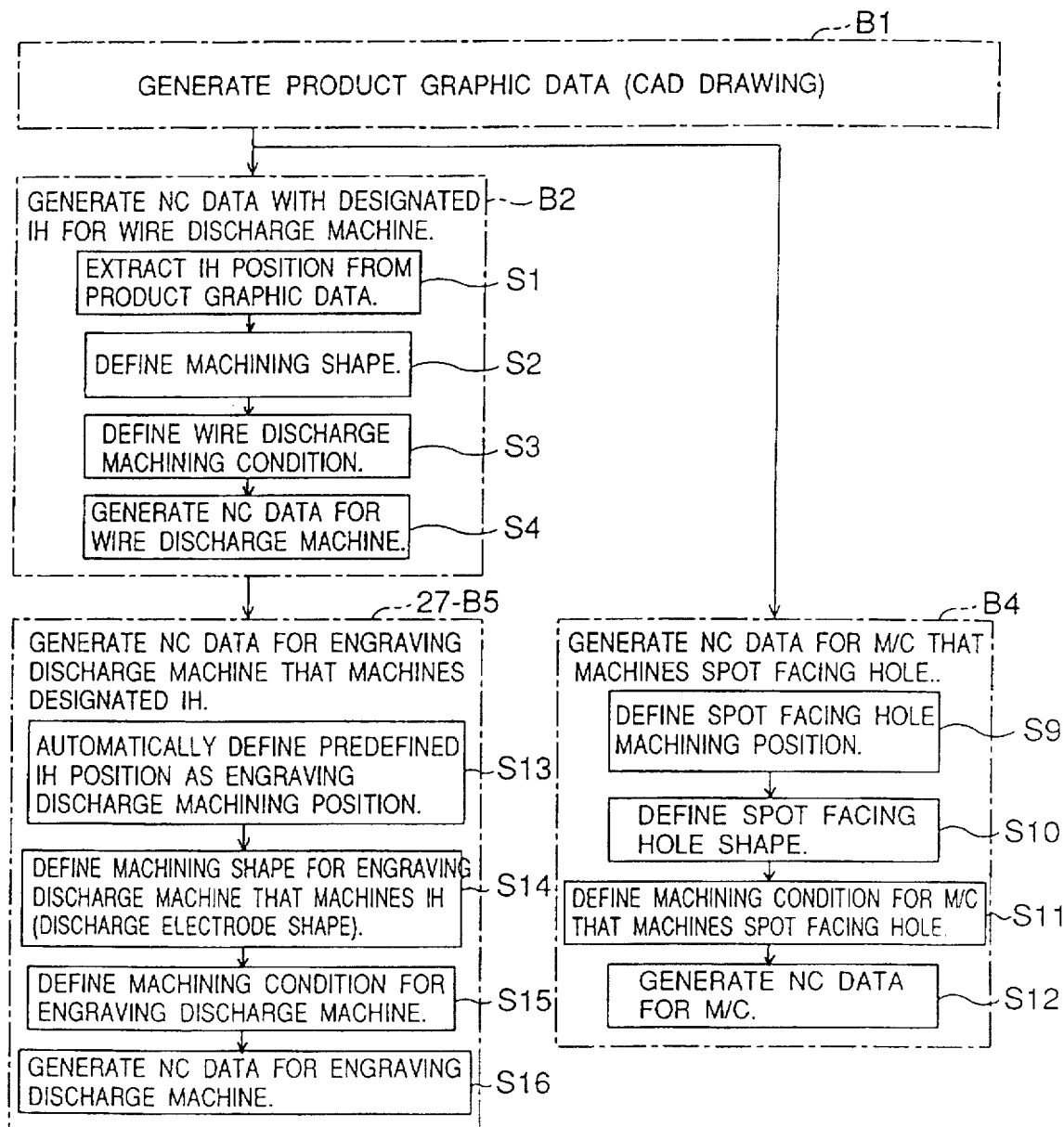
FIG. 27 is a flow chart according to a fourth embodiment of the present invention.

FIG. 27 is a flow chart showing a process of the CAD/CAM apparatus 100 for generating NC data according to a fourth embodiment of the present invention.

In the fourth embodiment, the M/C that machines prepared holes for IH's machined by the wire discharge machine 107 in the first embodiment is substituted with an engraving discharge machine 109.

Since the process for a wire discharge machine NC data generating block B2 in the flow chart shown in FIG. 27 is nearly the same as that of the first embodiment, the description is omitted.

NC data for through-shapes 505 to 510 (shown in FIG. 5) machined by the engraving discharge machine 109 is generate (at block 27-B5).

Figure 28:
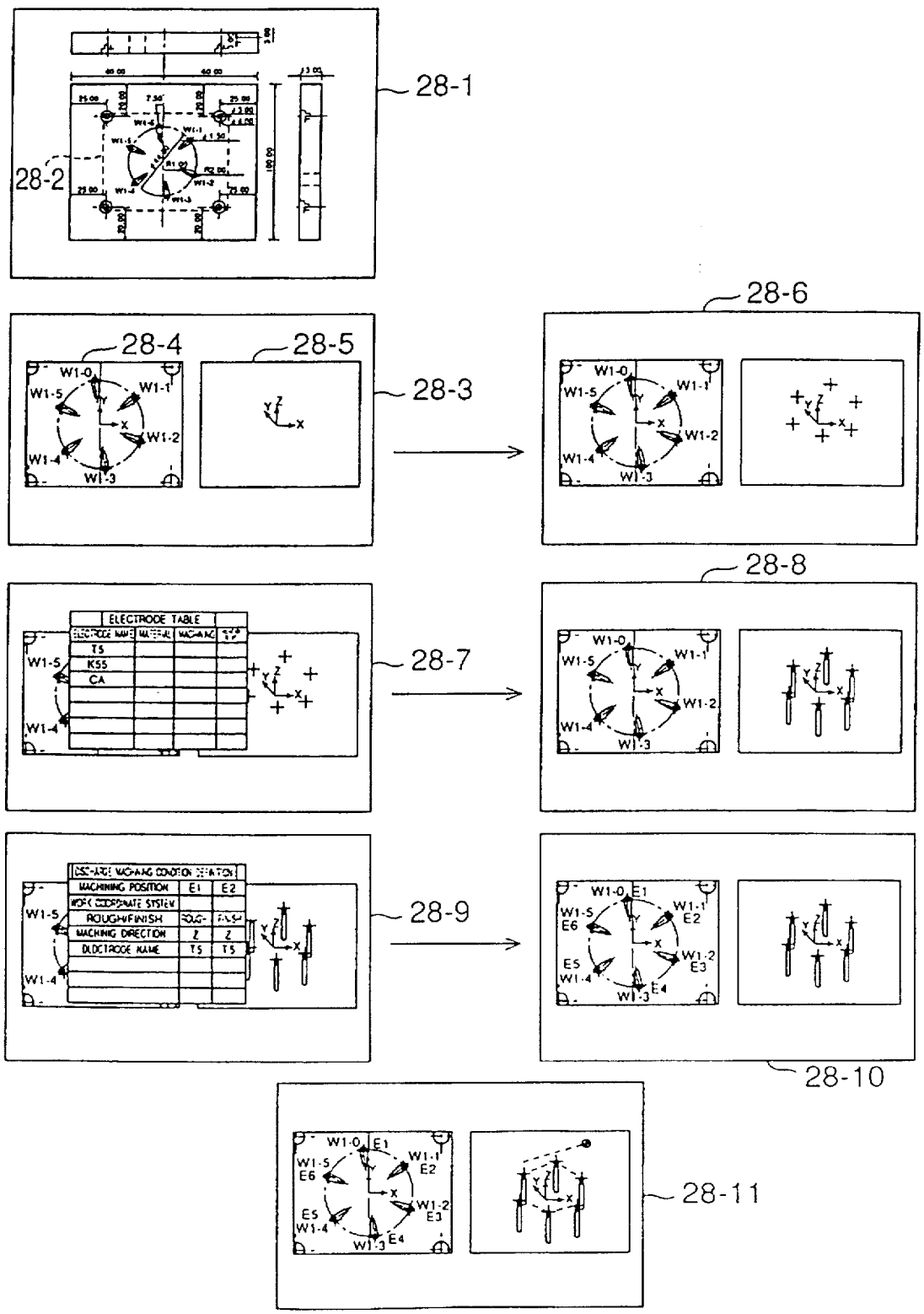
FIG. 28 is a schematic diagram showing a screen transition on the CRT display for generating NC data for Ihs machined by the engraving discharge machine.

FIG. 28 is a schematic diagram showing a screen transition corresponding to the flow chart of FIG. 27 for generating NC data for IH's machined by the engraving discharge machine (at block 27-B5). Reference numeral 28-1 is a screen showing graphic data of a product. Reference numeral 28-3 is a screen showing both a screen 28-4 that displays an XY plan view where a dotted line frame 28-2 of the screen 28-1 is enlarged and a screen 28-5 that displays an arrow view at the same time. (On the arrow view, the machining data is three-dimensionally displayed with axes X, Y, and Z). Reference numeral 28-6 is a screen showing the results where pre-defined IH positions for the wire discharge machine are automatically defined as engraving discharge machining positions. Reference numeral 28-7 is a screen showing that an electrode that is machined at an engraving discharge machining position defined on the screen 28-6 is selected from an electrode registration table. Reference numeral 28-8 is a screen showing designated results. Reference numeral 28-9 is a screen where machining conditions of the electrode that is contacted to an engraving discharge machining position are defined corresponding to a machining condition setting table. Reference numeral 28-10 is a screen showing the set results of the screen 28-9. Reference numeral 28-11 is a screen where NC data corresponding to the engraving discharge machining data defined on earlier screens up to the screen 28-10 is generated.

As with the first embodiment, IH positions that have been defined by the IH position determining means 307 (FIG. 3) are extracted from wire discharge machining shapes.

The extracted position data is stored in the product graphic data area and the two-dimensional machining shape table area in the data memory 113 (FIG. 3). The position data is automatically defined as engraving discharge machining positions by the automatic engraving discharge machine machining position definition means 317 (FIG. 3) (at step S13). The machining positions for the engraving discharge machine that machines IH's for the wire discharge machine are automatically designated at step S13, unlike with the conventional apparatus, which requires manual operation.

The automatically defined engraving discharge machining positions are displayed on a screen (28-6) with marks.

Next, engraving discharge machining shapes for the IH's automatically defined are defined (at step S14).

The engraving discharge machining shapes are defined by determining electrodes that are contacted to respective engraving discharge machining positions defined at step S13 and sliding patterns thereof.

Figure 29:
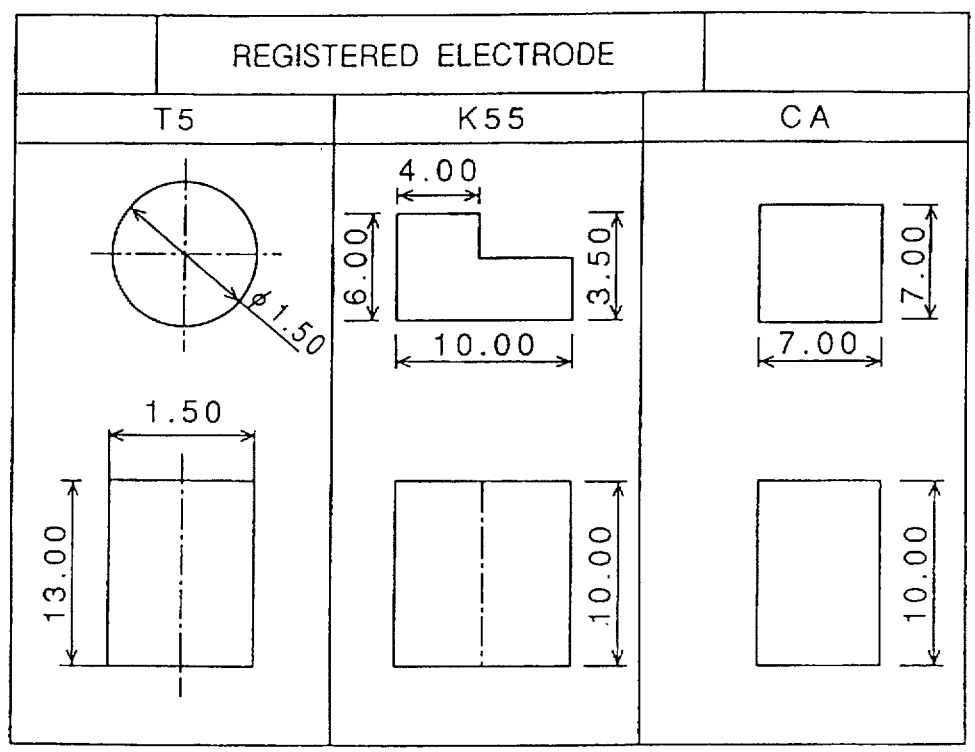
FIG. 29 is a schematic diagram showing a table of registered electrodes.
Figure 31:
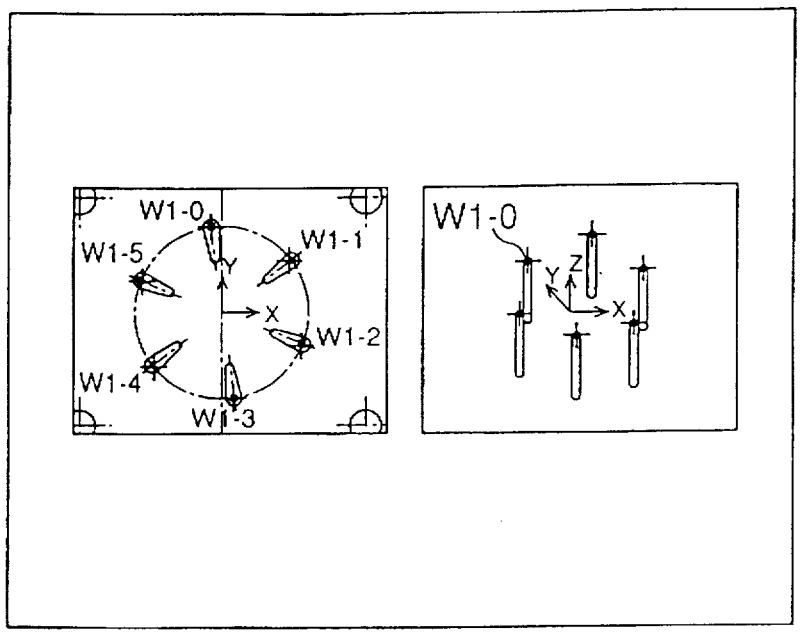
FIG. 31 is a schematic diagram showing marks representing electrode shapes.

Electrodes are selected from a table shown in FIG. 29. Thus, the electrodes and the sliding patterns thereof at the IH's are defined. Marks that represent the selected electrode shapes are displayed on the display (FIG. 31). The defined electrode shapes are stored in the three-dimensional machining definition table with the patterns and sliding conditions and then connected to the two-dimensional machining shape table that stores the engraving discharge machining positions defined at step S13.

Next, machining conditions for the engraving discharge machine are defined (at S15).

Machining conditions shown in FIG. 30 are selected from an engraving discharge machining condition group that has been registered. The selected machining conditions are connected to the three-dimensional machining shape definition table defined at step S14.

Figure 32:
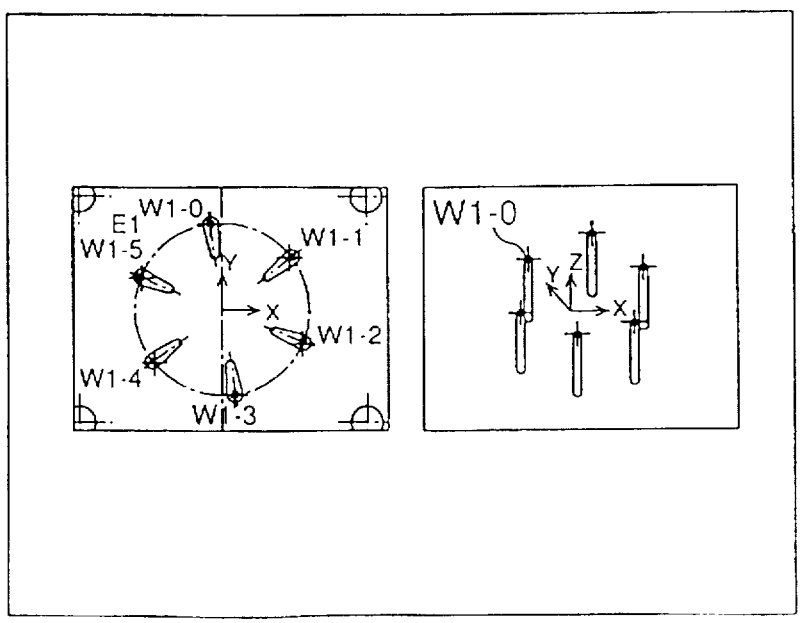
FIG. 32 is a schematic diagram showing a screen representing that a machining step has been defined.

The machining conditions that were set at step S15 are identified as E1 and displayed on the CRT display 102 as shown in FIG. 32.

NC data is generated corresponding to the engraving discharge machining source data that has been defined and stored as described above.

Fifth Embodiment

Figure 4:
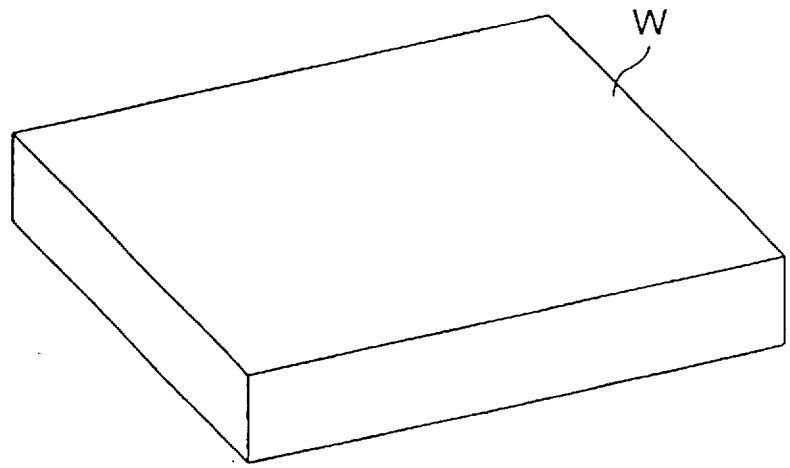
FIG. 4 is a schematic diagram showing an example of a workpiece.
Figure 33:
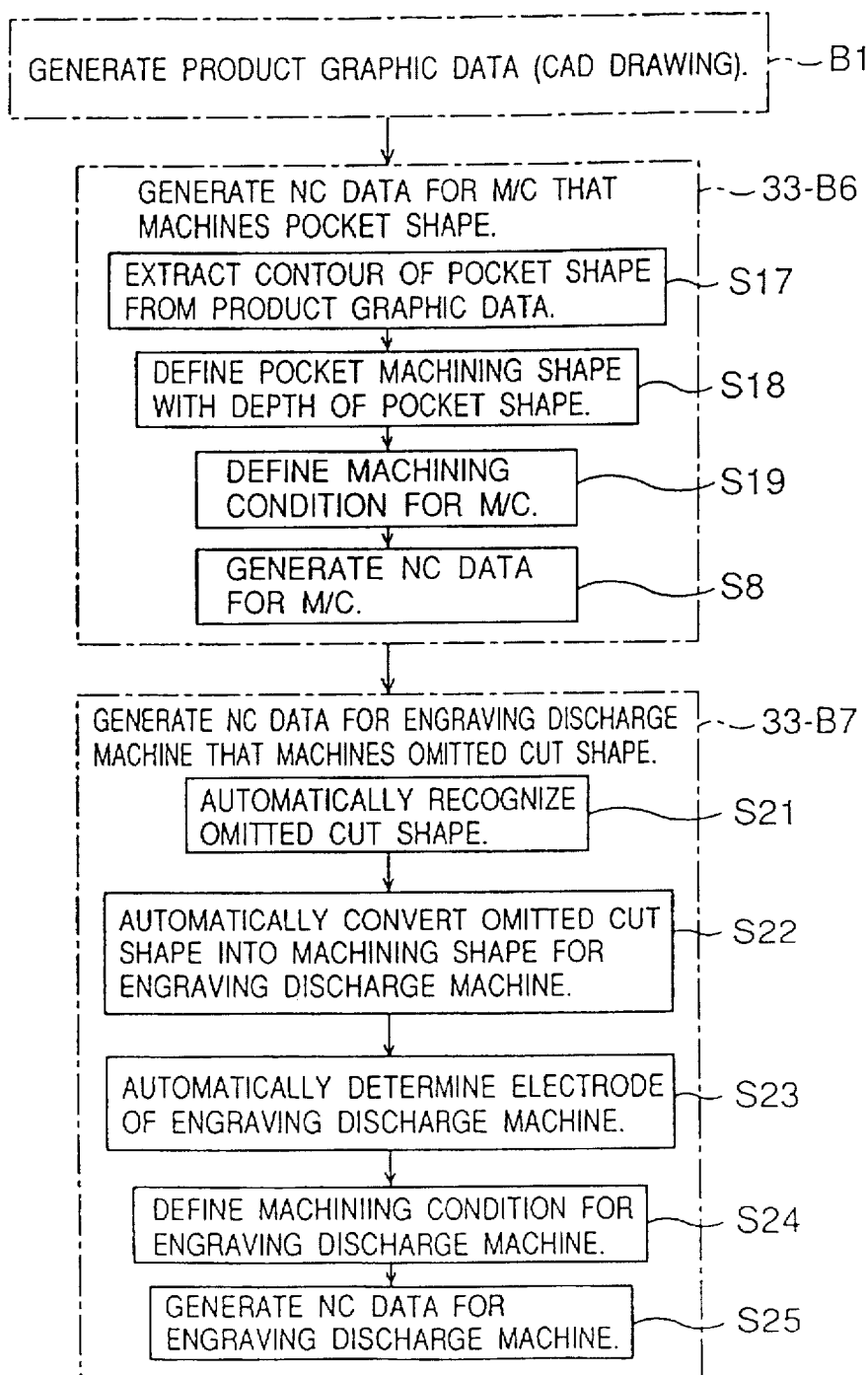
FIG. 33 is a flow chart according to a fifth embodiment of the present invention.
Figure 35:
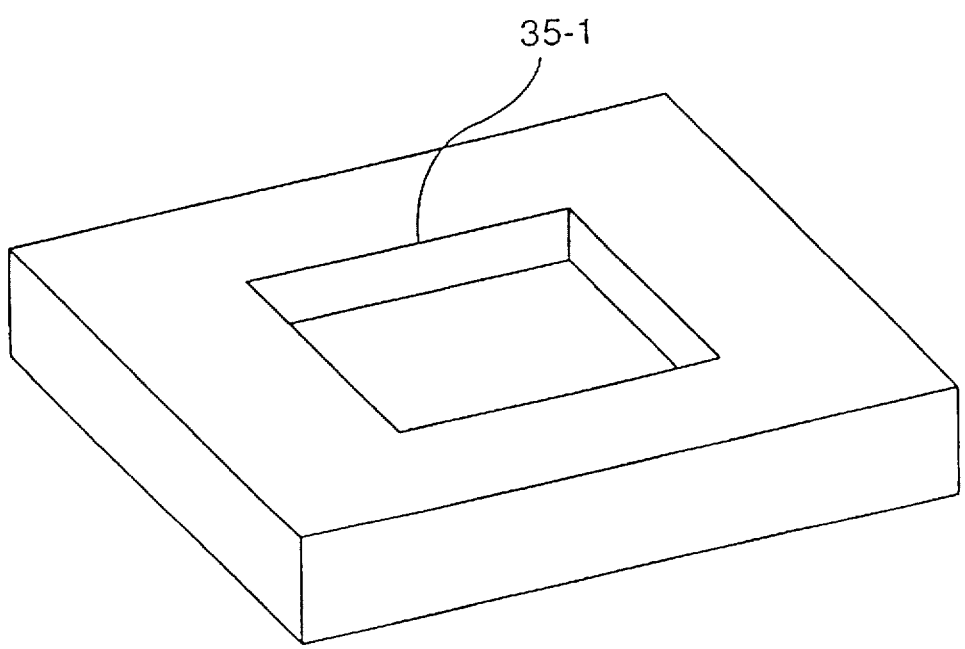
FIG. 35 is a schematic diagram showing a product according to the fifth embodiment of the present invention.

FIG. 33 is a flow chart showing a process of the CAD/CAM apparatus 100 for generating NC data according to a fifth embodiment of the present invention. In this embodiment, the workpiece W shown in FIG. 4 is machined to a product having a pocket shape 35-1 shown in FIG. 35. In this embodiment, the M/C 108 machines the pocket and the engraving discharge machine 109 machines other portions that could not be machined by the M/C 108, hereinafter "omitted cut portions" having various "omitted cut shapes".

Figure 34:
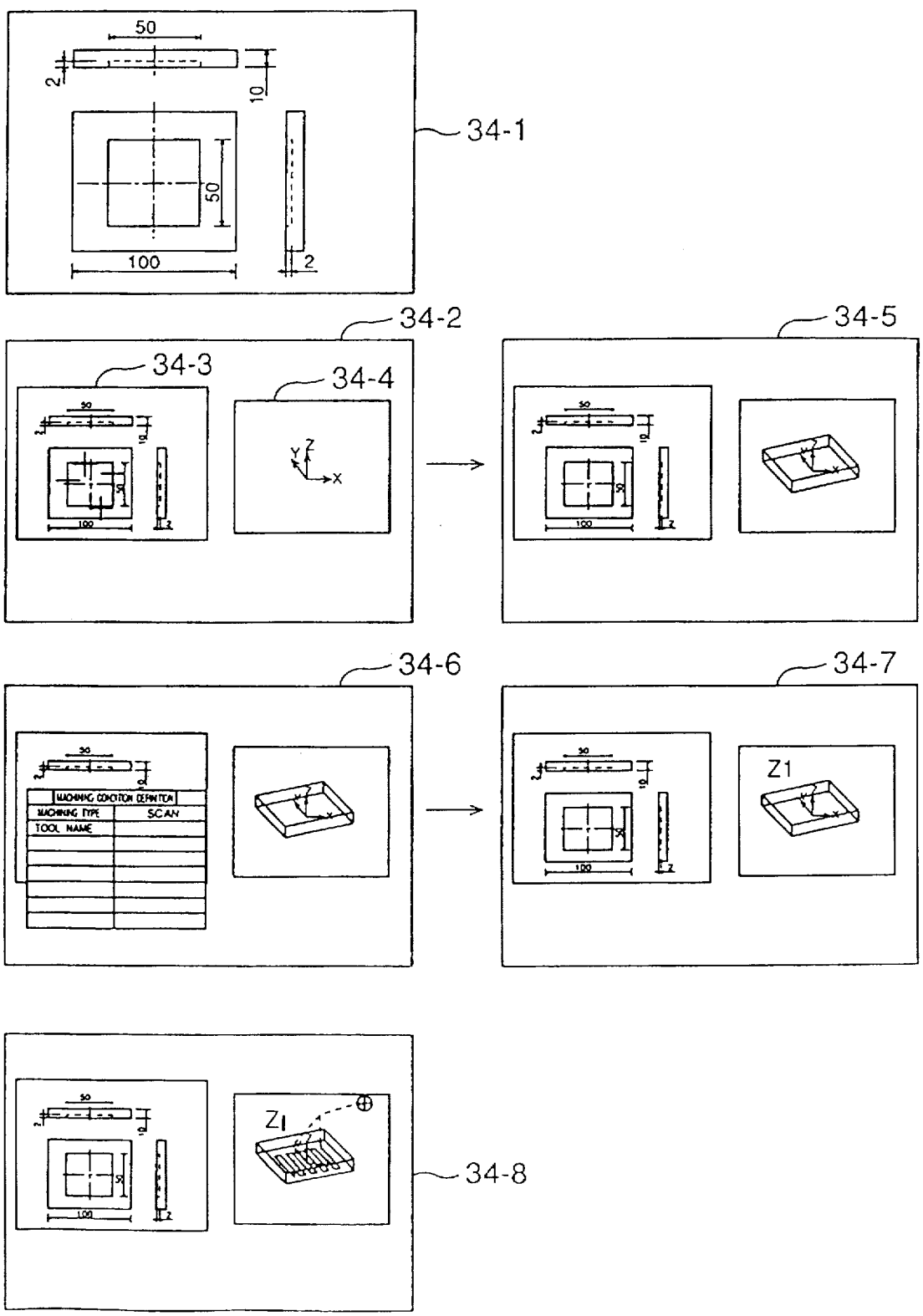
FIG. 34 is a schematic diagram showing a screen transition on the CRT display for a pocket machined by the M/C.
Figure 41:
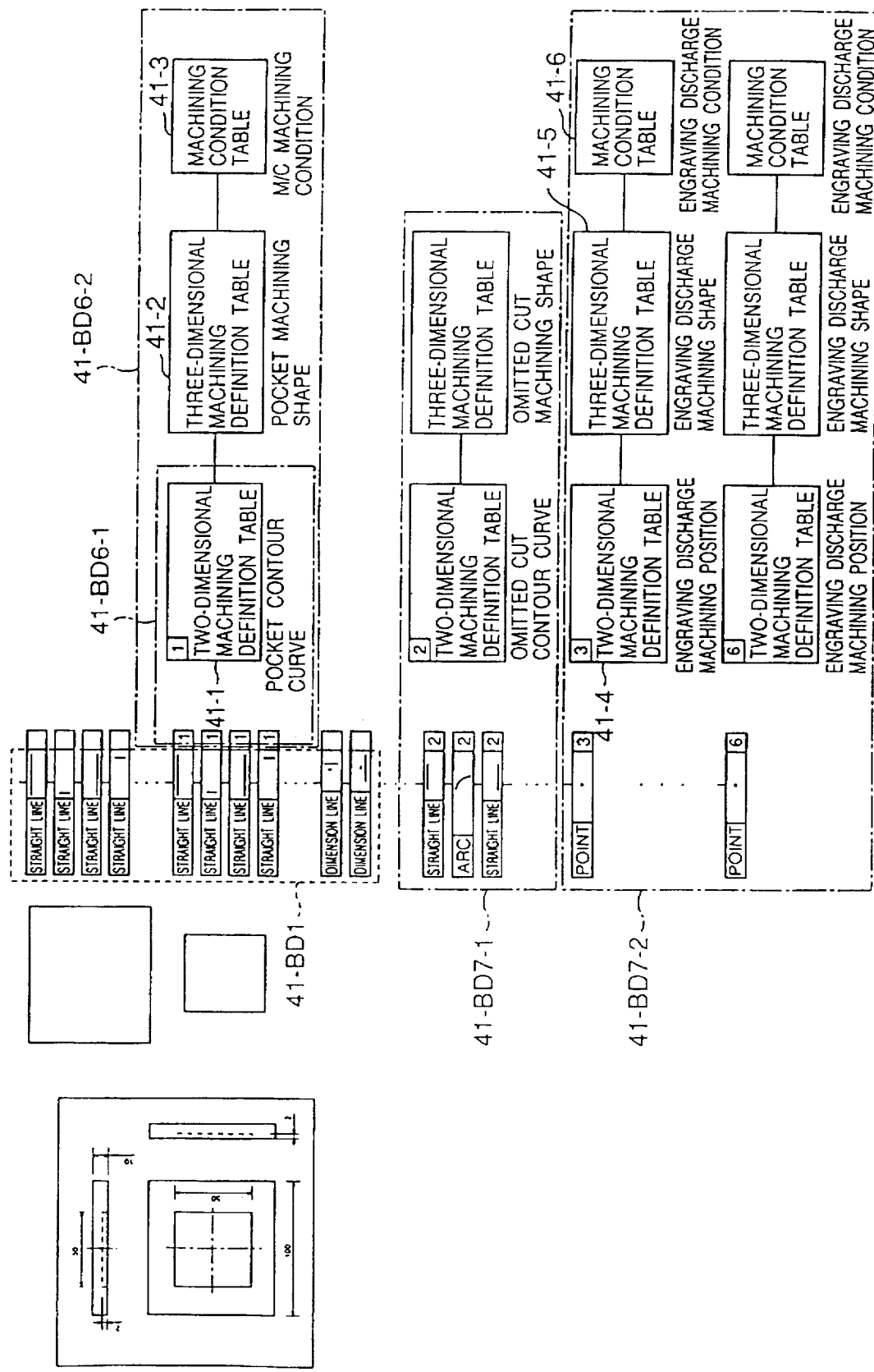
FIG. 41 is a schematic diagram showing data stored in the data memory in the case that omitted cut portions are machined by the engraving discharge machine.

FIG. 34 is a schematic diagram showing a screen transition for a pocket machining process of the M/C 108. Reference numeral 34-1 is a screen showing product graphic data. Reference numeral 34-2 is a screen showing both a screen 34-3 that displays an XY plan view of the screen 34-1 and a screen 34-4 that displays an arrow view at the same time. (On the arrow view, the machine data is three-dimensionally shown with axes X, Y, and Z.) On the screen 34-3, which displays the XY plan view, the machining shape of a pocket is defined. Reference numeral 34-5 is a screen where the defined results of the machining shapes are displayed. Reference numeral 34-6 is a screen where the machining conditions of the pocket are defined corresponding to the machining condition setting table. Reference numeral 34-7 is a screen where the set results of the screen 34-6 are displayed. Reference numeral 34-8 is a screen where the NC data corresponding to the MC machining data that has been defined on up to the screen 34-7 is generated. FIG. 41 is a schematic diagram showing data stored in the data memory in the case that the omitted cut shapes are machined by the engraving discharge machine.

Figure 36:
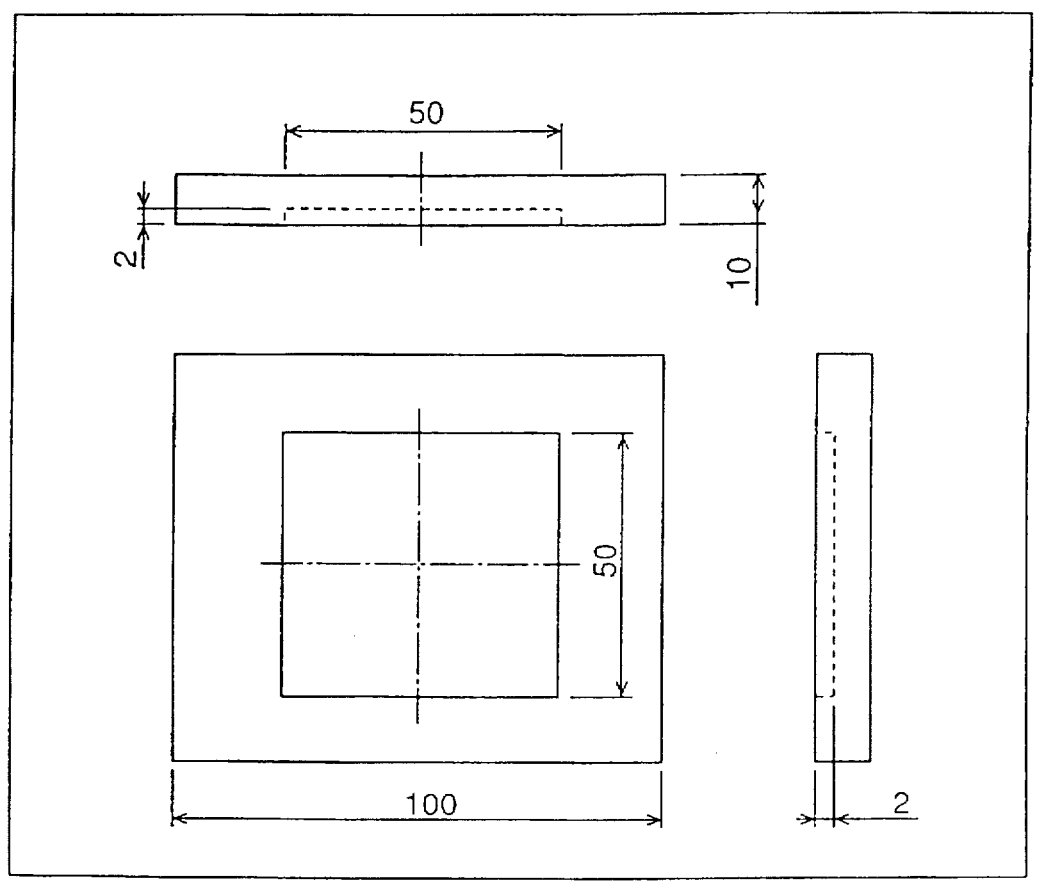
FIG. 36 is a schematic diagram showing a screen displaying graphic data of FIG. 35 displayed on the CRT display.

As with the first embodiment, at block B1 (FIG. 33), product graphic data is generated. The product graphic data is stored in the data memory 113 (FIG. 2) as 41-BD1 (FIG. 41). The graphic data is displayed on the CRT display 102 (FIG. 1) as shown in FIG. 36.

NC data for the pocket shape 35-1 machined by the M/C 108 is generated corresponding to the completed product graphic data (at block 33-B6).

Figure 37A:
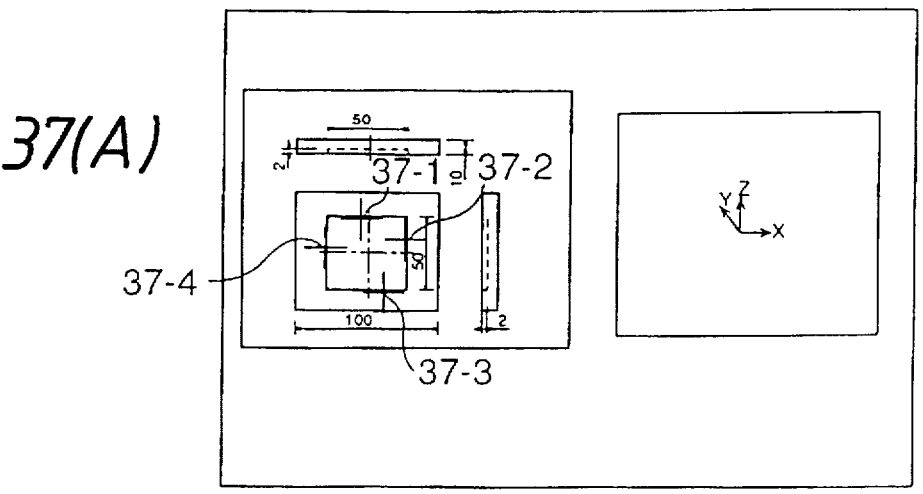
FIGS. 37(A)–(C) are schematic diagrams showing screen transitions on the CRT display for a pocket shape machined by the M/C corresponding to graphic data.
Figure 37B:
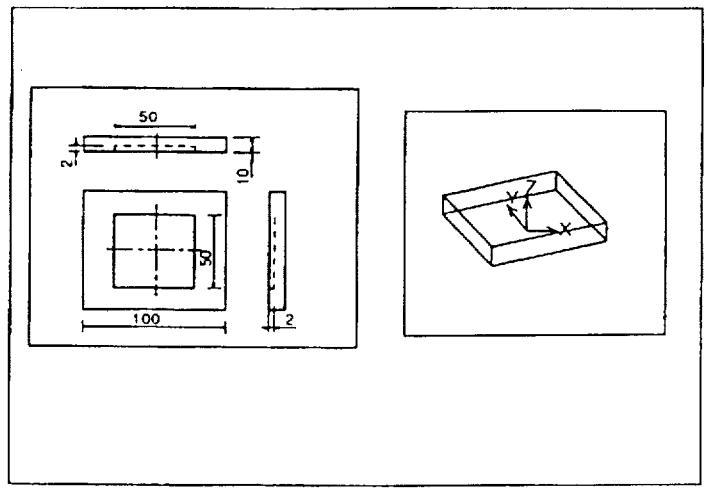
Figure 37C:
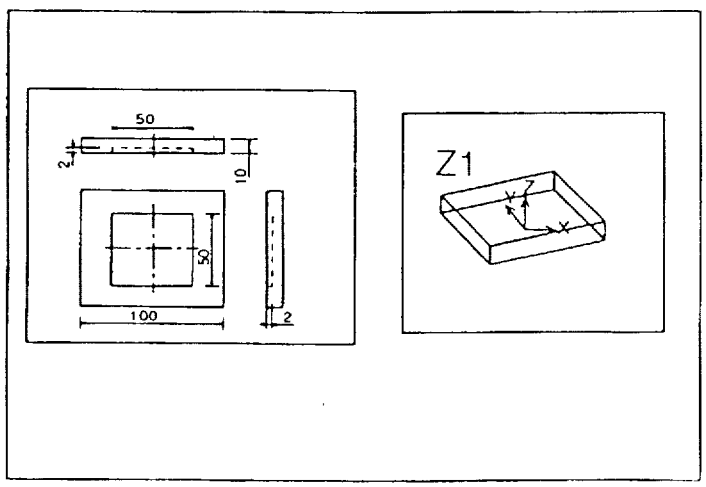

FIG. 37(A) is an enlarged view showing the screen 34-3 of FIG. 34 where a contour curve of the pocket is designated by elements 37-1, 37-2, 37-3, and 37-4. FIG. 37(B) is an enlarged view showing the screen 34-5 of FIG. 34 where the pocket machining shape has been defined. FIG. 37(C) is an enlarged view showing the screen 34-7 of FIG. 34 where the pocket machining definition has been completed.

In other words, a machining shape is defined corresponding to the product graphic data. In reality, the machining shape is defined by a contour curve, which constructs the pocket shape and the depth thereof. In more reality, as shown in FIG. 37(A), the contour curve, which constructs the pocket, is defined by moving the cursor to the positions 37-1, 37-2, 37-3, and 37-4 at step S17. The contour curve is grouped with a two-dimensional machining shape table 41-1 (FIG. 41) as 41-BD6-1. The depth of the pocket shape, for example, 2 mm, is input from the keyboard 103 at step S18. Thus, data where the shape name is "pocket" and the depth is "2 mm" is stored in a three-dimensional machining definition table 41-2 of the data memory 113. The three-dimensional machining definition table 41-2 is connected to the two-dimensional machining definition table 41-1. Thus, the defined pocket shape is displayed on the CRT display 102 as shown in FIG. 37(B).

Next, machining conditions are defined at step S19.

The defined machining conditions are stored in a machining condition definition table 41-3 and connected to the three-dimensional machining definition table 41-2.

The results generated at the block 33-B6 of FIG. 33 are stored in the data memory 113 as 41-BD6-2 shown in FIG. 41. The results are displayed on the CRT display 102 as 37-C shown in FIG. 37.

After the workpiece W (FIG. 4) was machined corresponding to the NC data of the M/C machining definition data, omitted cut portions with a tool radius of R2.0 are present at four corners of the pocket.

Figure 38A:
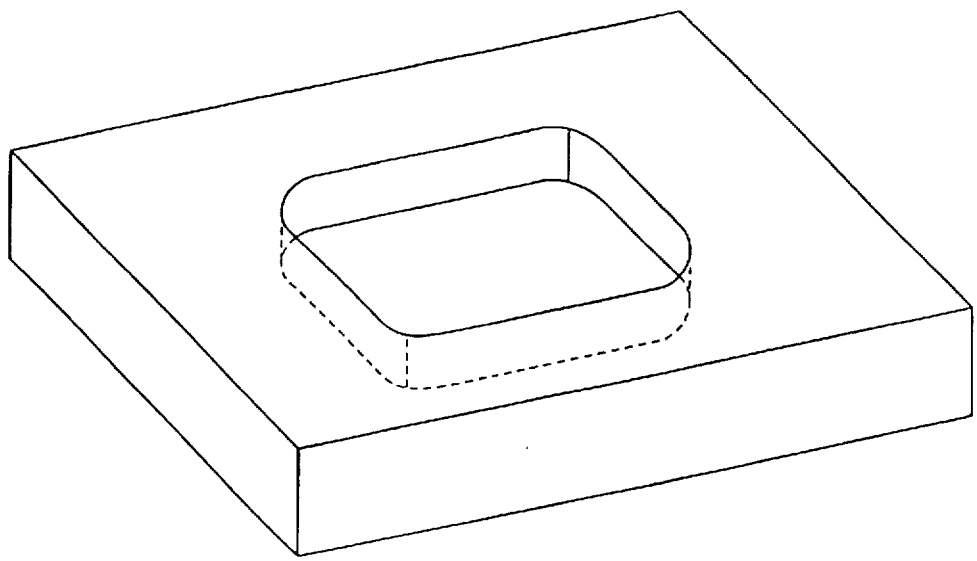
FIGS. 38(A) and (B) are schematic diagrams showing a product shape and omitted cut portions thereof after the product has been machined by the M/C.
Figure 38B:
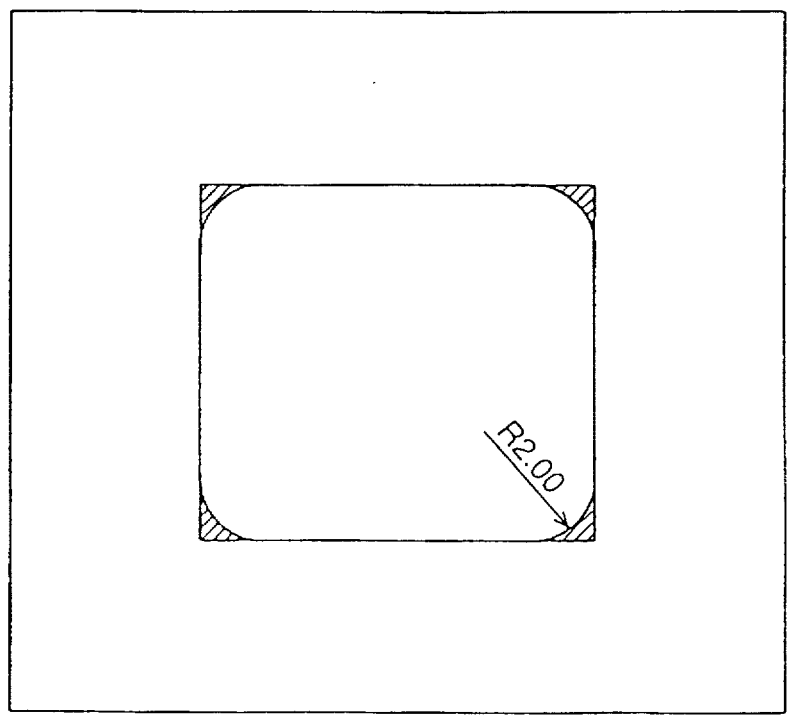

FIG. 38(A) is a schematic diagram showing the shape of the product machined by the M/C 108. FIG. 38(B) is a schematic diagram showing omitted cut portions represented by hatched lines.

Next, NC data for the omitted cut portions machined by the engraving discharge machine 109 is generated (at block 33-B7).

Figure 39A:
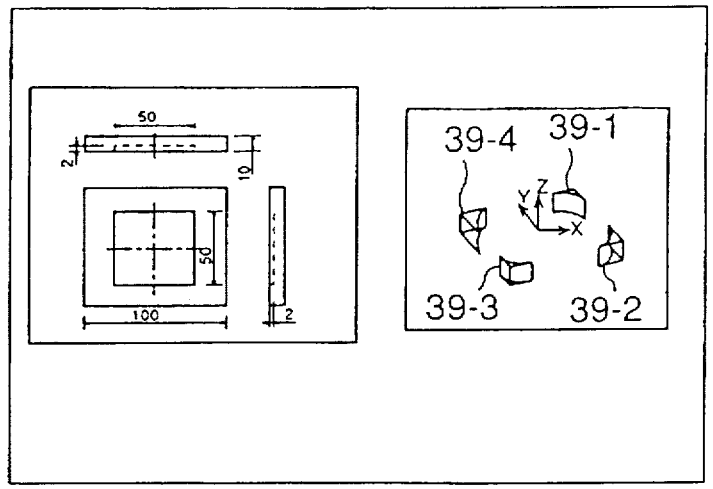
FIGS. 39(A)–(C) are schematic diagrams showing a screen transition on the CRT display for the omitted cut shapes defined.
Figure 39B:
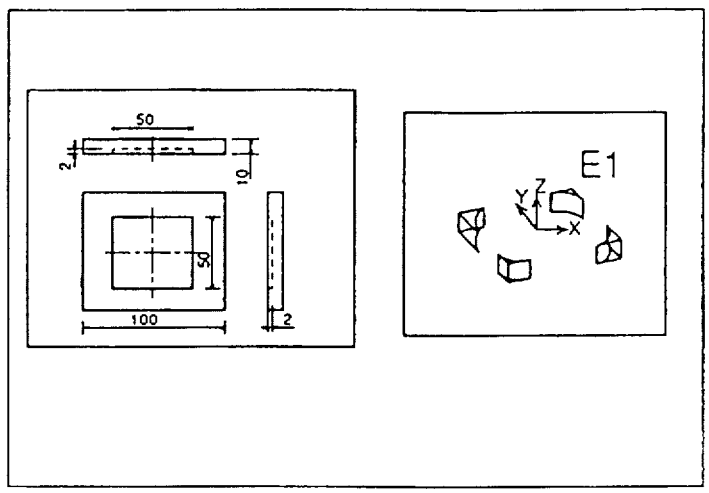
Figure 39C:
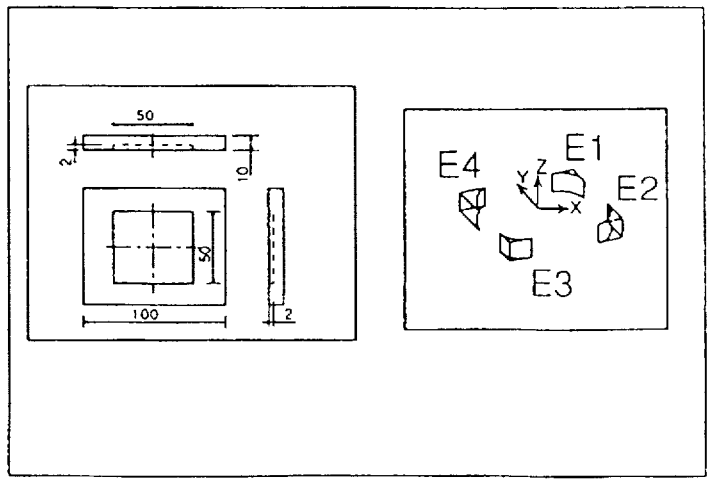

FIG. 39(A) is a schematic diagram showing a screen displaying the omitted cut portions recognized and stored in the data memory 113 shown in FIG. 2. FIG. 39(B) is a schematic diagram showing a screen where an engraving discharge machining definition for an upper right omitted cut portion has been completed. FIG. 39(C) is a schematic diagram showing a screen where the engraving discharge machining definition for all the omitted cut portions has been completed.

Referring again to FIG. 33, at step S21, the omitted cut shape recognizing means 309 stored in the program memory 112 of the CAD/CAM apparatus 100 is activated. The omitted cut shapes are-recognized by machining paths of the NC data, which is generated corresponding to the pocket machining shape and machining conditions stored in the data memory 113, and shapes to be machined. The omitted cut shapes are automatically defined as machining shapes and stored in the data memory 113 as 41-BD7-1 shown in FIG. 41. The omitted cut shapes are displayed on the CRT display 102 as shown in FIG. 39(A).

Figure 40A:
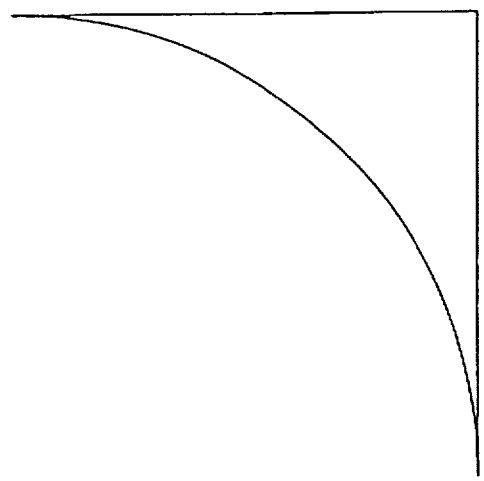
FIG. 40(A) and (B) are schematic diagrams showing an omitted cut shape, an electrode shape, and an electrode reference position.
Figure 40B:
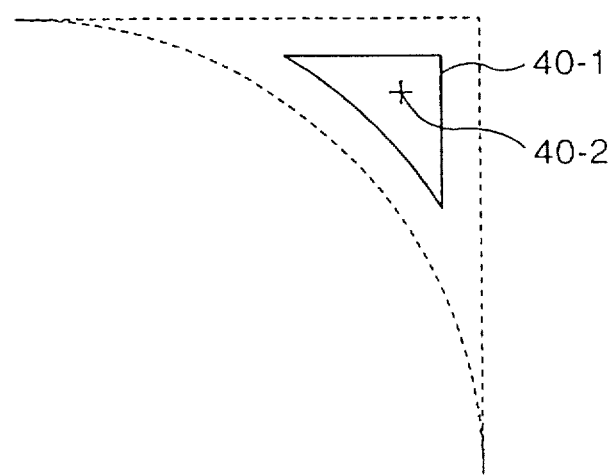

At step S22, the automatic engraving discharge machining shape defining means 310 stored in the program memory 112 is activated. Electrode shapes and electrode reference positions for the machining shapes automatically machined by the engraving discharge machine at step S23, are determined by a sliding pattern and a sliding coefficient. In reality, an omitted cut shape (where 39-1 to 39-4 of FIG. 39(A) are viewed on xy plane (FIG. 40(A)) is deformed for the sliding portion corresponding to the predetermined sliding pattern and the sliding coefficient so as to determine an electrode shape 40-1 and an electrode reference position 40-2 shown in FIG. 40(B). In this case, the shape of the electrode may be a variety of contours, even square.

The determined electrode reference position, which is the engraving discharge machining position, is stored in a two-dimensional machining definition table 41-4 (FIG. 41). The electrode shape is stored in a three-dimensional machining definition table 41-5.

Thus, the determination of the omitted cut shape, the machining position of the omitted cut shape machined by the engraving discharge machine, and the designation of the shape of the electrode contacted to the machining position can be automatically performed at steps S21, S22, and S23 unlike with the conventional apparatus, which requires manual operation.

Again in FIG. 33, at step S24, engraving discharge machining conditions are defined. Defined data is stored in a machining condition table 41-6 in the data memory 113. The machining condition table 41-6 is connected to the three-dimensional machining definition table 41-5, which stores the electrode shapes. The defined data is identified as El and displayed on the CRT display 102 as shown in FIG. 39(B). Likewise, the machining conditions for the omitted cut shapes 39-2 to 39-4 are defined and the results are displayed as shown in FIG. 39(C).

The results defined at block 33-B7 is stored in the data memory 113 as 41-BD7-2.

In this embodiment, although the automatic electrode determining means 311 (FIG. 3), which automatically determines electrode shapes and electrode reference positions, is used, the electrode shapes may be manually determined and the electrode reference positions may be automatically determined as with the conventional apparatus.

Sixth Embodiment

Figure 42:
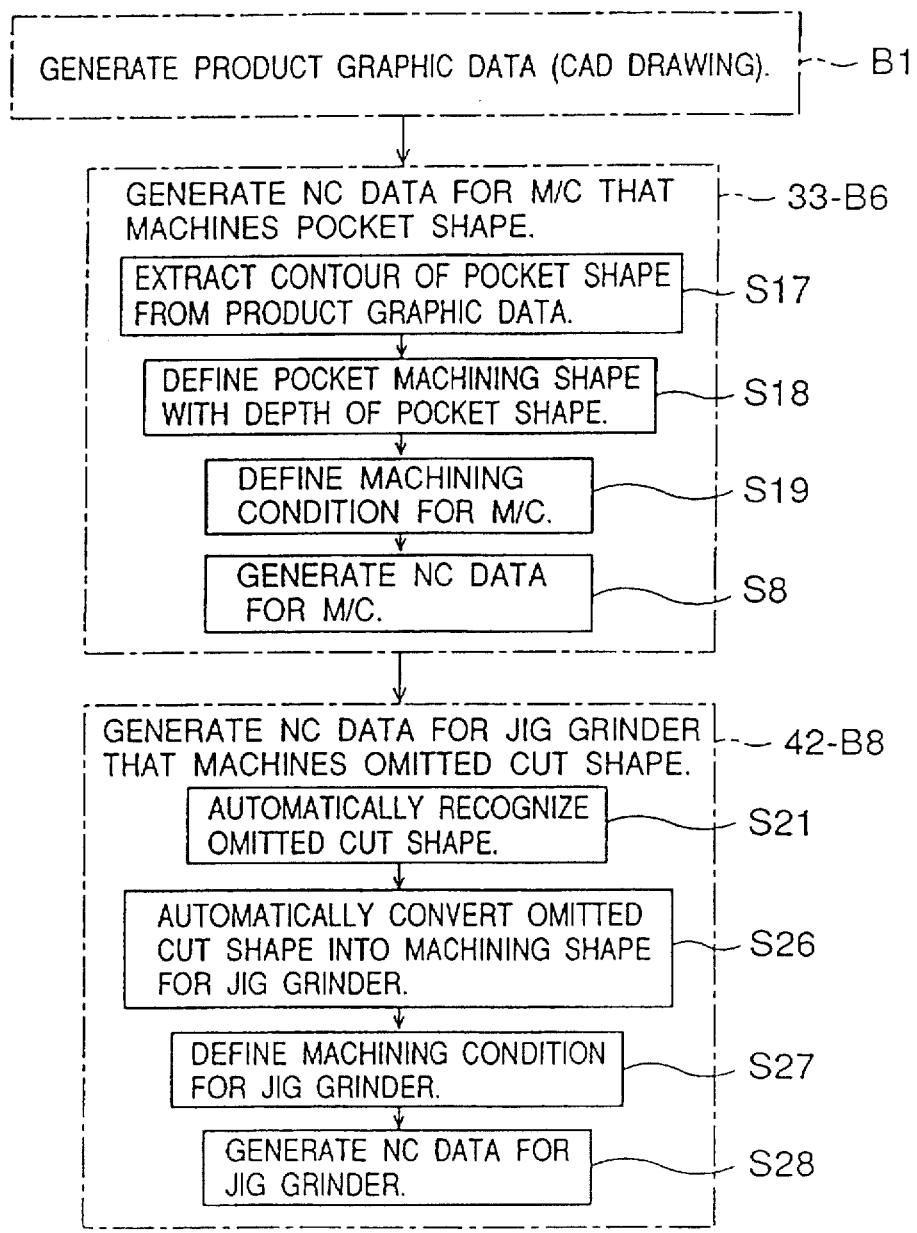
FIG. 42 is a flow chart according to a sixth embodiment of the present invention.

FIG. 42 is a flow chart showing a process of the CAD/CAM apparatus 100 for generating NC data according to a sixth embodiment of the present invention. In this embodiment, the workpiece W is machined to a product with a pocket shape 35-1 (FIG. 35) by the CAD/CAM apparatus 100. The M/C 108 machines the pocket, whereas the jig grinder 110, which is a grinding machining, machines omitted cut portions.

Figure 43A:
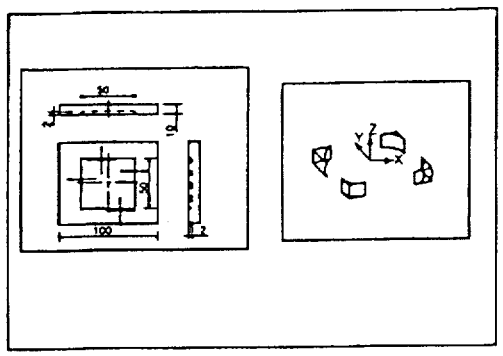
FIGS. 43(A)–(D) are schematic diagrams showing screen transitions on the CRT display for an omitted cut shape machined by a jig grinder.
Figure 43B:
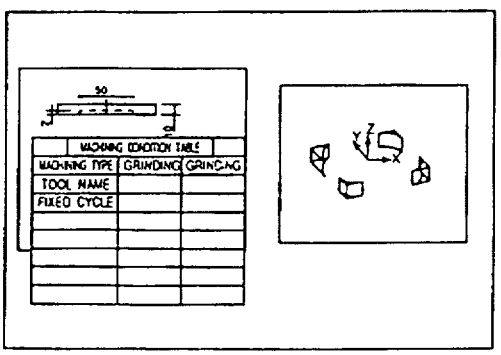
Figure 43C:
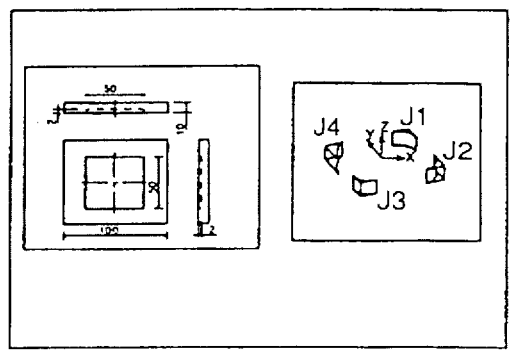
Figure 43D:
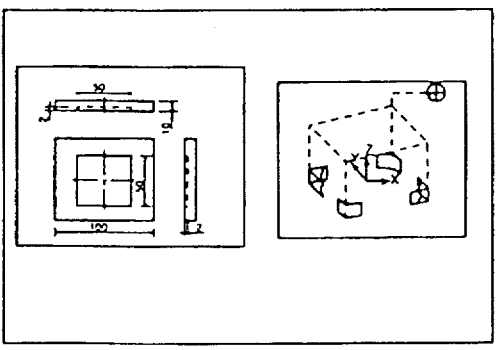

FIGS. 43(A)–(D) are schematic diagrams showing a screen transition on the CRT display in the case that omitted cut shapes are machined by the jig grinder 110. FIG. 43(A) is a schematic diagram showing a screen where omitted cut portions are recognized and stored in the data memory. FIG. 43(B) is a schematic diagram showing a screen where machining conditions of the jig grinder 110 are designated. FIG. 43(C) is a schematic diagram showing a screen where machining definition is performed for all omitted cut shapes. FIG. 43(D) is a schematic diagram showing a screen where NC data for the defined omitted cut shapes is generated.

Figure 44:
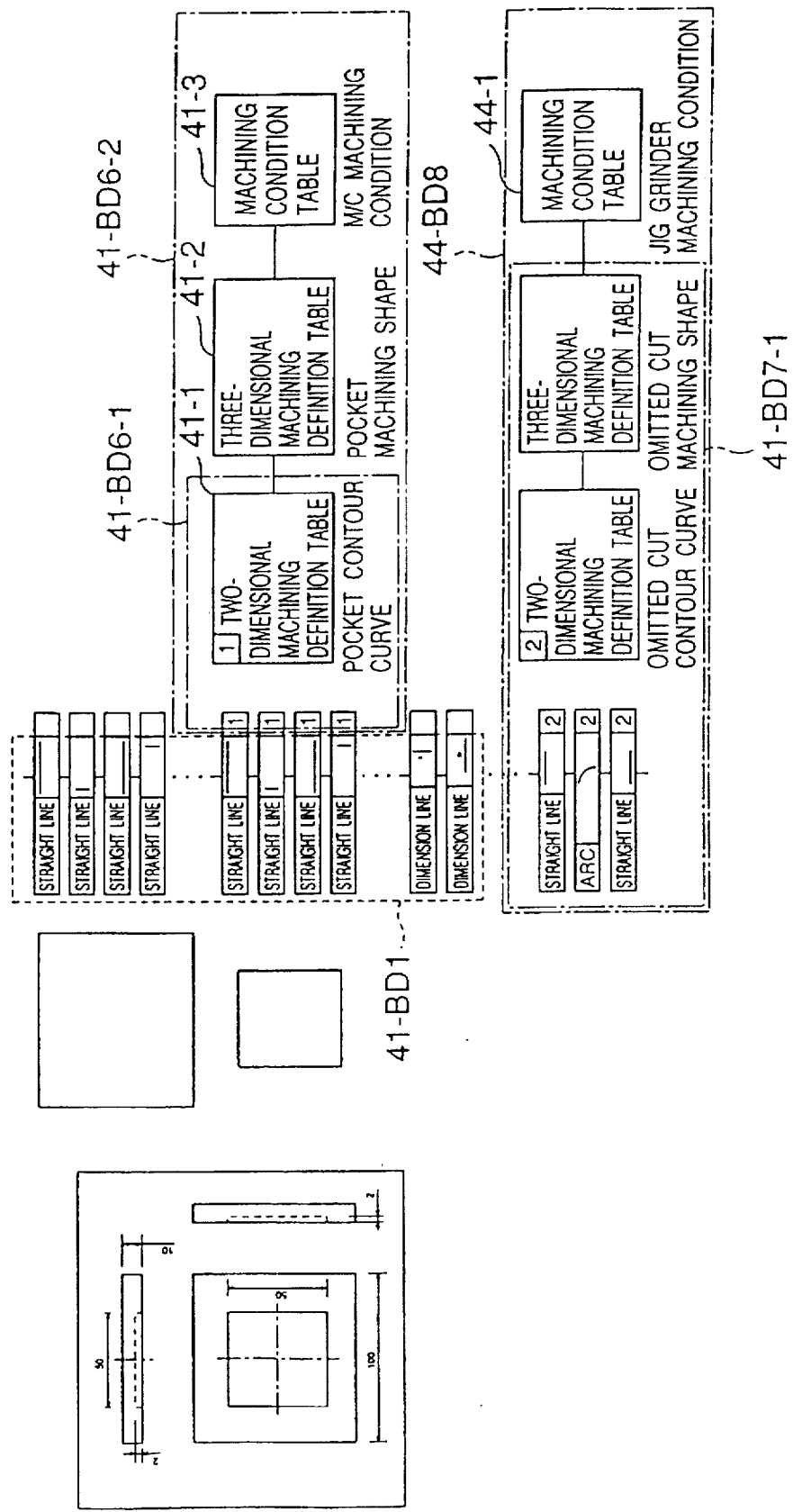
FIG. 44 is a schematic diagram showing defined machining data stored in the data memory.

As with the fifth embodiment, at block B1 of FIG. 42, product graphic data is generated. At block 33-B6, NC data for a pocket shape 35-1 machined by the M/C 108 is generated. As with the fifth embodiment, data generated at block B1 is stored as 41-BD1 of FIG. 44. In addition, data generated at block 33-B6 is stored as 41-BD6-2 of FIG. 4.

At block 42-B8, NC data for the omitted cut shapes (at block 33-B6) to be machined by the jig grinder is generated.

As with the fifth embodiment, at step S21, omitted cut shapes are automatically recognized and machining shapes are stored in the data memory 113 as 41-BD7-1. Thereafter, at step S26, the machining shapes, which were automatically defined, are defined as machining shape data that is machined by the automatic jig grinder machining shape definition means 312. In this case, the omitted cut shapes may be used as jig grinder machining shape data.

At step S27, machining conditions of the jig grinder 110 that machines automatically defined machining shapes are defined. The defined machining data is stored in a machining condition table 44-1 (FIG. 44) of the data memory 113. The machining condition table 44-1 is connected to a two-dimensional machining definition table of a machining shape 41-BD7-1 that was automatically generated. The results generated at the block 42-B8 of FIG. 42 are stored in the memory 113 in such a form as 44-BD8 of FIG. 44.

Thus, the determination of the omitted cut shapes and the machining shape definition for the jig grinder 110 can be automatically performed at steps S21 and S26 unlike with the conventional apparatus, which requires manual operation.

At step 28, NC data is generated with such defined and stored jig grinder machining source data.

Seventh Embodiment

Figure 45:
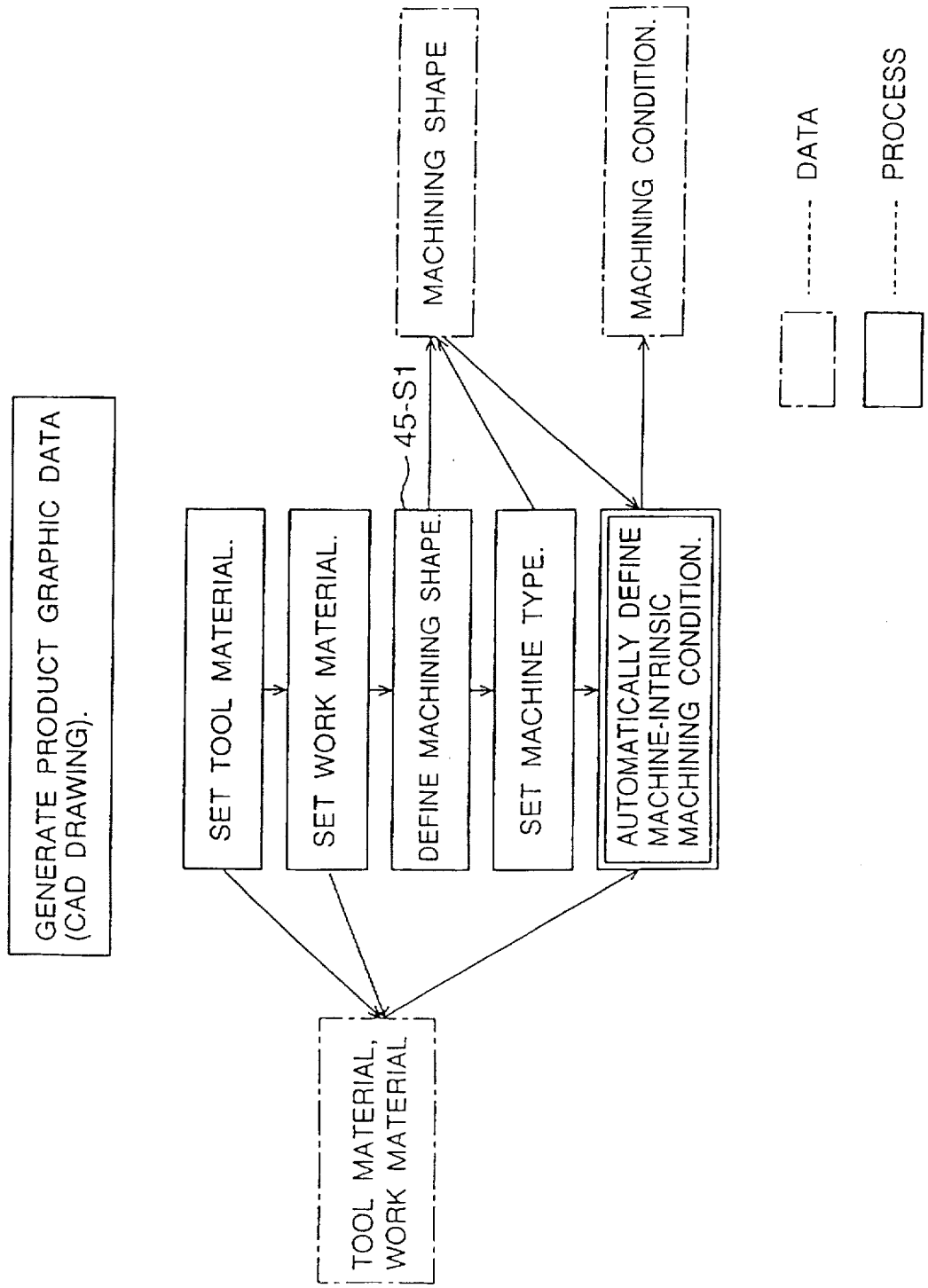
FIG. 45 is a flow chart according to a seventh embodiment of the present invention.

FIG. 45 is a flow chart showing a process of the CAD/CAM apparatus for automatically defining machining conditions for a plurality of machines according to a seventh embodiment of the present invention.

Figure 46:
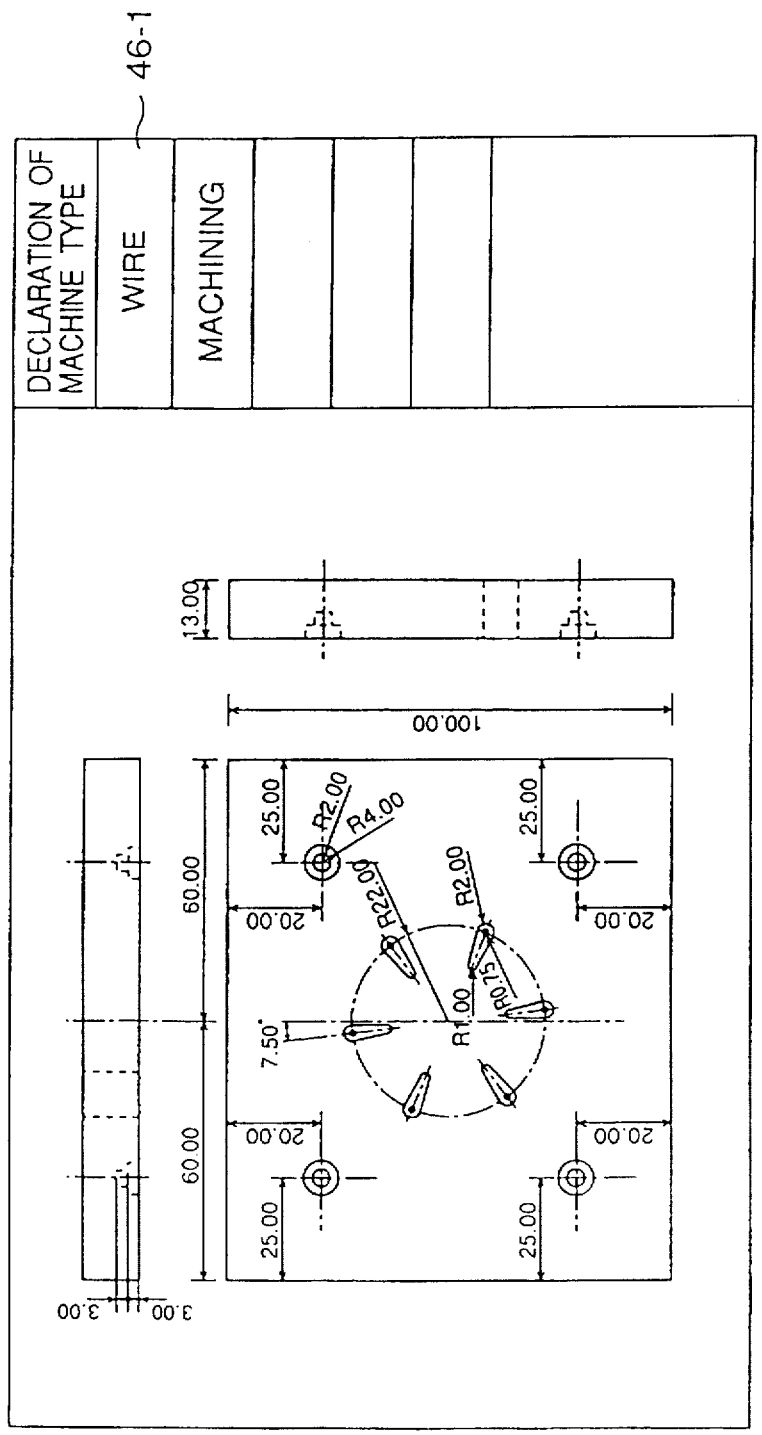
FIG. 46 is a schematic diagram showing a screen on the CRT display in the case that a wire discharge machining setting declaration is performed.

When machining data for the M/C is generated, machining shapes are defined (at step 45-S1) and then machining conditions are defined. At this point, the machine type determining means 313 determines machines that machine the machining shapes defined by the automatic machine intrinsic machining condition determining means (FIG. 3) so as to automatically determine the machining conditions. In reality, as shown in FIG. 46, the cursor is moved to a position 46-1 with the mouse and the mouse button is clicked so as to perform the wire discharge machining declaration. Next, a machining shape machined by the wire discharge machine is selected. In the case that a shape is machined by the machining center 108, after the M/C machining declaration is performed, a machining shape is selected. Now, assume the material of a workpiece and the material of a tool has been designated.

When the machine declaration is performed, machining conditions are automatically determined corresponding to the material of the workpiece, the material of the tool, and the type of the machine that machines the defined machining shape.

FIG. 47 is a table showing machining conditions that have not been automatically determined. FIG. 48 is a table showing machining conditions that have been automatically determined.

Eighth Embodiment

Figure 49:
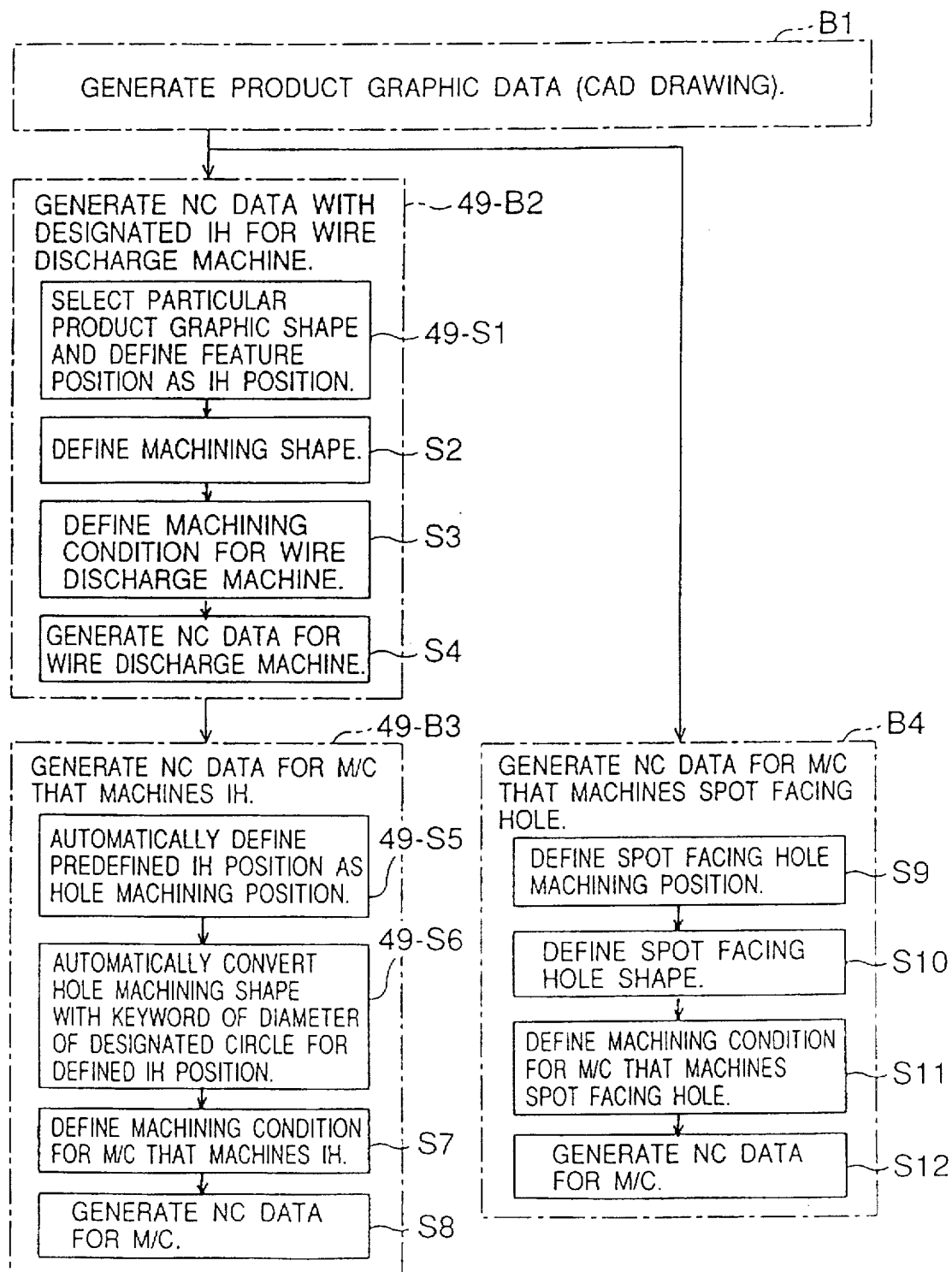
FIG. 49 is a flow chart according to an eighth embodiment of the present invention.

FIG. 49 is a flow chart showing a process of the CAD/CAM apparatus 100 for extracting feature positions corresponding to machines from defined graphic data according to an eighth embodiment of the present invention.

In this embodiment, as with the first embodiment, IH positions for prepared holes machined by the machining center 108 are defined on the CRT display 102. Feature positions of the product graphic data can be designated to IH positions by the product graphic data feature position determining means 315. In the eighth embodiment, not only the machining positions, but prepared hole shapes can be automatically defined.

At block B1 of the flow chart shown in FIG. 49, product graphic data is generated. At this point, information representing prepared hole shapes of Ihs are predefined with particular graphic data. For example, a hole with a diameter of 1.50 mm, a normal color, and a normal line type is treated as a hole shape. As with the first embodiment, the results defined at B1 of FIG. 49 are stored in a form of BD1 of FIG. 52 in the data memory 113.

At step 49-S1 of block 49-B2, IH positions machined by the wire discharge machine are defined. As with the conventional apparatus, the through-shape 501 (FIG. 5), which is wire discharge machining NC data, is generated on a screen shown in FIG. 50 that is an enlarged view of a broken line frame 66-1 of FIG. 66.

Figure 50:
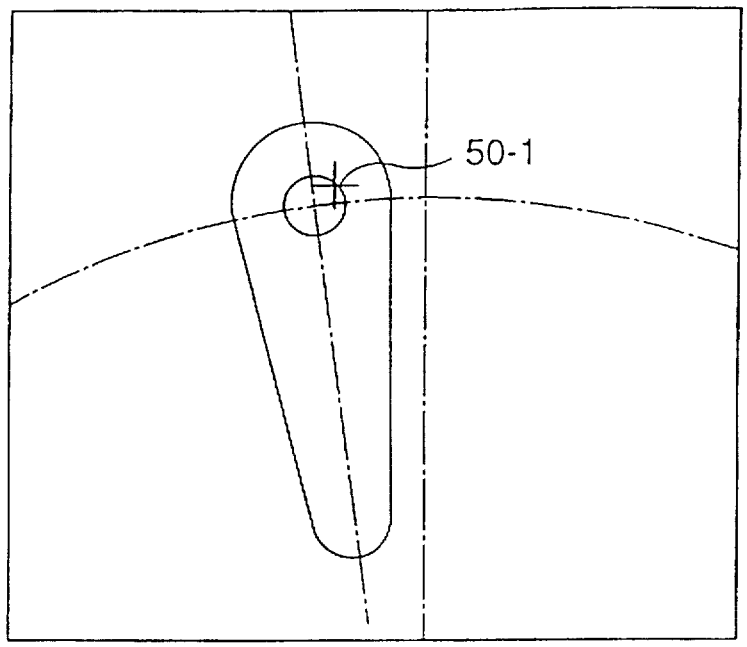
FIG. 50 is a schematic diagram showing a screen when a cursor is moved to a circle representing an IH by a mouse and a mouse button is clicked so as to determine the IH.
Figure 51:
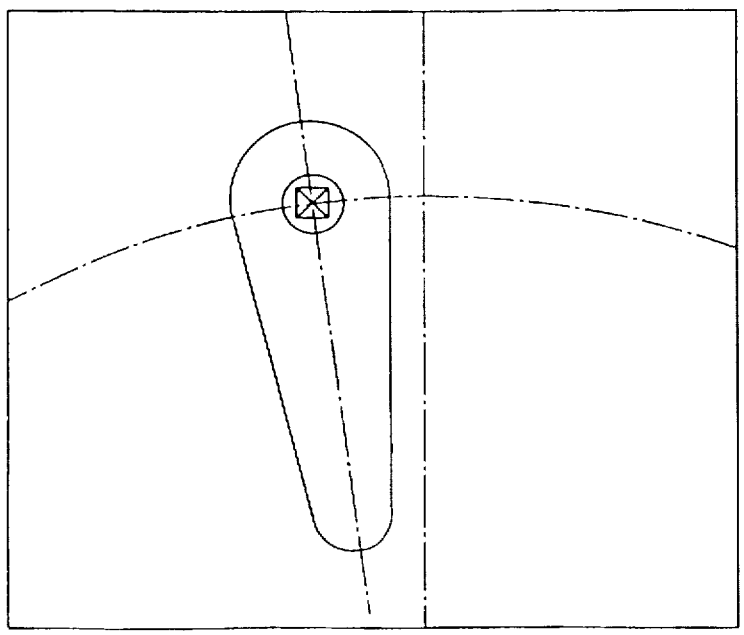
FIG. 51 is a schematic diagram showing a mark representing that the IH has been defined.

The designer moves the cursor to a circle 50-1 with the mouse 104 (FIG. 1) and clicks the mouse button (FIG. 50). Thus, the center position of the designated circle is defined as an IH. A mark representing that the IH has been defined is displayed on the CRT display (FIG. 51).

As with the first embodiment, the determination of the machining shape of the through-shape 505 and the generation of the NC data corresponding to the wire discharge machining data are performed in the order of steps S2, S3, and S4 of the block 49-B2. Likewise, NC data for the through-shapes 506 to 510 machined by the wire discharge machine is generated.

Figure 52:
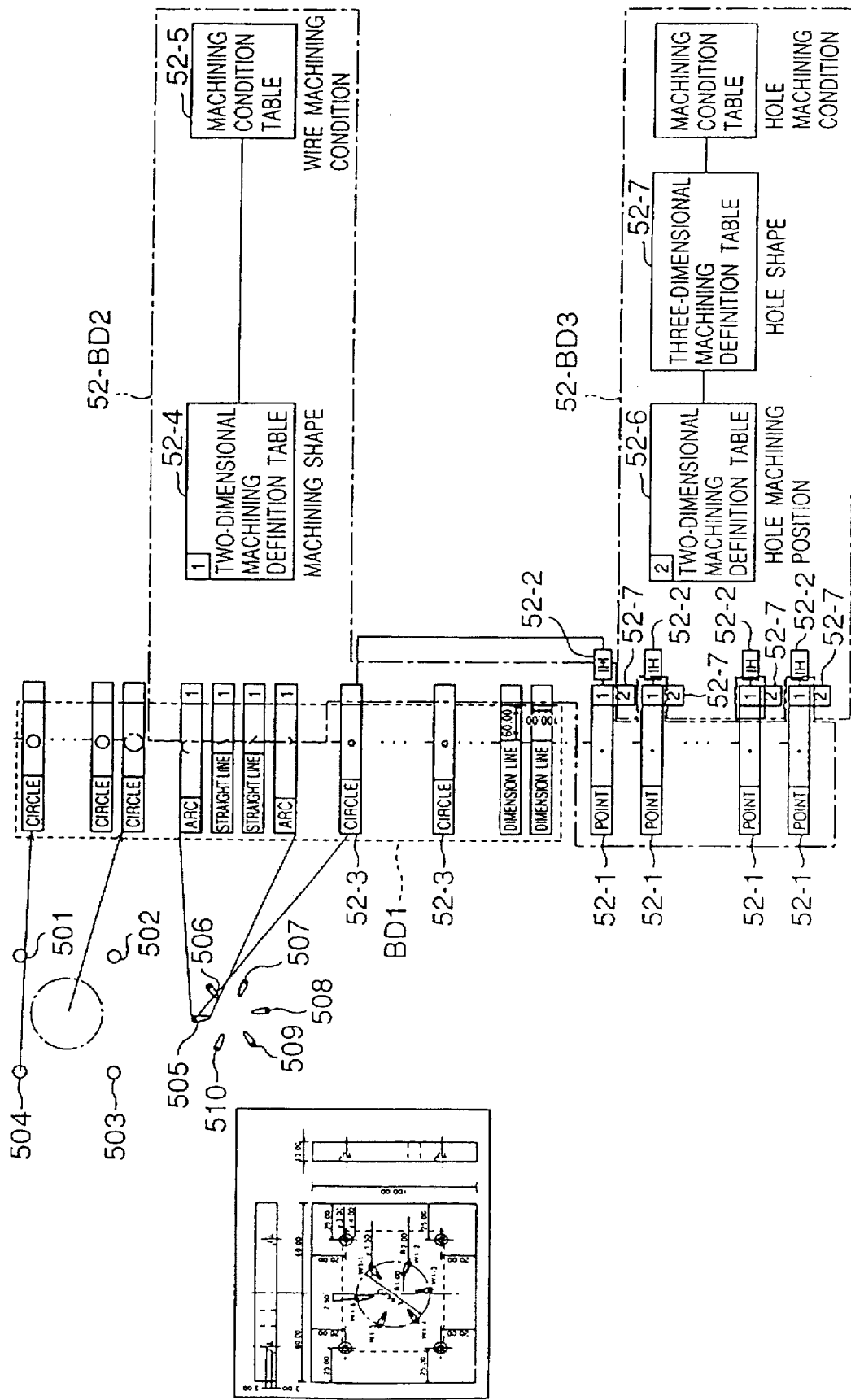
FIG. 52 is a schematic diagram showing wire discharge machining NC data and M/C machining NC data stored in the data memory.

The generated wire discharge machining NC data is stored in the data memory 113 (FIG. 2) as 52-BD2 shown in FIG. 52.

The data is stored in the following manner.

When an IH for the wire discharge machine 107 has been generated, element data 52-1 and an attribute 52-2 representing that the element data denotes an IH position are connected and then stored. When an IH is defined, a circle 52-3 of element data into which product graphic data is decomposed is connected to element data 52-1 generated as an IH position.

As with the first embodiment, wire discharge machining shapes and machining conditions are defined and stored in a two-dimensional machining definition table 52-4 and a machining condition table 52-5.

Next, a process for generating machining data for IH's machined by the M/C 108 will be described corresponding to each step of block 49-B3 shown in FIG. 49.

As with the first embodiment, at step 49-S5, IH positions of the wire discharge machine 107 are retrieved from data BD1 and 52-BD2 (FIG. 52) stored in the data memory 113 shown in FIG. 2 and automatically defined.

Information representing that the position of element data also denotes a hole machining position is added to element data containing the retrieved IH position. The added hole machining position information consists of a two-dimensional machining definition table 52-6 that groups hole machining positions and table number 2 (52-7, . . . , 52-7) that is stored in element data having IH attributes. When the retrieved shape is connected to element data that determines a hole shape, a hole machining shape with a keyword that is the diameter of the designated circle of an IH position defined at step 49-S6 is automatically defined, stored in a three-dimensional machining definition table 52-8 shown in FIG. 52, and connected to the two-dimensional machining definition table 52-6 that has stored hole machining position information.

Figures 54, 55:
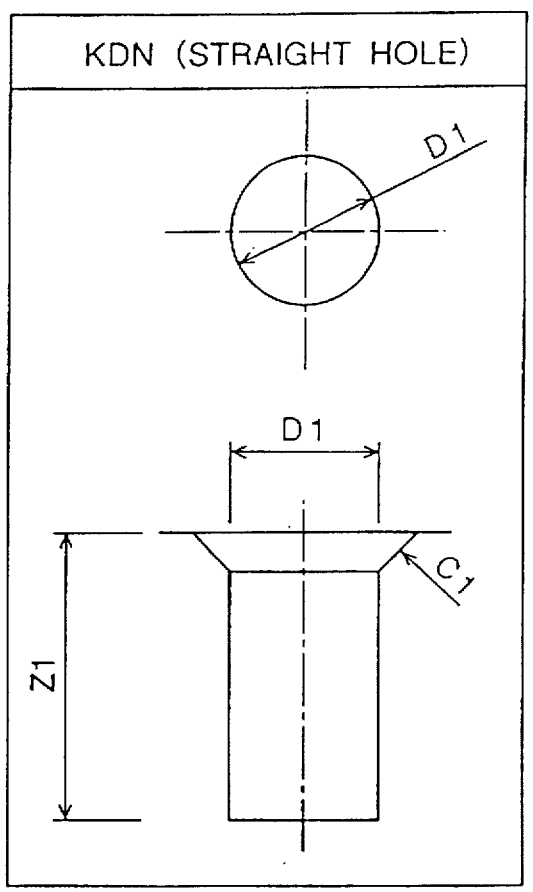
FIG. 54 is a schematic diagram showing a hole shape.
FIG. 55 is a schematic diagram representing that the dimension is uniquely defined by a hole shape name and a nominal size.

To automatically define the hole shape data, a hole shape determining table (FIG. 53) with a keyword of the size (diameters) of element data (circles) is prepared. In the table, a circle with a diameter of 1.50 mm, a normal color, and a normal line type of the product graphic data shown in FIG. 7 has a hole shape type of KDN and a nominal size of D015. FIG. 54 shows the hole shape of KDN. FIG. 55 shows the nominal size of D015, which has a diameter D1 of 1.50 mm, a depth Z1 of 13 mm, and a chamfering amount C1 of 0.0 mm.

In the table shown in FIG. 53, rows 53-1 to 53-3 designate which graphic data of the product graphic data are holes. In the table, it is assumed that circles are determined as holes. The row 53-1 designates the diameters of circles. The row 53-2 designates colors of holes. The row 53-3 designates line types. The rows 53-4 and 53-5 designate hole shapes. The row 53-4 designates hole shape types. The row 53-5 designates nominal values.

Graphic data having information designated on the rows 53-1 to 53-3 are automatically defined as shape types and nominal values on the rows 53-4 and 53-5, respectively. The designation of prepared hole shapes can be automatically performed at step 49-S6 unlike with the conventional apparatus, which, requires manual operation. At step S7, machining conditions for M/C machining Ihs are defined. At step S5, the M/C machining NC data is generated.

The results defined at block 41-B3 is stored as 52-BD3 in the data memory 113.

In this embodiment, a circle with a designated feature is automatically defined as a hole shape. In addition, a square with a designated feature may be automatically defined as a designated pocket shape. A point with a designated feature may be automatically defined as an engraving discharge position with a designated electrode.

The product graphic data feature position determining means 315 determines any graphic data featured in product graphic data. The automatic engraving discharge machine machining position defining means 316, the automatic wire discharge machine machining position defining means 317, and the automatic machining center machining position defining means 318 extract the determined graphic data as machining data corresponding to each machine.

Ninth Embodiment

Figure 56:
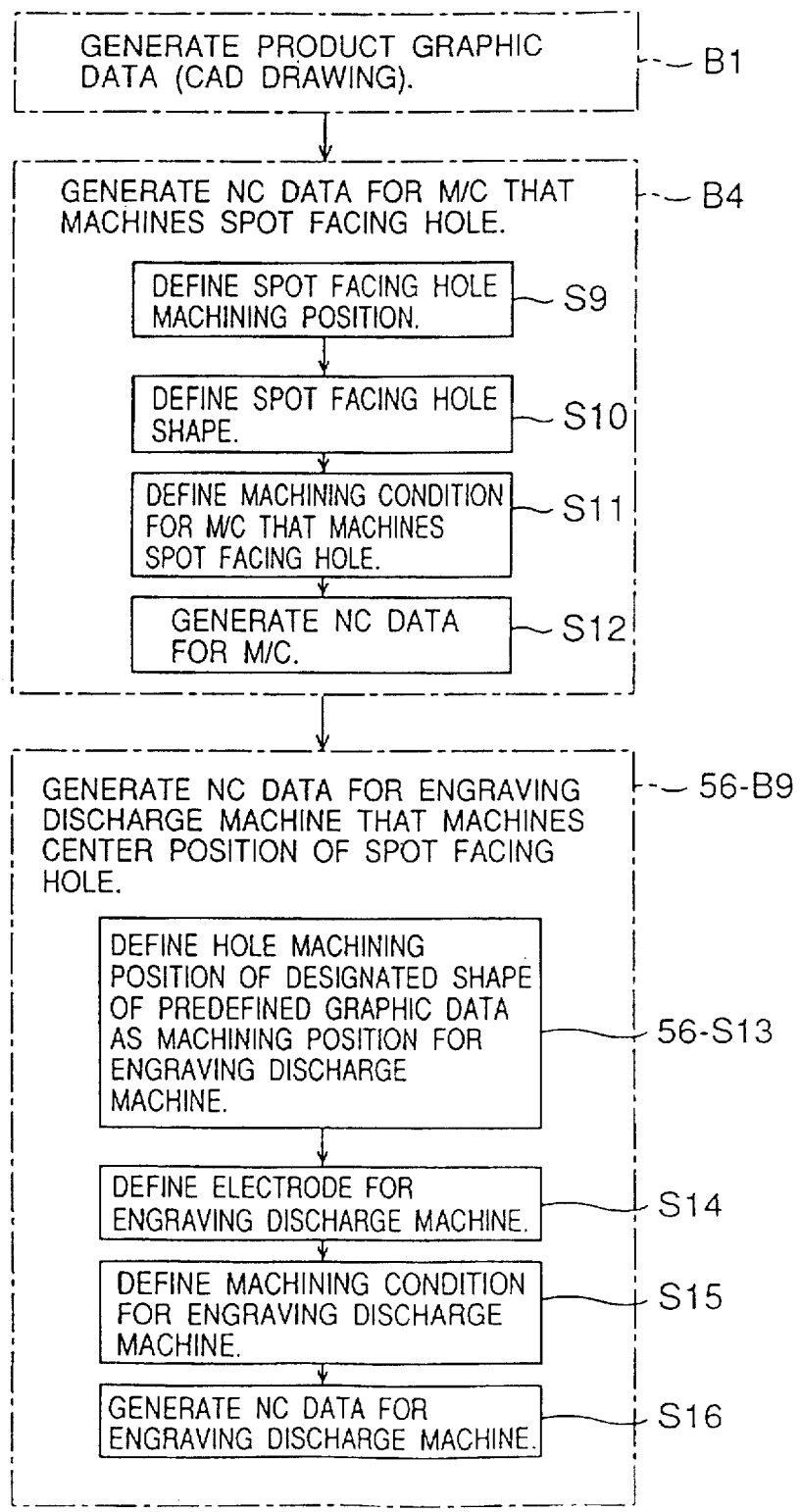
FIG. 56 is a flow chart according to a ninth embodiment of the present invention.

FIG. 56 is a flow chart showing a process of the CAD/CAM apparatus 100 for obtaining feature positions or shapes of product graphic data corresponding to each machine.

In this embodiment, a hole position with a designated shape is treated as an engraving discharge machining position.

Figure 57:
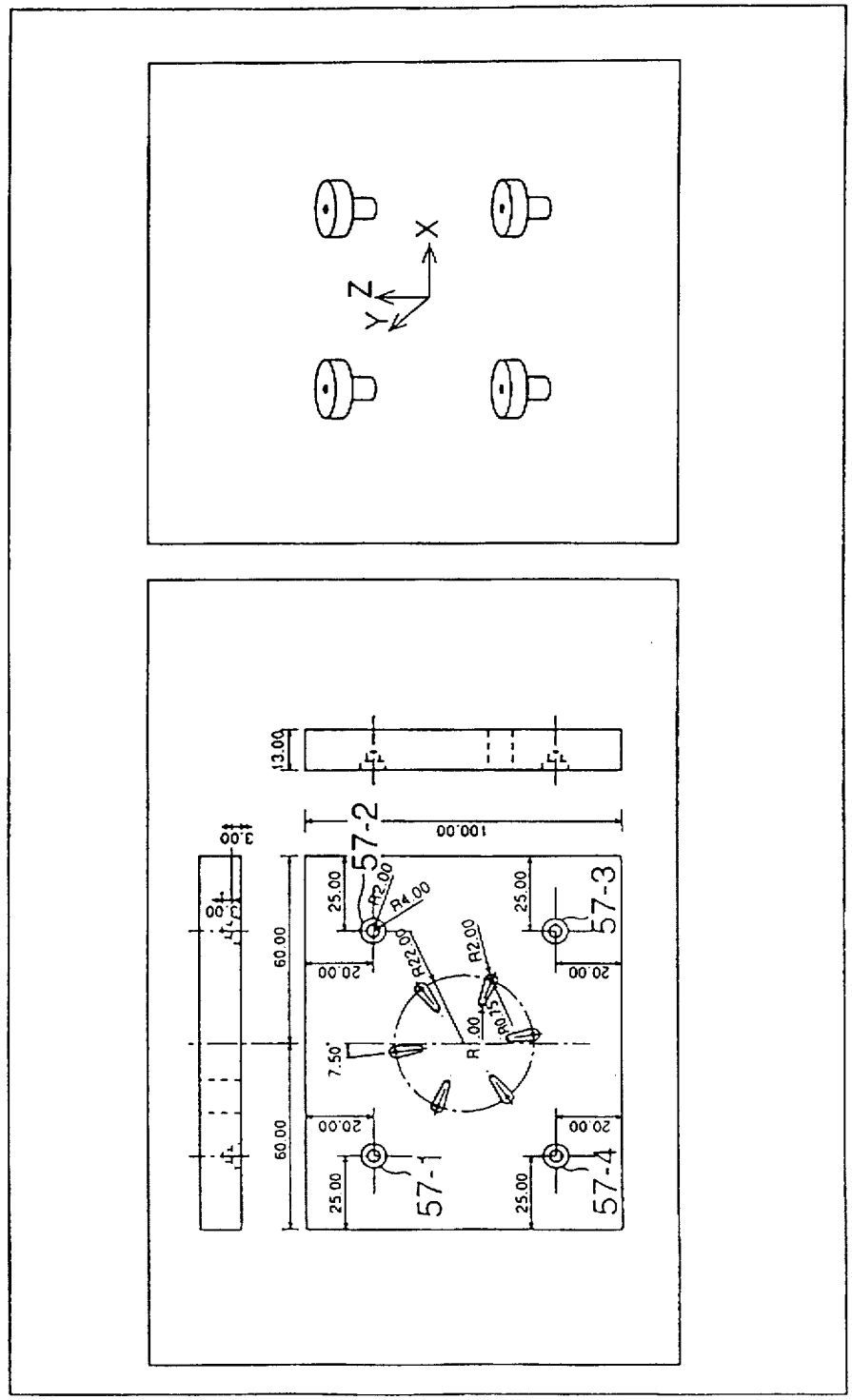
FIG. 57 is a schematic diagram showing product graphic data displayed on the CRT display according to the ninth embodiment of the present invention.
Figure 58:
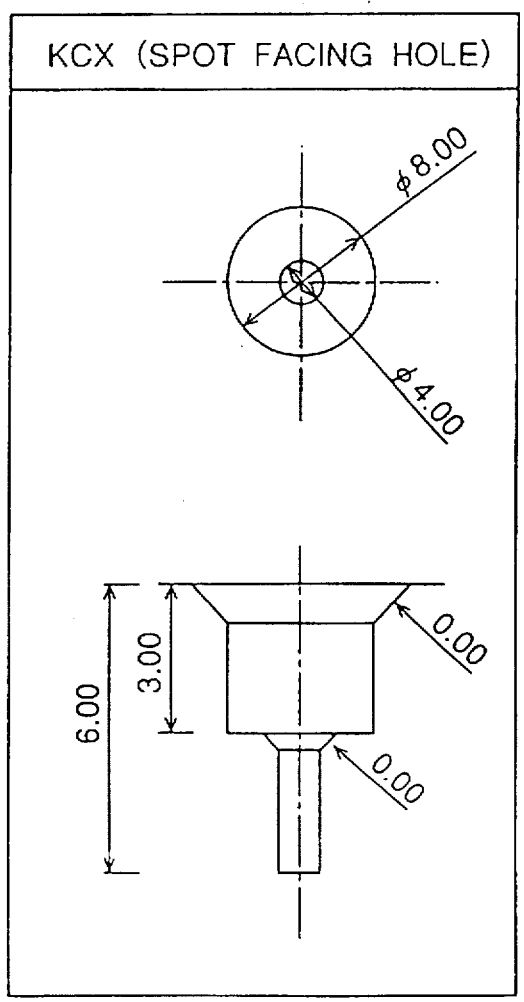
FIG. 58 is a schematic diagram showing a hole shape.

Spot facing holes shown in FIG. 58 are defined at positions 57-1, 57-2, 57-3, and 57-4 of product graphic data shown in FIG. 57 in the same order as block B4 of the first embodiment and stored in the data memory 113 shown in FIG. 2 in a form of BD4 of FIG. 59.

Figure 60:
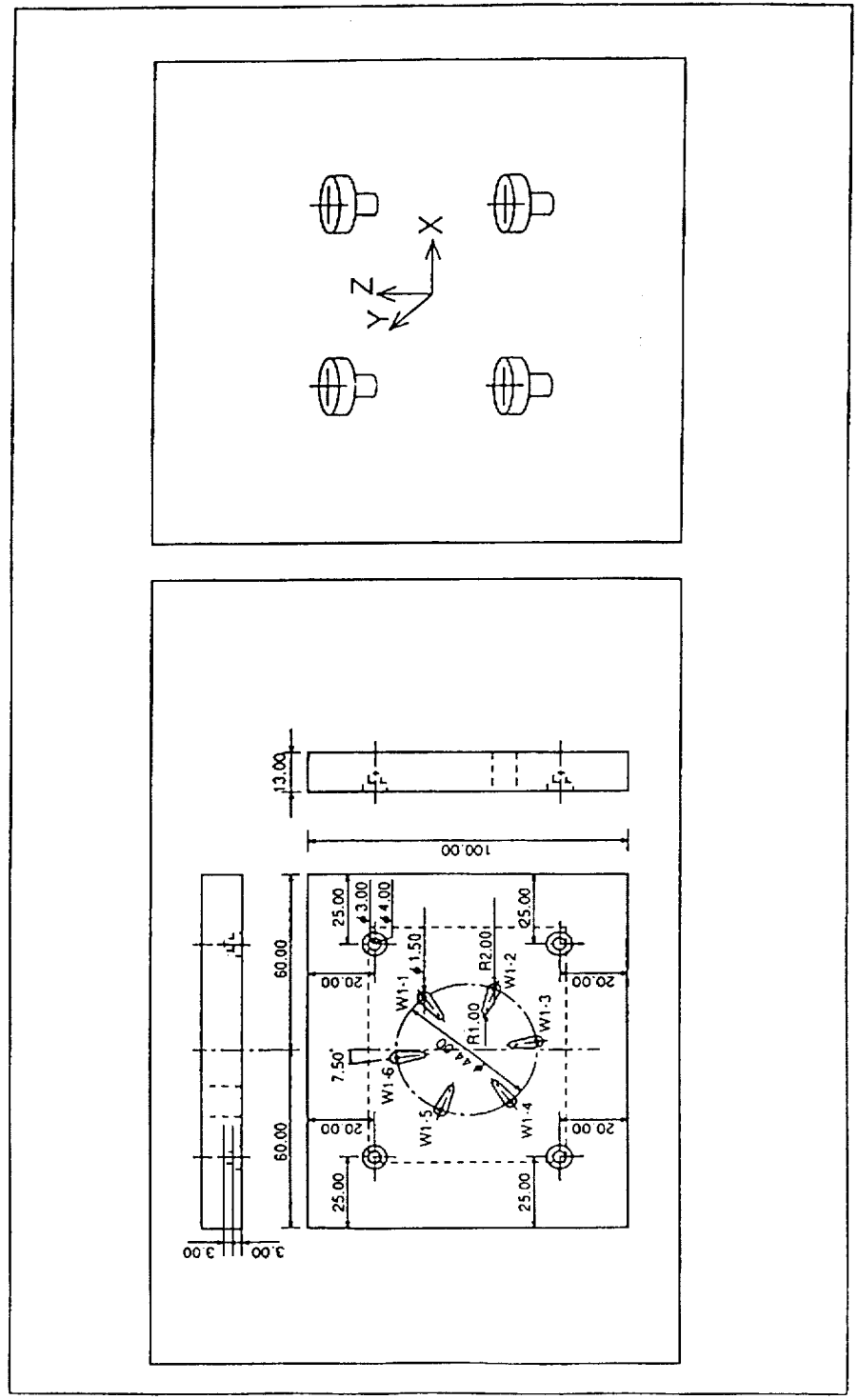
FIG. 60 is a schematic diagram showing the hole positions of FIG. 59 displayed on the CRT display.
Figure 61:
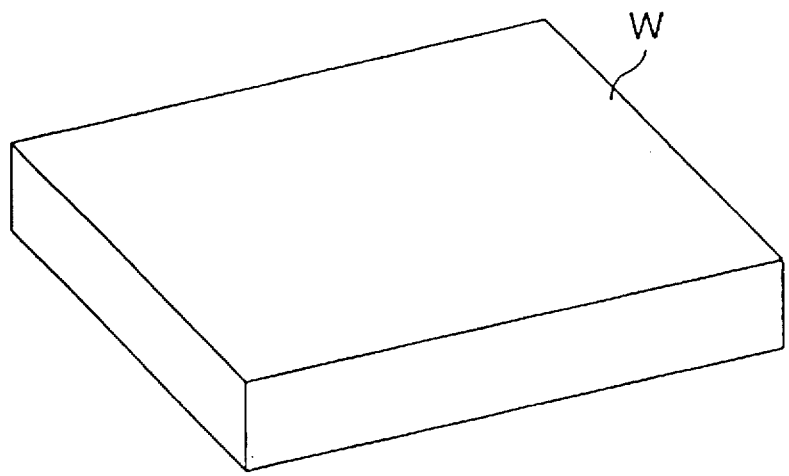
FIG. 61 is a schematic diagram showing a workpiece.
Figure 62:
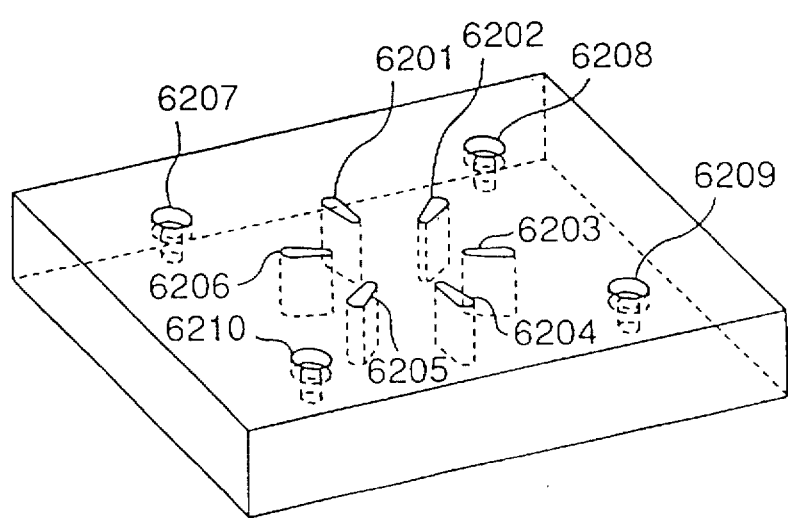
FIG. 62 is a schematic diagram showing a product.
Figure 63:
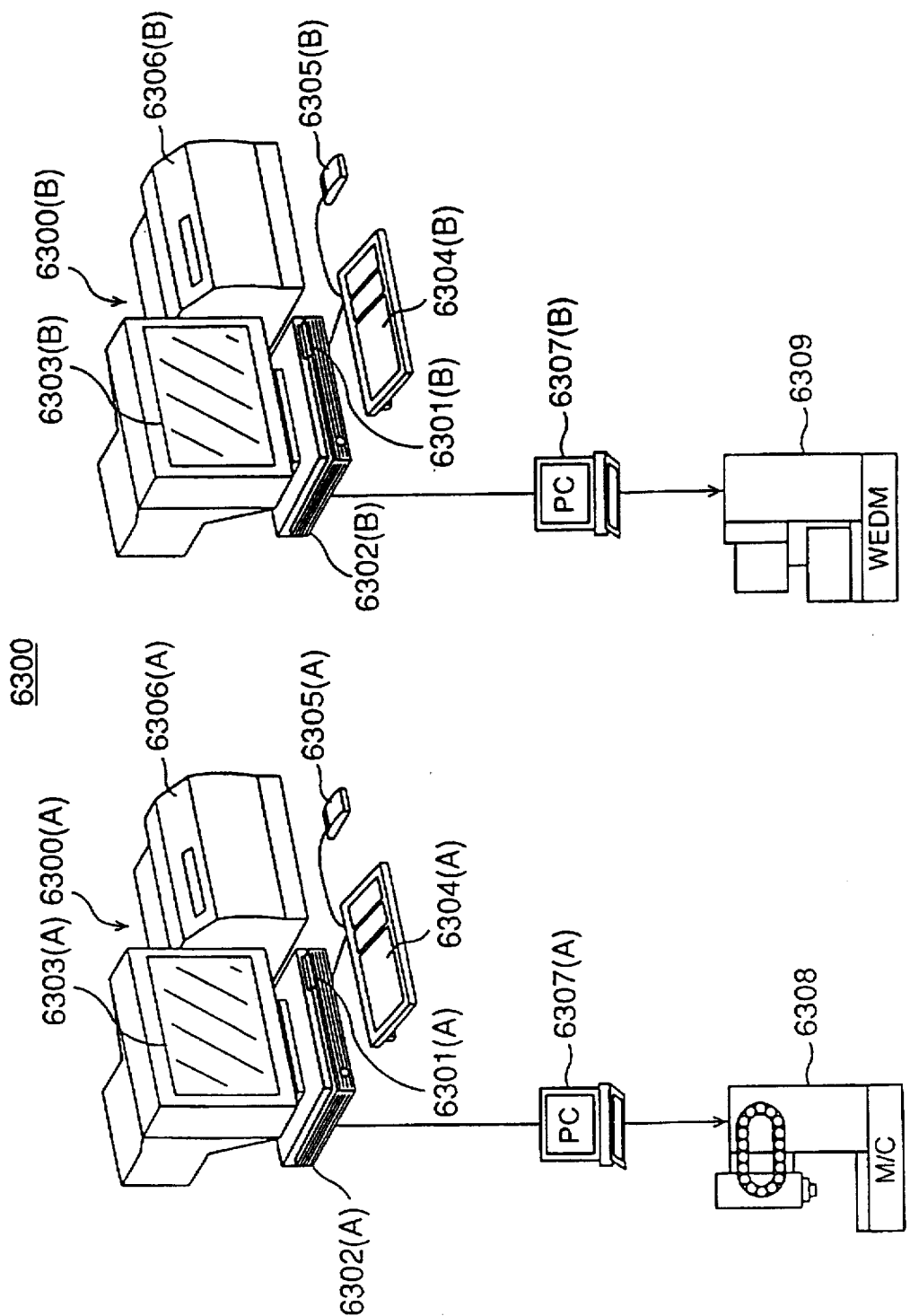
FIG. 63 is a schematic diagram showing an overall construction of a conventional CAD/CAM apparatus for generating NC data.

At step 56-S13 of block B9 in FIG. 56, positions of hole shapes with dimensions shown in FIG. 58 are retrieved. The automatic engraving discharge machine machining position defining means 316 automatically defines the retrieved data as engraving discharge machining positions. Data 59-DB7 shown in FIG. 59 is added to the data memory 113. FIG. 60 shows the data 59-BD7 displayed on the CRT display 102.

As described above, at step 56-S13, the process for defining predefined hole machining positions as engraving discharge machining positions is automatically performed unlike with the conventional apparatus, which requires manual operation.

According to the CAD/CAM apparatus of the present invention, two-dimensional machining shapes and three-dimensional machining shapes are defined with product graphic data independent from the machine. In addition, since machining conditions such as the machine type, process sequence, and machining method are defined corresponding to the two-dimensional machining shapes and the three-dimensional machining shapes, various output machines can be designated for the pre-defined machining shapes.

For example, with respect to a laser machine and a wire discharge machine that travels on a two-dimensional plane, machining conditions can be defined for two-dimensional machining shapes. With respect to a machining center that travels in a three-dimensional space, machining conditions can be defined for three-dimensional machining shapes.

When omitted cut portions are defined as machining shapes, machining conditions of any machine that machines the omitted cut portions can be defined.

According to the CAD/CAM apparatus of the present invention, machining shapes and machining conditions can be defined corresponding to element data where product graphic data is decomposed without need to recognizing a two-dimensional machining shape and a three-dimensional machining shape.

According to the CAD/CAM apparatus of the present invention, since prepared hole machining shapes are automatically determined corresponding to the size of machining shapes, a prepared hole shape defining means may be omitted.

According to the CAD/CAM apparatus of the present invention, if prepared hole shapes have been registered, only when a prepared hole interferes with a corresponding machining shape, a prepared hole shape corresponding to the machining shape is automatically generated. Thus, the shapes of prepared holes are unified with the same shape. In addition, since an interference check process is omitted, the response (speed) of the apparatus is improved.

According to the CAD/CAM apparatus of the present invention, initial hole positions of the wire discharge machine can be used for machining positions of the engraving discharge machine without need to input machining positions for the engraving discharge machine.

According to the CAD/CAM apparatus of the present invention, initial holes for the wire discharge machine can be used for the machining center without need to input hole machining position of the machining center.

According to the CAD/CAM apparatus of the present invention, when omitted cut shapes of a machine are machined by the engraving discharge machine, machine shapes are automatically defined and electrode shapes are automatically determined. Thus, a manual check operation of the omitted cut portions and a defining process thereof can be omitted.

According to the CAD/CAM apparatus of the present invention, when omitted cut shapes of a machine are machined by a grinding machine, since machine shapes are automatically defined, a manual check operation of the omitted cut shapes and a defining process thereof can be omitted.

According to the CAD/CAM apparatus of the present invention, since machining conditions are automatically determined corresponding to a workpiece to be machined, the type of a tool, and the type of a machine, the designation of the machining conditions corresponding to the accuracy of the machine and the like can be omitted.

According to the CAD/CAM apparatus of the present invention, a position with a feature (for example, a position with a designated attribute) of product graphic data is automatically defined at a hole machining position of the machining center, a discharge position of the engraving discharge machine, or an initial hole position of the wire discharge position. When the position with the feature is machined by another machine, it is not necessary to define this position.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A CAD/CAM apparatus, comprising:
   means for decomposing product graphic data into element data, comprising at least one of a line, an arc, a point, and a circle, and a first storing means for storing the element data;
   means for extracting said element data from said first storing means;
   a plurality of two-dimensional machining definition tables operative to receive from said extracting means the element data stored in said storing means and to store the extracted element data as a two-dimensional machining shape;
   means for utilizing the content of at least one of said plurality of two-dimensional machining definition tables in order to define a three-dimensional machining shape;
   a three dimensional machining definition table for storing a representation of said three dimensional machining shape;
   a plurality of machining condition storing means for storing machining condition data corresponding to a plurality of machines;
   attribute defining means for adding data representing a machining feature to the element data; and
   means for generating (1) NC data intrinsic to said machines or (2) NC source data corresponding to a combination of (a)(1) said plurality of two-dimensional machining definition tables or (a)(2) said three-dimensional machining definition table and (b) the machining condition data of said plurality of machining condition storing means.

2. The CAD/CAM apparatus as set forth in claim 1, further comprising:
   means for determining the size of a machining shape; and
   means for automatically determining prepared hole shape data corresponding to the size of the machining shape.

3. The CAD/CAM apparatus as set forth in claim 2, further comprising:
   means for registering a prepared hole shape; and
   means for determining whether or not the registered prepared hole shape interferes with and is larger than the machining shape so as to determine whether or not to use the registered prepared hole shape corresponding to the determined result, and whether or not to automatically generate the prepared hole shape corresponding to the size of the machining shape.

4. The CAD/CAM apparatus as set forth in claim 1, further comprising:
   means for determining an initial hole position for a wire electric discharge machine; and means for automatically defining the initial hole position as a machining position of an engraving discharge machine.

5. The CAD/CAM apparatus as set forth in claim 1, further comprising:
    means for determining an initial hole position for a wire electric discharge machine; and
    means for automatically defining the initial hole position as a hole position of a machining center.

6. The CAD/CAM apparatus as set forth in claim 1, further comprising:
    means for recognizing an omitted cut shape corresponding to the generated NC data or NC source data;
    means for automatically defining the omitted cut shape as a machining shape for an engraving discharge machine; and
    means for automatically determining an electrode for machining the omitted cut shape.

7. The CAD/CAM apparatus as set forth in claim 1, further comprising:
    means for recognizing an omitted cut shape corresponding to the generated NC data or NC source data; and
    means for automatically defining the omitted cut shape as a machining shape for a grinding machine.

8. The CAD/CAM apparatus as set forth in claim 1, further comprising:
    means for determining to what machine the NC data or NC source data that has been defined is output; and
    means for automatically determining a machining condition corresponding to the type of the machine to which the NC data or NC source data has been output, a workpiece to be machined, and the type of a tool to be used.

9. A CAD/CAM apparatus, comprising:
    means for decomposing product graphic data into element data, comprising at least one of a line, an arc, a point, and a circles and a first storing means for storing the element data;
    means for extracting said element data from said first storing means;
    a plurality of two-dimensional machining definition tables operative to receive from said extracting means the element data stored in said storing means and to store the extracted element data as a two-dimensional machining shape;
    a plurality of machining condition storing means for storing machining conditions corresponding to a plurality of machines;
    attribute defining means for adding data representing a machining feature to the element data; and
    means for generating (1) NC data intrinsic to the machines or (2) NC source data corresponding to a combination of said plurality of two-dimensional machining definition tables and the machining condition data of said plurality of machining condition storing means.

10. The CAD/CAM apparatus as set forth in claim 9, further comprising:
    means for determining the size of a machining shape; and
    means for automatically determining prepared hole shape data corresponding to the size of the machining shape.

11. The CAD/CAM apparatus as set forth in claim 10, further comprising:
    means for registering a prepared hole shape; and
    means for determining whether or not the registered prepared hole shape interferes with and is larger than the machining shape so as to determine whether or not to use the registered prepared hole shape corresponding to the determined result, and whether or not to automatically generate the prepared hole shape corresponding to the size of the machining shape.

12. The CAD/CAM apparatus as set forth in claim 9, further comprising:
    means for determining an initial hole position for a wire electric discharge machine; and
    means for automatically defining the initial hole position as a machining position of an engraving discharge machine.

13. The CAD/CAM apparatus as set forth in claim 9, further comprising:
    means for determining an initial hole position for a wire electric discharge machine; and
    means for automatically defining the initial hole position as a hole position of a machining center.

14. The CAD/CAM apparatus as set forth in claim 9, further comprising:
    means for recognizing an omitted cut shape corresponding to the generated NC data or NC source data;
    means for automatically defining the omitted cut shape as a machining shape for an engraving discharge machine; and
    means for automatically determining an electrode for machining the omitted cut shape.

15. The CAD/CAM apparatus as set forth in claim 9, further comprising:
    means for recognizing an omitted cut shape corresponding to the generated NC data or NC source data; and
    means for automatically defining the omitted cut shape as a machining shape for a grinding machine.

16. The CAD/CAM apparatus as set forth in claim 9 comprising:
    means for determining to what machine the NC data or NC source data that has been defined is output; and
    means for automatically determining a machining condition corresponding to the type of the machine to which the NC data or NC source data has been output, a workpiece to be machined, and the type of a tool to be used.

17. A CAD/CAM apparatus, comprising:
    means for decomposing product graphic data into element data comprising at least one of a line, an arc, a point, a circle, a prism, and a sphere, and a first storing means for storing the element data;
    means for extracting said element data from said first storing means;
    a plurality of machining condition storing means for storing machining conditions corresponding to a plurality of machines;
    attribute defining means for adding data representing a machining feature to the element data;
    means for generating (1) NC data intrinsic to the machines or (2) NC source data corresponding to a combination of the element data of said first storing means and the machining condition data of said plurality of machining condition storing means;
    means for determining the size of a machining shape; and
    means for automatically determining prepared hole shape data corresponding to the size of the machining shape.

18. The CAD/CAM apparatus as set forth in claim 17, further comprising:

means for registering a prepared hole shape; and means for determining whether or not the registered prepared hole shape interferes with and is larger than the machining shape so as to determine whether or not to use the registered prepared hole shape corresponding to the determined result, and whether or not to automatically generate the prepared hole shape corresponding to the size of the machining shape.

19. A CAD/CAM apparatus, comprising:

means for decomposing product graphic data into element data, comprising at least one of a line, an arc, a point, a circle, a prism, and a sphere, and a first storing means for storing the element data;

means for extracting said element data from said first storing means;

a plurality of machining condition storing means for storing machining conditions corresponding to a plurality of machines;

attribute defining means for adding data representing a machining feature to the element data;

means for generating (1) NC data intrinsic to the machines or (2) NC source data corresponding to a combination of the element data of said first storing means and the machining condition data of said plurality of machining condition storing means;

means for determining an initial hole position for a wire electric discharge machine; and means for automatically defining the initial hole position as a machining position of an engraving discharge machine.

20. A CAD/CAM apparatus, comprising:

means for decomposing product graphic data into element data, comprising at least one of a line, an arc, a point a circle, a prism, and a sphere, and a first storing means for storing the element data;

means for extracting said element data from said first storing means;

a plurality of machining condition storing means for storing machining conditions corresponding to a plurality of machines;

attribute defining means for adding data representing a machining feature to the element data;

means for generating (1) NC data intrinsic to the machines or (2) NC source data corresponding to a combination of the element data of said first storing means and the machining condition data of said plurality of machining condition storing means;

means for determining an initial hole position for a wire electric discharge machine; and means for automatically defining the initial hole position as a hole position of a machining center.

* * * * *